US012655277B2

(12) United States Patent
Tagami et al.

(10) Patent No.: US 12,655,277 B2
(45) Date of Patent: Jun. 16, 2026

(54) RESIN COMPOSITION AND FILM

(71) Applicant: TOPPAN Inc., Taito-ku (JP)

(72) Inventors: Hanae Tagami, Taito-ku (JP); Shigeki Furukawa, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 714 days.

(21) Appl. No.: 18/079,404

(22) Filed: Dec. 12, 2022

(65) Prior Publication Data

US 2023/0139240 A1 May 4, 2023

Related U.S. Application Data

(63) Continuation of application No. PCT/JP2021/022336, filed on Jun. 11, 2021.

(30) Foreign Application Priority Data

Jun. 12, 2020 (JP) ................................ 2020-102135
Nov. 2, 2020 (JP) ................................ 2020-183546
Nov. 4, 2020 (JP) ................................ 2020-184197
Feb. 18, 2021 (JP) ................................ 2021-024174
Feb. 18, 2021 (JP) ................................ 2021-024267

(51) Int. Cl.

| | |
|---|---|
| *C08L 23/00* | (2006.01) |
| *C08F 20/30* | (2006.01) |
| *C08G 18/62* | (2006.01) |
| *C08J 5/18* | (2006.01) |
| *C08J 7/048* | (2020.01) |

(52) U.S. Cl.

CPC .............. *C08L 23/00* (2013.01); *C08F 20/30* (2013.01); *C08G 18/6229* (2013.01); *C08J 5/18* (2013.01); *C08J 7/048* (2020.01); *C08J 2335/02* (2013.01)

(58) Field of Classification Search

CPC ........ C08L 23/00; C08F 20/30; C08F 220/14; C08F 212/08; C08F 212/22; C08G 18/6229; C08G 18/672; C08G 18/718; C08G 18/73; C08G 18/7621; C08G 18/7642; C09D 133/14; C09D 175/04; C09D 175/16; G03F 7/027; G03F 7/035; G03F 7/038; G03F 7/039; G02B 1/14

USPC .......................................................... 524/543

See application file for complete search history.

(56) References Cited

U.S. PATENT DOCUMENTS

| | | | | |
|---|---|---|---|---|
| 7,727,701 | B2 | 6/2010 | Hojo et al. | |
| 8,124,702 | B2 | 2/2012 | Kiura et al. | |
| 2007/0190465 | A1 | 8/2007 | Nishikawa et al. | |
| 2007/0196772 | A1* | 8/2007 | Jung ........................ | G03F 7/40 430/311 |
| 2008/0241747 | A1 | 10/2008 | Hojo et al. | |

(Continued)

FOREIGN PATENT DOCUMENTS

| | | | |
|---|---|---|---|
| CN | 101059651 | A | 10/2007 |
| CN | 103080839 | A | 5/2013 |

(Continued)

OTHER PUBLICATIONS

Japanese Office Action issued Nov. 5, 2024 in Japanese Patent Application No. 2020-102135, 7 pages.
Japanese Office Action issued Jul. 15, 2025 in Japanese Patent Application No. 2021-024174, 4 pages.
Partial Supplementary European Search Report Issued Oct. 17, 2023 in European Application 21822068.9, 17 pages.
Combined Chinese Office Action and Search Report issued Nov. 1, 2023 in Chinese Application 202180042688.8, (with English translation), 14 pages.
Nasirtabrizi, M.H. et al., "Synthesis, Characterization and Thermal Behaviour of Amino Functional Polymers from 4-Chloromethyl Styrene Polymers", Asian Journal of Chemistry, vol. 25, No. 5, XP055954560, 2013, pp. 2651-2656.

(Continued)

*Primary Examiner* — Hannah J Pak
(74) *Attorney, Agent, or Firm* — Oblon, McClelland, Maier & Neustadt, L.L.P.

(57) ABSTRACT

A resin composition including a resin R including a repeating unit having a partial structure of Formula (I) or (II):

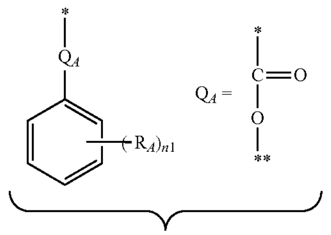

(I)

where $Q_A$ is an ester bond shown in the Formula (I), $R_A$ is a substituent group, n1 is any of integers 1 to 5, * is a bonding site with a remainder of the repeating unit, and ** is a bonding site with a phenyl group in the Formula (I);

(II)

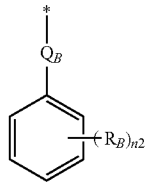

where $Q_B$ is a linking group or a single bond other than the ester bond of $Q_A$ in Formula (I), $R_B$ is a substituent group, with at least one $R_B$ being a hydroxyl group, n2 is any of integers 1 to 5, and * is a bonding site with a remainder of the repeating unit.

7 Claims, 3 Drawing Sheets

(56) References Cited

U.S. PATENT DOCUMENTS

| | | | | |
|---|---|---|---|---|
| 2009/0311622 | A1* | 12/2009 | Sugita | G03F 7/11 430/325 |
| 2010/0056675 | A1 | 3/2010 | Kiura et al. | |
| 2013/0171415 | A1 | 7/2013 | Sakita et al. | |
| 2017/0045819 | A1 | 2/2017 | Karasawa et al. | |
| 2021/0214481 | A1 | 7/2021 | Hoshino | |

FOREIGN PATENT DOCUMENTS

| | | | |
|---|---|---|---|
| CN | 108003290 | A | 5/2018 |
| CN | 111123645 | A | 5/2020 |
| EP | 2 613 198 | A1 | 7/2013 |
| JP | S61-247743 | A | 11/1986 |
| JP | S63-28017 | B2 | 6/1988 |
| JP | S64-86101 | A | 3/1989 |
| JP | H04-338901 | A | 11/1992 |
| JP | 6-41249 | A | 2/1994 |
| JP | 6-116338 | A | 4/1994 |
| JP | 2556940 | B2 | 11/1996 |
| JP | 2790054 | B2 | 8/1998 |
| JP | H10-338777 | A | 12/1998 |
| JP | 2002-036419 | A | 2/2002 |
| JP | 2003-040937 | A | 2/2003 |
| JP | 2004-106443 | A | 4/2004 |
| JP | 2005-234534 | A | 9/2005 |
| JP | 2006-308612 | A | 11/2006 |
| JP | 2007-069456 | A | 3/2007 |
| JP | 2008-64908 | A | 3/2008 |
| JP | 2010-181730 | A | 8/2010 |
| JP | 2010-250263 | A | 11/2010 |
| JP | 2011-209679 | A | 10/2011 |
| JP | 2011-209719 | A | 10/2011 |
| JP | 2012-128198 | A | 7/2012 |
| JP | 2013-216804 | A | 10/2013 |
| JP | 2014-186309 | A | 10/2014 |
| JP | 2016-090667 | A | 5/2016 |
| JP | 2017-140820 | A | 8/2017 |
| JP | 2020-52402 | A | 4/2020 |
| WO | WO 2008/062860 | A1 | 5/2008 |
| WO | WO 2020/066806 | A1 | 4/2020 |

OTHER PUBLICATIONS

Search Report issued Jul. 27, 2021 in International Application No. PCT/JP2021/022336 filed Jun. 11, 2021, 11 pages (with English Translation).

* cited by examiner

RESIN COMPOSITION AND FILM

CROSS-REFERENCE TO RELATED APPLICATIONS

The present application is a continuation of International Application No. PCT/JP2021/022336, filed Jun. 11, 2021, which is based upon and claims the benefits of priority to Japanese Application No. 2020-102135, filed Jun. 12, 2020, Japanese Application No. 2020-184197, filed Nov. 4, 2020, Japanese Application No. 2020-183546, filed Nov. 2, 2020, and Japanese Application No. 2021-024174, filed Feb. 18, 2021. The entire contents of all of the above applications are incorporated herein by reference.

BACKGROUND OF THE INVENTION

Field of the Invention

The present invention relates to resin compositions and films.

Discussion of the Background

Thermoplastic resins, such as polyethylenes, polypropylenes, polyvinyl chlorides, polystyrenes, polyvinyl acetates, polyurethanes, acrylonitrile butadiene styrene resins, and acrylic resins, are general-purpose resins used for various daily necessities and industrial products due to having good processability. Thermoplastic resins are used, for example, for lithography resists in the field of semiconductor manufacturing (e.g., see PTLs 1 to 3, etc.), gas barrier laminate films as packaging materials for protecting articles packaged therein (e.g., see PTLs 4 to 9, etc.), hard coating films as protective films for liquid crystal polarizing plates and the like (e.g., see PTLs 10 to 12, etc.), and for other purposes.

On the other hand, since these general-purpose resins have low heat resistance, it may often be difficult to use them in applications requiring heat resistance. Therefore, in such applications, resins with a high melting point, such as engineering plastics and super engineering plastics, may be used instead. However, such engineering plastics have disadvantages such as poor processability, or being difficult to use in thin film applications such as coating film applications due to having low solubility in generally used organic solvents.

Generally, when resins are used, various additives are mixed in the resins to prepare resin compositions according to applications, for improvement of processability or anti-weatherability. Therefore, additives are also required to have heat resistance to sufficiently undergo processing temperatures or operating temperatures of the resin compositions. For example, PTLs 13 to 15 disclose techniques for increasing the molecular weight of additives to enhance heat resistance thereof PTL 1: WO2020/066806 A
PTL 2: JP 2005-234534 A
PTL 3: JP 2010-181730 A
PTL 4: JP S63-28017 B
PTL 5: JP 2004-106443 A
PTL 6: JP 2007-69456 A
PTL 7: JP 2002-36419 A
PTL 8: JP 2556940 B
PTL 9: JP 2790054 B
PTL 10: JP H1-086101 A
PTL 11: JP H4-338901 A
PTL 12: JP S61-247743 A
PTL 13: JP H10-338777 A
PTL 14: JP 2003-40937 A
PTL 15: WO2008/062860 A

SUMMARY OF THE INVENTION

According to an aspect of the present invention, a resin composition including a resin R including a repeating unit having a partial structure of Formula (I) or (II):

Formula (I)

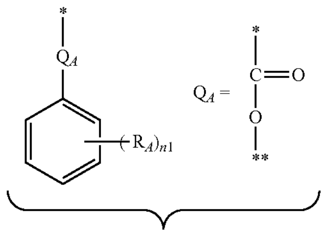

(I)

where $Q_A$ is an ester bond shown in the Formula (I), $R_A$ is a substituent group, n1 is any of integers 1 to 5, * is a bonding site with a remainder of the repeating unit, and ** is a bonding site with a phenyl group in the Formula (I);

Formula (II)

(II)

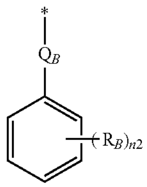

where $Q_B$ is a linking group or a single bond other than the ester bond of $Q_A$ in Formula (I), $R_B$ is a substituent group, with at least one $R_B$ being a hydroxyl group, n2 is any of integers 1 to 5, and * is a bonding site with a remainder of the repeating unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
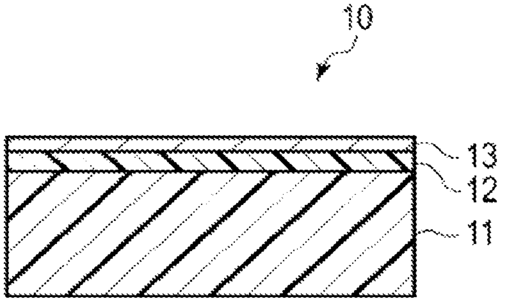
FIG. 1 is a schematic cross-sectional view illustrating an example of a gas barrier laminate film according to an embodiment of the present invention.

The embodiments will now be described with reference to the accompanying drawings, wherein like reference numerals designate corresponding or identical elements throughout the various drawings.

Embodiments of the present invention will be described in detail below.

First Embodiment

A first embodiment of the present invention will be described below.

A resin composition according to the present embodiment contains a specific resin having good heat resistance (termed resin R hereinafter). If resins having low heat resistance, such as general-purpose thermoplastic resins used for daily necessities and industrial products, are used, it will be difficult to obtain resin compositions having good heat resistance and functioning as desired because the thermal decomposition products of the resins may accelerate thermal deterioration of the additives combined therewith. The resin composition of the present embodiment described below in detail contains the resin R having good heat resistance to suppress thermal deterioration of the combined additive, and therefore, can provide a film having good heat resistance and functioning as desired. Accordingly, the resin composition of the present embodiment can be used for various applications.

<Resin R>

The resin R contained in the resin composition of the present embodiment contains a repeating unit having a partial structure expressed by the following General Formula (I) or (II) (termed repeating unit (a) hereinafter).

<Chemical Formula 3>

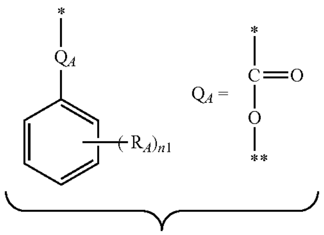

(I)

In Formula (I), $Q_A$ represents the ester bond shown in the formula, $R_A$ represents a substituent group, n1 represents any of integers 1 to 5, * represents a bonding site with the remainder of the repeating unit (a), and ** represents a bonding site with the phenyl group in the formula.

Examples of the substitution group represented by $R_A$ may include an alkyl group (e.g., alkyl group with 1 to 5 carbon atoms), cycloalkyl group (e.g., cycloalkyl group with 3 to 6 carbon atoms), alkoxy group (e.g., methoxy group or ethoxy group), hydroxyl group, acetyl group, nitro group, cyano group, carboxyl group, amino group, ester group, and halogen atom. n1 represents any of integers 1 to 5 as mentioned above, and may be any of integers 1 to 3. If n1 is an integer that is 2 or more, the plurality of substituent groups $R_A$ may be the same as or different from each other.

<Chemical Formula 4>

(II)

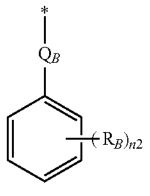

In Formula (II), $Q_B$ represents a linking group or a single bond other than the ester bond represented by $Q_A$ in Formula (I), $R_B$ represents a substituent group, n2 represents any of integers 1 to 5, and * represents a bonding site with the remainder of the repeating unit (a).

As mentioned above, $Q_B$ represents a linking group or a single bond other than the ester bond represented by $Q_A$, examples of such a linking group other than the ester bond represented by $Q_A$ may include —CONR— (where R represents a hydrogen atom or alkyl group), an alkylene group (e g, alkylene group with 1 to 4 carbon atoms), urethane bond, ether bond, and ester bond expressed by *—O—CO— (where  represents a bonding site with the phenyl group in Formula (II)).

Examples of the substitution group represented by $R_B$ may include an alkyl group (e.g., alkyl group with 1 to 5 carbon atoms), cycloalkyl group (e.g., cycloalkyl group with 3 to 6 carbon atoms), alkoxy group (e.g., methoxy group or ethoxy group), hydroxyl group, acetyl group, nitro group, cyano group, carboxyl group, amino group, ester group, and halogen atom. It should be noted that at least one $R_B$ represents a hydroxyl group.

n2 represents any of integers 1 to 5 as mentioned above, or may be any of integers 1 to 3. If n2 is an integer that is 2 or more, the plurality of substituent groups $R_B$ may be the same as or different from each other.

The repeating unit (a) may need to have a partial structure expressed by General Formula (I) or (II) mentioned above, an example of which may be a repeating unit derived from (meth)acrylate monomers, a repeating unit derived from (meth)acrylic amide monomers, a repeating unit derived from N-substituted maleimide monomers, or a repeating unit derived from styrene monomers.

If the repeating unit (a) is derived from (meth)acrylate monomers, examples of the (meth)acrylate monomers may include 4-methoxyphenyl (meth)acrylate, 4-hydroxyphenyl (meth)acrylate, 2,6-di-tert-butylphenyl (meth)acrylate, 2,6-di-tert-butyl-4-methoxyphenyl (meth)acrylate, 2-tert-butyl-4-hydroxyphenyl (meth)acrylate, 3-tert-butyl-4-hydroxyphenyl (meth)acrylate, 2,6-di-tert-butyl-4-methylphenyl (meth)acrylate, 2-hydroxy-4-tert-butylphenyl (meth)acrylate, and 2,4-di-methyl-6-tert-butylphenyl (meth)acrylate.

If the repeating unit (a) is derived from (meth)acrylamide monomers, examples of the (meth)acrylamide monomers may include N-(4-hydroxyphenyl) (meth)acrylamide.

If the repeating unit (a) is derived from N-substituted maleimide monomers, examples of the N-substituted maleimide monomers may include 4-hydroxyphenyl maleimide and 3-hydroxyphenyl maleimide.

If the repeating unit (a) is derived from styrene monomers, examples of the styrene monomers may include α-methyl-p-hydroxystyrene.

In the present embodiment, the resin R is preferred to be a two- or three- or higher-dimensional copolymer further containing one or more repeating units different from the repeating unit (a). In this case, the content of the repeating unit (a) in the resin R is preferred to be in the range of 2 mol % to 50 mol % relative to all the repeating units in the resin R. If the content of the repeating unit (a) in the resin is 2 mol % or more, thermal decomposition of the resin R and the additive, if it is contained, can be effectively suppressed.

If the content of the repeating unit (a) in the resin R is 50 mol % or less, the occurrence of yellowing of the resin R when heated can be effectively suppressed, or the resin R can be effectively prevented from becoming hard and brittle, while maintaining the effect of suppressing thermal decomposition of the resin R and the additive combined. From similar perspectives, the content of the repeating unit (a) in the resin R may be 2 mol % or more and 30 mol % or less, or more preferably 2 mol % or more and 20 mol % or less.

In the present embodiment, if the resin R is a copolymer, examples of the repeating unit that can be contained therein and is different from the repeating unit (a) (termed copolymer component hereinafter) may include (meth)acrylate repeating units, olefin repeating units, halogen atom-containing repeating units, styrene repeating units, vinyl acetate repeating units, and vinyl alcohol repeating units.

Examples of the (meth)acrylate repeating units as a copolymer component may include repeating units derived from (meth)acrylate monomers having linear or branched alkyl groups in the side chain, and repeating units derived from (meth)acrylate monomers having hydroxy groups (except for phenolic hydroxyl groups) in the side chain.

Examples of the repeating units derived from (meth) acrylate monomers having linear or branched alkyl groups in the side chain may include monomer-derived components such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meta)acrylate, pentyl (meth)acrylate, hexyl (meth)acrylate, heptyl (meth)acrylate, octyl (meth)acrylate, isooctyl (meth) acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, myristyl (meth)acrylate, pentadecyl (meth)acrylate, hexadecyl (meth)acrylate, heptadecyl (meth)acrylate, and octadecyl (meth)acrylate. These may be used singly or in combination of two or more. Of these materials, the (meth) acrylate repeating units having linear or branched alkyl groups in the side chain with 1 or more and 4 or less carbon atoms can be preferably used.

Examples of the repeating units derived from (meth) acrylic monomers having hydroxyl groups other than phenolic hydroxyl groups in the side chain may include monomer-derived components such as 2-hydroxyethyl (meth) acrylate, 2-hydroxypropyl (meth)acrylate, 4-hydroxybutyl (meth)acrylate, and 6-hydroxyhexyl (meth)acrylate. These may be used singly or in combination of two or more.

Examples of the olefin repeating units as a copolymer component may include olefin monomer-derived components such as ethylene, propylene, isoprene, and butadiene. These may be used singly or in combination of two or more.

Examples of the halogen atom-containing repeating units as a copolymer component may include monomer-derived components such as vinyl chloride and vinylidene chloride. These may be used singly or in combination of two or more.

Examples of the styrene repeating units as a copolymer component may include styrene monomer-derived components such as styrene, α-methylstyrene, and vinyltoluene. These may be used singly or in combination of two or more.

The copolymer may have a structure of any of random copolymer, alternating copolymer, block copolymer, and graft copolymer. If the structure of the copolymer is of a random copolymer, the production processes and preparation with cyanine pigment may be facilitated. Therefore, a random copolymer is more preferable to other copolymers.

The polymerization method used for obtaining the copolymer may be radical polymerization. Radical polymerization is preferred from the perspective of facilitating industrial production. Radical polymerization may be a solution polymerization method, emulsification polymerization method, bulk polymerization method, suspension polymerization method, or the like. A solution polymerization method is preferred to be used for radical polymerization. Use of a solution polymerization method can facilitate control of the molecular weight of the copolymer.

In radical polymerization, the monomer mentioned above may be diluted with a polymerization solvent, followed by adding a polymerization initiator to polymerize the monomer.

The polymerization solvent may be, for example, an ester-based solvent, alcohol ether-based solvent, ketone-based solvent, aromatic solvent, amide-based solvent, alcohol-based solvent, or the like. Examples of the ester-based solvent may include methyl acetate, ethyl acetate, n-butyl acetate, isobutyl acetate, t-butyl acetate, methyl lactate, and ethyl lactate. Examples of the alcohol ether-based solvent may include ethylene glycol monomethyl ether, ethylene glycol monoethyl ether, propylene glycol monomethyl ether, propylene glycol monomethyl ether acetate, propylene glycol monoethyl ether, 3-methoxy-1-butanol, and 3-methoxy-3-methyl-1-butanol. Examples of the ketone-based solvent may include acetone, methyl ethyl ketone, methyl isobutyl ketone, and cyclohexanone. Examples of the aromatic solvent may include benzene, toluene, and xylene. Examples of the amide-based solvent may include formamide and dimethylformamide. Examples of the alcohol-based solvent may include methanol, ethanol, n-propanol, isopropanol, n-butanol, isobutanol, s-butanol, t-butanol, diacetone alcohol, and 2-methyl-2-butanol. These polymerization solvents may be used singly or may be used as a mixture of two or more.

In radical polymerization, the amount of the polymerization solvent to be used is not particularly limited, but if the total mass of the monomer is set to 100 parts by mass, the amount of the polymerization solvent to be used is preferred to be 1 part by mass or more and 1,000 parts by mass or less, and is more preferred to be 10 parts by mass or more and 500 parts by mass or less.

Examples of the radical polymerization initiator may include peroxides and azo compounds. Examples of the peroxides may include benzoylperoxide, t-butylperoxyacetate, t-butylperoxybenzoate, and di-t-butylperoxide. Examples of the azo compounds may include azobisisobutyronitrile, azobisamidinopropane salt, azobiscyanovaleric acid (salt), and 2,2'-azobis[2-methyl-N-(2-hydroxyethyl) propionamide].

If the total mass of the monomer is set to 100 parts by mass, the amount of the radical polymerization initiator to be used is preferred to be 0.0001 part by mass or more and 20 parts by mass or less, more preferred to be 0.001 part by mass or more and 15 parts by mass or less, and even more preferred to be 0.005 parts by mass or more and 10 parts by mass or less. The radical polymerization initiator may be added to the monomer and the polymerization solvent before the start of polymerization or may be dripped during polymerization reaction. Dripping the radical polymerization initiator in the monomer and the polymerization solvent during the polymerization reaction is preferred from the perspective of suppressing heat generation due to polymerization.

The reaction temperature of the radical polymerization may be appropriately selected depending on the types of the radical polymerization initiator and the polymerization solvent. The reaction temperature is preferred to be 60° C. or more and 110° C. or less, from the perspective of ease of production and reaction controllability.

<Additive>

The resin composition of the present embodiment achieves the effect of suppressing thermal deterioration of an additive due to using the resin R containing the repeating unit (a) and having good heat resistance, and therefore, is preferred to contain an additive. If the resin R contains an additive, the additive may be mixed in a ratio of, for example, 50 mass % or less relative to the resin R. The mixing ratio of the additive to the resin R may be 30 mass % or less, or more preferably 10 mass % or less. The lower limit of the mixing ratio of the additive may be appropriately determined depending on the purpose of use or desired function or the like of the additive, but it is not particularly limited. As an example, the lower limit of the mixing ratio of the additive may be 0.01 mass % or more. In the resin composition of the present embodiment, a single additive may be contained or two or more additives may be contained. If the resin composition of the present embodiment contains two or more additives, the above mixing ratio indicates a mass ratio of the total additive to the resin R.

In the present embodiment, additives are added to the resin R in the above mixing ratio for the purpose of maintaining functions of the resin R, adding new functions thereto, or the like, and the additives are organic additives. The organic additives herein are selected from compounds containing carbon atoms, and may be low molecular weight compounds or high molecular weight compounds, or may be oligomers, and may include organic metal salts.

It should be noted that the additives are assumed not to be chemically reactive with the resin R and to be present in the composition with the same chemical structure as when added, and do not contain a cross-linking agent or a curing agent which may cross-link resin chains each other due to heat or light.

Specific examples of additives are shown in Table 1.

TABLE 1-1

| Purpose | | Type | Examples |
|---|---|---|---|
| Formability improvement | Viscosity control | Thickener | Hydroxyethyl cellulose, carboxymethyl cellulose, polyethylene oxide, polyvinyl alcohol, alginate, carboxyvinyl polymer, polyacrylate, modified urethane |
| | | Viscosity reducer | Ethylenediamine, diethanolamine |
| | | Plasticizer | Epoxidized vegetable oils such as epoxidized soybean oil and epoxidized flaxseed oil<br>Phthalate esters such as dioctyl phthalate and dibutyl phthalate<br>Polyester plasticizers composed of dibasic acids such as adipic acid, sebacic acid and phthalic acid, and glycols such as 1,2-propanediol and butanediol |
| | Crystallinity control | Nucleating agent, Crystallization accelerator | Carboxylic acid metal salts such as sodium benzoate<br>Sorbitols such as dibenzylidene sorbitol and dialkylbenzylidene sorbitol<br>Phosphate ester metal salts such as phosphate ester sodium salt |
| | | Crystallization retarder | Amorphous olefin resin, oligomers |
| | Productivity improvement | Lubricant | Liquid paraffin, hydrocarbons such as synthetic polyethylene wax, fatty acids such as stearic acid, higher alcohols such as stearyl alcohol, aliphatic amides such as stearic acid amide, metal soaps such as metallic stearate, esters such as butyl stearate |
| | | Release agent | Fatty acid calcium, polyolefin |

TABLE 1-2

| Purpose | | Type | Examples |
|---|---|---|---|
| Improvement of physical properties | Softening | Plasticizer | Same as above |
| | Flame retardance | Flame retarder | Bromine compounds such as pentabromodiphenyl ether, octabromodiphenyl ether, decabromodiphenyl ether, tetrabromobisphenol A, hexabromocyclododecane, and hexabromobenzene<br>Aromatic phosphate esters such as triphenyl phosphate<br>Chlorine compounds such as chlorinated paraffin |
| Functionalization | Electrical conductivity | Antistatic agent | Nonionic, cationic and anionic surfactants |
| | Hue | Organic pigment | Polycyclic pigments such as azo pigment, phthalocyanine, and anthraquinone |
| | | Dye | Cyanine dye, squalium dye |
| | | Fluorescent agent | Fluorescent dyes such as merocyanine, perylene, rhodamine, coumarin, and pyrromethene |
| Durability improvement | Deterioration inhibitor | Antioxidant | Hindered phenols, phosphites, thioethers |
| | | UV absorber | Benzotriazoles, triazines, benzophenones |
| | | Light stabilizer | Hindered amines (low molecular type, high molecular type) |
| | Environmental friendliness | Fungicide, antimicrobial | Isothiazolones, bronopol, chlorothalonil, methylsulfonyl tetrachloro- pyridine, methyl N-(1H-benzimidazol-2-yl)-carbamate, thiabendazole, 2-(dichlorofluoromethyl)-sulfanylisoindole-1,3-dione, 1-(diiodomethylsulfonyl)-4-methylbenzene |

The resin composition of the present embodiment can be preferably used in various applications requiring heat resistance, including thin film applications such as coating films, film substrates, and adhesive layers used when bonding between film substrates. Examples of applications may include gas barrier films included in packaging materials such as of foods, medical supplies, and medicines, optical films used for security products with anticounterfeiting structures, coating films (surface protective layers) used for material sheets for buildings such as decorative sheets, color filters or hard coating films used for liquid crystal displays and the like, and resist films used for electron beam lithography.

Second Embodiment

A second embodiment of the present invention will be described below.

The resin composition of the present embodiment is an electron beam resist composition containing the resin R which contains the repeating unit (a) having a partial structure expressed by General Formula (I) or (II) set forth above.

In the field of semiconductor manufacturing or the like, the technique of electron beam lithography is required. Electron beam resists used for electron beam lithography are generally required to have three characteristics which are high sensitivity, high resolution, and dry etching resistance. In order to improve these characteristics, various materials have been proposed. For example, as a representative of positive electron beam resists, those which use polymethylmethacrylate (PMMA) have been known as main chain scission-type resists which, however, suffer from low sensitivity and low productivity, although they have high resolution. To cope with this, there have been proposed highly sensitive positive electron beam resists, e.g., a main chain scission-type resist containing a copolymer resin having an aromatic ring on the side chain with molecular weight reduced to 1.7 or less (PTL 1), a two-component resist that is a mixture of an alkali-soluble novolak resin and diazonaphthoquinone, a chemically amplified resist using acid-catalyzed reaction (PTLs 2 and 3), and the like.

However, these compositions have been insufficient in dry etching resistance and thus it has been difficult to perform selective etching. The electron beam resist composition according to the present embodiment described below in detail can provide an electron beam resist film having good dry etching resistance.

The electron beam resist composition according to the present embodiment can be applied to both positive and negative resists. Positive resists refer to those resists which increase solubility of the exposed patterns in a developer, allowing portions not exposed to remain. Negative resists refer to those resists which decrease solubility of the patterns exposed after development in a developer, allowing portions exposed after development to remain.

The electron beam resist composition of the present embodiment contains the resin R which contains the repeating unit (a) having a partial structure expressed by General Formula (I) or (II) set forth above.

In the present embodiment, the resin R is preferred to be a two- or three- or higher-dimensional copolymer further containing one or more repeating units different from the repeating unit (a). In this case, the content of the repeating unit (a) in the resin R is preferred to be in the range of 2 mol % or more and 50 mol % or less relative to all the repeating units in the resin R. If the content of the repeating unit (a) in the resin R is 2 mol % or more, dry etching resistance can be further improved.

If the resin is a two- or three- or higher-dimensional copolymer, an adhesion-improving function can be added thereto, or the degree of hardness of the resist film can be controlled.

Furthermore, if the content of the repeating unit (a) in the resin R is 50 mol % or less, the occurrence of yellowing of the resist when heated can be effectively suppressed, or the resist can be effectively prevented from becoming hard and brittle, while maintaining the effect of suppressing thermal decomposition of the resin R. From similar perspectives, the content of the repeating unit (a) in the resin R may be 2 mol % or more and 30 mol % or less, or more preferably 2 mol % or more and 20 mol % or less.

In the present embodiment, if the resin R is a copolymer, examples of the copolymer component that can be contained therein may include (meth)acrylate repeating units, olefin repeating units, halogen atom-containing repeating units, styrene repeating units, vinyl acetate repeating units, and vinyl alcohol repeating units.

Examples of the (meth)acrylate repeating units as a copolymer component may include repeating units derived from (meth)acrylate monomers having linear or branched alkyl groups in the side chain, and repeating units derived from (meth)acrylate monomers having hydroxy groups (except for phenolic hydroxyl groups) in the side chain.

If the resin is used as a positive resist, a methacrylate repeating unit is desired to be used. Using a methacrylate repeating unit, main chains can be easily selectively decomposed only in portions to which electron beams have been applied and these portions can be easily dissolved when developed. In this case, the content of the methacrylate repeating unit in the resin is preferred to be 30 mol % or more, and is more preferred to be 50 mol % or more, relative to all the repeating units therein.

If the resin is used as a negative resist, an acrylate repeating unit is desired to be used. Using an acrylate repeating unit, only those portions to which electron beams have been applied can be easily selectively cross-linked and only those portions to which electron beams have not been applied can be easily selectively dissolved when developed. In this case, the content of the acrylate repeating unit in the resin is preferred to be 30 mol % or more, and is more preferred to be 50 mol % or more, relative to all the repeating units therein.

Specific examples of the repeating units derived from (meth)acrylate monomers having linear or branched alkyl groups in the side chain may be similar to those mentioned in the first embodiment.

Specific examples of the repeating units derived from (meth)acrylate monomers having hydroxyl groups other than the phenolic hydroxyl groups in the side chain may be similar to those mentioned in the first embodiment.

2-hydroxyethyl methacrylate can also be used as the copolymer component. Use of the 2-hydroxyethyl methacrylate can enhance adhesion between the resist and the substrate.

Monomers having crosslinkable functional groups can also be used as the copolymer component. Such a monomer having a crosslinkable functional group may be glycidyl (meth)acrylate, or the like. If such components are used, the resin can be used as a negative resist.

Methacrylic acid can also be used as the copolymer component. Use of methacrylic acid can improve solubility to a developer when developing with alkali.

Specific examples of the olefin repeating units as a copolymer component may be similar to those mentioned in the first embodiment.

Specific examples of the halogen atom-containing repeating units as a copolymer component may be similar to those mentioned in the first embodiment.

Specific examples of the styrene repeating units as a copolymer component may be similar to those mentioned in the first embodiment.

The molecular weight of the resin R is not particularly limited; however, specifically, the mass average molecular weight may be 100,000 or more and 2,000,000 or less, and more preferably 200,000 or more and 1,000,000 or less. If the molecular weight is excessively large, a uniform film is not necessarily obtained due to lack of solvents in which there is good solubility as required when the resin is thinly applied, or due to filtration being disabled by gels formed in the solution, or the like. Also, if the molecular weight is excessively small, sensitivity may be deteriorated, or it may be difficult to obtain a uniform film with an appropriate thickness.

The copolymer may have a structure of any of random copolymer, alternating copolymer, block copolymer, and graft copolymer. if the structure of the copolymer is of a random copolymer, production processes may be facilitated. Therefore, a random copolymer is more preferable to other copolymers.

The polymerization method of obtaining a copolymer is as described in the first embodiment.

The resist composition of the present embodiment can be formulated to appropriately contain additives such as a surfactant, dissolution inhibitor, plasticizer, stabilizer, colorant, and antihalation agent, for improving coating properties.

In particular, in the present embodiment, thermal deterioration of organic additives can be suppressed by using the resin R containing the repeating unit (a) and having good heat resistance. The organic additives herein are selected from compounds containing carbon atoms, and may be low molecular weight compounds or high molecular weight compounds, or may be oligomers, and may include organic metal salts. Specific examples of additives are shown in Table 2.

TABLE 2

| Purpose | Type | Examples |
|---|---|---|
| Formability improvement | Thickener | Hydroxyethyl cellulose, carboxymethyl cellulose, polyethylene oxide, polyvinyl alcohol, alginate, carboxyvinyl polymer, polyacrylate, modified urethane |
| | Viscosity reducer | Ethylenediamine, diethanolamine |
| | Plasticizer | Epoxidized vegetable oils such as epoxidized soybean oil and epoxidized flaxseed oil |
| | | Phthalate esters such as dioctyl phthalate and dibutyl phthalate |
| | | Polyester plasticizers composed of dibasic acids such as adipic acid, sebacic acid and phthalic acid, and glycols such as 1,2-propanediol and butanediol |
| | Nucleating agent, Crystallization accelerator | Carboxylic acid metal salts such as sodium benzoate |
| | | Sorbitols such as dibenzylidene sorbitol and dialkylbenzylidene sorbitol |
| | | Phosphate ester metal salts such as phosphate ester sodium salt |
| | Crystallization retarder | Amorphous olefin resin, oligomers |
| Improvement of physical properties | Plasticizer | Same as above |
| | Flame retarder | Bromine compounds such as pentabromodiphenyl ether, octabromodiphenyl ether, decabromodiphenyl ether, tetrabromobisphenol A, hexabromocyclododecane, and hexabromobenzene |
| | | Aromatic phosphate esters such as triphenyl phosphate |
| | | Chlorine compounds such as chlorinated paraffin |
| Functional-ization | Antistatic agent | Nonionic, cationic and anionic surfactants |
| | Organic pigment | Polycyclic pigments such as azo pigment, phthalocyanine, and anthraquinone |
| | Dye | Cyanine dye, squalium dye |
| | Fluorescent agent | Fluorescent dyes such as merocyanine, perylene, rhodamine, coumarin, and pyrromethene |
| Durability improvement | Antioxidant | Hindered phenols, phosphites, thioethers |
| | UV absorber | Benzotriazoles, triazines, benzophenones |
| | Light stabilizer | Hindered amines (low molecular type, high molecular type) |
| | Fungicide, antimicrobial | Isothiazolones, bronopol, chlorothalonil, methylsulfonyl tetrachloro- pyridine, methyl N-(1H-benzimidazol-2-yl)carbamate, thiabendazole, 2-(dichlorofluoromethyl)-sulfanylisoindole-1,3-dione, 1-(diiodomethylsulfonyl)-4-methylbenzene |

Examples of the solvent used when using the resist of the present embodiment may include methyl ethyl ketone, methyl isobutyl ketone, cyclohexanone, ethyl acetate, isobutyl acetate, methyl cellosolve acetate, ethyl cellosolve acetate, propylene glycol methyl ether acetate, ethyl lactate, toluene, xylene, and 1,2-dichloroethane.

The resist pattern forming method of the present embodiment can be performed as follows, for example. Specifically, the resist composition may be applied to a substrate, such as a silicon wafer or a glass substrate, using a spinner or the like, followed by prebaking and selective application of electron beams via a desired mask pattern using, for example, an electron beam exposure system or the like. Subsequently, the substrate may be developed using a developer. Thus, a resist pattern precisely providing the mask pattern can be obtained. It should be noted that an organic or inorganic antireflection film may be provided between the substrate and the coating layer of the resist composition.

Any developer may be used as long as it can distinguish between exposed and unexposed portions and the exposed or unexposed portions can be selectively dissolved; however, a developer is generally selected from the polymer mixtures, i.e., from combinations of solvents that are soluble and insoluble to unexposed portions. Solvents in which there is solubility may include acetone, methyl ethyl ketone, methyl isobutyl ketone, methyl isoamyl ketone, cyclopentanone, cyclohexanone, 4-methoxy-4-methyl-2-pentanone, methyl acetate, ethyl acetate, propyl acetate, isopropyl acetate, butyl acetate, isobutyl acetate, amyl acetate, methyl cellosolve acetate, ethyl cellosolve acetate, propyl cellosolve acetate, butyl cellosolve acetate, methyl carbitol acetate, ethyl carbitol acetate, propyl carbitol acetate, butyl carbitol acetate, 3-methyl-3-methoxybutyl acetate, propylene glycol monomethyl ether acetate, butyl formate, methyl propionate, ethyl propionate, propyl propionate, butyl propionate, methyl butyrate, ethyl butyrate, ethyl benzoate, ethyl-3-ethoxypropionate, methyl lactate, ethyl lactate, propyl lactate, butyl lactate, dimethyl cellosolve, diethyl cellosolve, tetrahydrofuran, methyl cellosolve, methyl carbitol, ethyl carbitol, propylene glycol monomethyl ether, diacetone alcohol, dimethylformamide, dimethylacetamide, dimethylsulfoxide, nitromethane, nitroethane, 1-nitropropane, acetonitrile, toluene, xylene, chloroform, and dichloromethane. Solvents in which the resin is insoluble may include methanol, ethanol, 1-propanol, isopropanol, 1-butanol, 2-butanol, cyclopentanol, cyclohexanol, ethyl cellosolve, propyl cellosolve, isopropyl cellosolve, butyl cellosolve, butyl carbitol, hexane, heptane, cyclohexane, petroleum ether, and water.

Subsequently, in general, etching may be performed using the resist pattern obtained as described above as a mask to selectively remove the substrate or the like not covered with the resist. The resist composition of the present embodiment can be preferably used because it is improved in dry etching resistance in particular.

As the dry etching method, known methods can be used, including chemical etching such as downflow etching and chemical dry etching; physical etching such as sputter etching and ion beam etching; and chemical-physical etching such as RIE (reactive ion etching).

Third Embodiment

A third embodiment of the present invention will be described below.

The present embodiment is a gas barrier laminate film including a primer layer derived from the resin composition according to the first embodiment.

Gas barrier laminate films serve as films protecting objects from gases such as moisture, oxygen, or carbon dioxide in the air, and preventing deterioration in quality and performance of the objects. Gas barrier laminate films are being considered to be adopted as an alternative not only to packaging materials for foods and pharmaceuticals, but also to solar cell back sheets or electronic papers, or to glass or aluminum foils in the electronics field such as organic EL.

Main types of gas barrier laminate films available currently may include single films such as of ethylene-vinyl alcohol copolymer resin, coextruded multilayer nylon (Ny) films, and wet coating films of vinylidene chloride (PVDC) coating or polyvinyl alcohol (PVA) coating. However, of these types of films, even those films which have high gas barrier properties have water vapor permeability of only about 3 $g/m^2/day$ at the highest, and thus it is difficult to use them as packaging materials or electronic materials requiring better gas barrier properties. Accordingly, if higher barrier properties are required, lamination of a metal foil such as an aluminum foil has been unavoidable.

However, packaging materials in which a metal foil is laminated have raised issues that the contents cannot be seen, metal detectors cannot be used for content inspection, and the like.

In order to cope with such issues, PTL 4, for example, proposes a transparent gas barrier film including a polymer resin substrate on which an inorganic compound such as aluminum oxide, magnesium oxide, or silicon oxide is deposited.

Furthermore, there have been proposed several films with a structure in which a primer layer is provided between a resin substrate and a deposited layer to improve adhesion of the deposited layer to the resin substrate. The materials used for these primer layers are acrylic resins in many cases, and in particular, the materials are reaction composites of an acrylic polyol and an isocyanate compound, or such reaction composites further containing a silane coupling agent. Thus, gas barrier films having high boiling resistance and retort resistance without deteriorating physical properties or causing delamination even after boiling sterilization or retort sterilization have been achieved (e.g., PTLs 5 to 7).

However, it is difficult for these films to maintain adhesion even after high temperature tests (JIS C8917, C8938, C8990, and C8991) generally performed as a durability test for solar cell modules, and thus it is difficult to use these films for applications requiring high durability.

Referring to the drawings, a detailed description will be hereinafter given of a transparent gas barrier laminate film according to the present embodiment, which can maintain adhesion even after high temperature testing and has good durability. It should be noted that components having the same or similar functions are designated with the same reference signs to omit repeated explanation.

As shown in FIG. 1, a gas barrier laminate film 10 of the present embodiment includes a resin substrate 11, a primer layer 12, and a deposited layer 13, and has a configuration in which the primer layer 12 and the deposited layer 13 are sequentially laminated on one surface of the resin substrate 11. The gas barrier laminate film may have a configuration in which the primer layer 12 and the deposited layer 13 are sequentially laminated on each of both surfaces of the resin substrate 11 to achieve higher water vapor barrier properties.

Examples of the resin substrate 11 may include polyester films such as polyethylene terephthalate (PET) and polyethylene naphthalate (PEN), polyolefin films such as polyethylene and polypropylene, polyether sulfone (PES) films, polystyrene films, polyamide films, polyvinyl chloride films, polycarbonate films, polyacrylonitrile films, polyimide films, and biodegradable plastic films such as polylactic acid. The thickness of the resin substrate 11 is not particularly limited but, practically, it is preferred to be about 6 μm or more and 200 μm or less, more preferred to be 12 μm or more and 125 μm or less, and even more preferred to be 12 μm or more and 25 μm or less.

Furthermore, in order to enhance adhesion, the surface of the resin substrate 11 on which other layers are laminated may undergo physical treatment such as corona treatment, plasma treatment, or flame treatment, or chemical treatment with chemical solutions such as acid or alkali, or other treatments.

The primer layer 12, which is provided on the resin substrate 11, enhances adhesion between the resin substrate 11 and the deposited layer 13, so that the deposited layer can be prevented from being separated due to various sterilization treatments such as boiling or retort sterilization or long-term outdoor installation.

The primer layer 12 contains a composite of a polyol and an isocyanate compound. The primer layer 12 is derived from the resin composition of the first embodiment, where the resin R containing the repeating unit (a) having a partial structure expressed by General Formula (I) or (II) set forth above is a polyol.

The term "polyols" is a generic term for compounds having a plurality of hydroxyl groups in a molecule, and reacting with isocyanate groups of isocyanate compounds. Main types of polyols may include polyether polyols having an ether bond in the main chain, polyester polyols having an ester bond in the main chain, acrylic polyols which are polymer compounds obtained by polymerizing (meth) acrylic acid derivative monomers, or acrylic polyols which are polymer compounds obtained by copolymerizing (meth) acrylic acid derivative monomers with other monomers.

The polyether polyols may mainly include polyoxyalkylene polyol obtained by addition polymerization of alkylene oxide using polyhydric alcohol or polyamine as an initiator, and polyoxytetramethylene glycol obtained by cationic polymerization of tetrahydrofuran.

The polyester polyols may mainly include polycondensation polyester polyols obtained from dibasic acids and glycols, and polycaprolactone polyols obtained by ring-opening polymerization of ε-caprolactones. The dibasic acids used for the polycondensation polyester polyols may include adipic acid, terephthalic acid, and isophthalic acid, and the glycols may include ethylene glycol, neopentyl glycol, and 3-methyl-1,5-pentadiol.

The acrylic polyols may include polymer compounds having hydroxyl groups at the end, among polymer compounds obtained by polymerizing (meth)acrylic acid derivative monomers, and polymer compounds obtained by copolymerizing (meth)acrylic acid derivative monomers and other monomers by radical polymerization.

Monomers copolymerizable with the (meth)acrylic acid derivative monomers having hydroxyl groups at the end may include monomers having alkyl groups at the end such as methyl (meth)acrylate, ethyl (meth)acrylate, n-butyl (meth) acrylate, and t-butyl (meth)acrylate; (meth)acrylic acid derivative monomers having carboxyl groups at the end such as (meth)acrylic acid; and (meta)acrylic acid derivative monomers having an aromatic ring or cyclic structure at the end such as benzyl (meth)acrylate and cyclohexyl (meth) acrylate. Other than the (meth)acrylic acid derivative monomers, styrene monomers, cyclohexylmaleimide monomers, and phenylmaleimide monomers may also be included.

As described above, the polyols contain the repeating unit (a) having a partial structure expressed by General Formula (I) or (II) set forth above.

In the present embodiment, the polyols are preferred to be two- or three- or higher-dimensional copolymers further containing one or more repeating units different from the repeating unit (a). In this case, the content of the repeating unit (a) in such a polyol is preferred to be in the range of 2 mol % or more and 50 mol % or less relative to all the repeating units in the polyol. If the content of the repeating unit (a) in the polyol is 2 mol % or more, thermal decomposition of the polyols can be effectively suppressed.

If the content of the repeating unit (a) in the polyol is 50 mol % or less, the occurrence of yellowing of the gas barrier film when heated can be effectively suppressed, or the primer layer 12 can be effectively prevented from becoming hard and brittle, while maintaining the effect of suppressing thermal decomposition of the polyol and the additive combined. From similar perspectives, the content of the repeating unit (a) in the resin may be 2 mol % or more and 30 mol % or less, or more preferably 2 mol % or more and 20 mol % or less.

In the present embodiment, if the polyol is a copolymer, examples of the copolymer component that can be contained therein may include (meth)acrylate repeating units, olefin repeating units, halogen atom-containing repeating units, styrene repeating units, vinyl acetate repeating units, and vinyl alcohol repeating units.

Examples of the (meth)acrylate repeating units as a copolymer component may include repeating units derived from (meth)acrylate monomers having linear or branched alkyl groups in the side chain, and repeating units derived from (meth)acrylate monomers having hydroxy groups (except for phenolic hydroxyl groups) in the side chain.

Specific examples of the repeating units derived from (meth)acrylate monomers having linear or branched alkyl groups in the side chain may be similar to those mentioned in the first embodiment.

Specific examples of the (meth)acrylate repeating units having hydroxyl groups other than the phenolic hydroxyl groups in the side chain may be similar to those mentioned in the first embodiment.

Specific examples of the olefin repeating units as a copolymer component may be similar to those mentioned in the first embodiment.

Specific examples of the halogen atom-containing repeating units as a copolymer component may be similar to those mentioned in the first embodiment.

Specific examples of the styrene repeating units as a copolymer component may be similar to those mentioned in the first embodiment.

However, the repeating unit (a), if it contains no hydroxyl group, is required to contain a hydroxyl group by 2 mol % or more as a copolymer component.

The molecular weight of the polyol is not particularly limited, but is preferred to be 3,000 or more and 200,000 or less, more preferred to be 5,000 or more and 100,000 or less, and even more preferred to be 5,000 or more and 40,000 or less.

The copolymer may have a structure of any of random copolymer, alternating copolymer, block copolymer, and graft copolymer. If the structure of the copolymer is of a random copolymer, the production processes and preparation with cyanine pigment may be facilitated. Therefore, a random copolymer is more preferable to other copolymers.

The polymerization method of obtaining a copolymer is as described in the first embodiment.

Isocyanate compounds have two or more isocyanate groups in a molecule. Examples of monomer isocyanates may include aromatic isocyanates such as tolylene diisocyanate (TDI) and diphenylmethane diisocyanate (MDI), aliphatic isocyanates such as hexamethylene diisocyanate (HDI), bisisocyanate methylcyclohexane (H6XDI), isophorone diisocyanate (IPDI), and dicyclohexylmethane diisocyanate (H12MDI), and aromatic-aliphatic isocyanates such as xylene diisocyanate (XDI) and tetramethylxylylene diisocyanate (TMXDI). Polymers or derivatives of these monomer isocyanates can also be used. For example, 3 to 5-dimer nurate type, adduct type reacted with 1,1,1-trimethylolpropane or the like, biuret type reacted with biuret, or other types can be used.

The isocyanate compound may be optionally selected from the above isocyanate compounds, or polymers or derivatives thereof, and isocyanate compounds may be used singly or in combination of two or more.

Additives may be added to the above polyols and isocyanate compounds according to applications. Examples of the additives may include catalysts that accelerate the curing reaction, light stabilizers such as UV absorbers (UVA) and hindered amine light stabilizers (HALS), antioxidants, antistatic agents, plasticizers, and silane coupling agents. In particular, in the present embodiment, thermal deterioration of organic additives can also be suppressed by using a polyol containing the repeating unit (a) and having good heat resistance. The organic additives herein are as described in the second embodiment. Specific examples of the additives may be similar to those shown in Table 2 in the second embodiment.

Using a polyol containing the repeating unit (a), thermal deterioration of the additives can be suppressed. For example, if a light stabilizer is used as an additive, the gas barrier laminate film may have good light resistance even after heating.

The primer layer 12 is formed by applying a solution containing a composite of the above polyols and the above isocyanate compounds and a solvent onto the resin substrate 11, and reaction-curing the coating. The solvent used may be one that can dissolve the above polyols and isocyanate compounds. Examples of the solvent may include methyl acetate, ethyl acetate, butyl acetate, methyl ethyl ketone, dioxolane, tetrahydrofuran, cyclohexanone, and acetone, which may be used singly or in combination of two or more.

A generally used coating method may be used as a method of forming the primer layer 12. For example, a known method such as dipping, roll coating, gravure coating, reverse coating, air knife coating, comma coating, die coating, screen printing, spray coating, gravure offset printing, or the like may be used. The drying method may be a method of applying heat, such as hot air drying, hot roll drying, high frequency irradiation, infrared irradiation, UV irradiation, or the like, which may be used singly or in combination of two or more.

The thickness of the primer layer 12 is preferred to be 30 nm or more and 200 nm or less, and is more preferred to be 100 nm or more and 200 nm or less. If the thickness is smaller than this, adhesion between the resin substrate 11 and the deposited layer 13 may become insufficient, and if it is larger than 300 nm, the effect of internal stress increases and the deposited layer 13 is not necessarily smoothly laminated, raising an issue of insufficient barrier properties.

The deposited layer 13 is provided on the primer layer 12 to impart gas barrier properties to the entire film.

The material of the deposited layer 13 is preferred to be a deposition material containing metallic silicon and silicon dioxide. Furthermore, the material of the deposited layer 13 may be a deposition material further containing other materials such as tin or metal oxide.

By depositing a deposition material containing metallic silicon and silicon dioxide, high gas barrier properties can be imparted to the entire film. Furthermore, by depositing a deposition material in which tin or tin oxide is mixed with metallic silicon and silicon dioxide, a deposited layer 13 with high film density can be formed to exhibit high water vapor barrier properties, thereby obtaining a gas barrier film having high gas barrier properties and high durability due to the synergistic effect with the primer layer 12 formed of the composite of a polyol and an isocyanate compound.

The metallic silicon and the silicon dioxide may be mixed so that, for example, the element ratio O/Si will be 1 or more and 1.8 or less, and more preferably 1.2 or more and 1.7 or less.

As a method of forming the deposited layer 13, a known method such as vacuum vapor deposition, sputtering, plasma vapor deposition, or atomic layer deposition may be appropriately used, but vacuum vapor deposition may be preferred to be used. Also, in order to enhance transparency of the deposited layer 13, the deposition material may be deposited using reactive deposition in which evaporated particles are reacted with oxygen gas introduced into the atmosphere for deposition. By performing reactive deposition with an oxygen gas or argon gas, metal components in the deposition material are oxidized to improve transparency of the deposited layer 13. When introducing a gas, the pressure in the film formation chamber is preferred to be $2\times10^{-1}$ Pa or less. If the pressure in the film formation chamber is higher than $2\times10^{-1}$ Pa, the deposited layer 13 is not necessarily smoothly laminated and the water vapor barrier properties may be deteriorated.

The (thickness) of the deposited layer 13 is preferred to be 0.005 μm or more and 0.3 μm or less, and is more preferred to be 0.03 μm or more and 0.05 μm or less. If the thickness is smaller than 0.005 μm, sufficient barrier properties are not necessarily exhibited, and if it exceeds 0.3 μm, the deposited layer may become brittle and easily suffer cracking, raising an issue of not exhibiting barrier properties.

Figure 2:
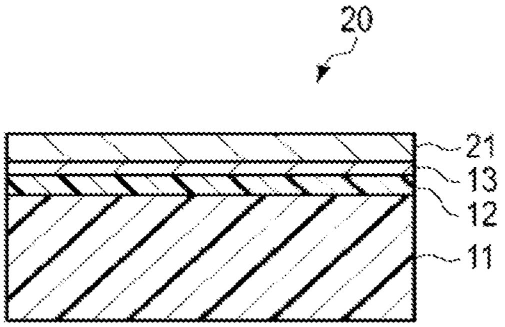
FIG. 2 is a schematic cross-sectional view illustrating another example of a gas barrier laminate film according to an embodiment of the present invention.

As in a gas barrier laminate film 20 shown in FIG. 2, the gas barrier laminate film of the present embodiment may be provided, on the deposited layer 13 thereof, with a gas barrier coating layer 21 that is a thin dry coating film formed of a coating liquid which contains a water-soluble polymer and an alkoxysilane or a hydrolysis product thereof.

The gas barrier coating layer 21 is provided in order to protect the hard and brittle deposited layer 13 and prevent the occurrence of cracking due to abrasion or bending, and is formed of a component which contains a water-soluble polymer and an alkoxysilane or a hydrolysis product thereof. The gas barrier coating layer 21 is formed by applying a coating liquid, which contains a water-soluble polymer and an alkoxysilane or a hydrolysis product thereof, onto the deposited layer 13, followed by drying.

A generally used coating method may be used as a method of forming the gas barrier coating layer 21 as in the primer layer 12. For example, a known method such as dipping, roll coating, gravure coating, reverse coating, air knife coating, comma coating, die coating, screen printing, spray coating, gravure offset printing, or the like may be used. The drying method may be a method of applying heat, such as hot air drying, hot roll drying, high frequency irradiation, infrared irradiation, UV irradiation, or the like, which may be used singly or in combination of two or more.

The water-soluble polymer that can be used may be a polyvinyl alcohol resin (PVA), ethylene-vinyl alcohol copolymer resin (EVOH), polyvinylpyrrolidone resin (PVP), or the like, which may be used singly or in combination of two or more.

The alkoxysilane that can be used may be tetraethoxysilane, tetramethoxysilane, tetrapropoxysilane, methyltriethoxysilane, methyltrimethoxysilane, or the like. Also, the hydrolysis product of an alkoxysilane may be prepared by dissolving an alkoxysilane in an alcohol such as methanol, and adding an aqueous solution of an acid such as hydrochloric acid to the solution, followed by hydrolysis reaction.

Furthermore, in order to enhance adhesion with the deposited layer 13, a silane coupling agent may be added to the gas barrier coating layer 21. The silane coupling agent may be one having an epoxy group such as 3-glycidoxypropyltrimethoxysilane, one having an amino group such as 3-aminopropyltrimethoxysilane, one having a mercapto group such as 3-mercaptopropyltrimethoxysilane, one having an isocyanate group such as 3-isocyanatopropyltriethoxysilane, or the like, which may be used singly or in combination of two or more.

Figure 3:
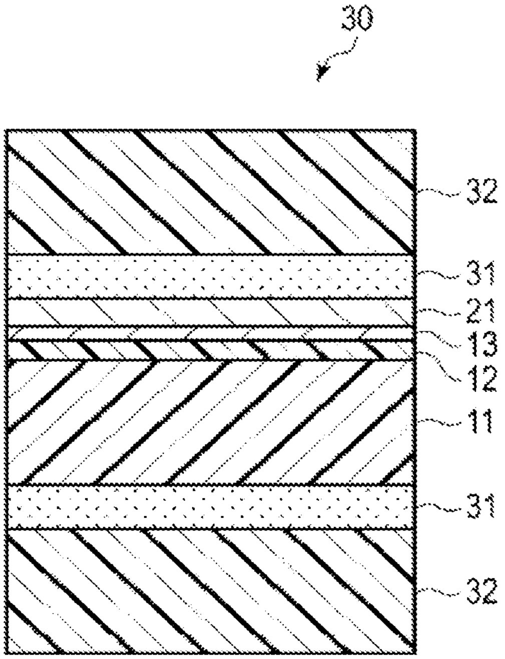
FIG. 3 is a schematic cross-sectional view illustrating an example of a gas barrier laminate film having a double-sided laminate structure according to an embodiment of the present invention.

As in a gas barrier laminate film 30 shown in FIG. 3, the gas barrier laminate film of the present embodiment may have a configuration in which a laminate resin layer 32 is provided on each of both surfaces of the gas barrier laminate film 20 shown in FIG. 2 via an adhesive layer 31. By further providing a laminate resin layer 32, highly practical gas barrier laminate film can be achieved. With a sealant film having heat sealing properties laminated, the laminate resin layer 32 is used as a bonding portion when forming a packaging bag or the like. Examples of the resins used for the laminate resin layer 32 may include polyethylenes, polypropylenes, ethylene-vinyl acetate copolymers, ethylene-methacrylate copolymers, ethylene-methacrylate ester copolymers, ethylene-acrylic acid copolymers, ethylene-acrylic acid ester copolymer, and their metal-crosslinked materials. The thickness of the laminate resin layer 32 is determined according to the purpose, but generally, it is in the range of 15 μm or more and 200 μm or less. It should be noted that the laminate resin layer 32 may be provided to only one surface of the gas barrier laminate film 20 via the adhesive layer 31.

Furthermore, a polyethylene terephthalate film or a polyethylene naphthalate film may be laminated on one surface or each of both surfaces of the gas barrier laminate film 10, 20 or 30 of the present embodiment, for use as a sealing member, such as s transparent conductive sheet, used for liquid crystal display elements, solar cells, electromagnetic shields, or touch panels.

Fourth Embodiment

A fourth embodiment of the present invention will be described below.

The present embodiment is a heat sterilization packaging bag including a primer layer derived from the resin composition according to the first embodiment.

In recent years, packaging materials used for packaging foods and pharmaceuticals or non-food products such as electronic materials are required to prevent the effect of oxygen and water vapor or other gasses permeating the packaging bags and altering the contents, to suppress alteration of the contents and maintain functions or qualities of the contents, and accordingly, they are required to have gas barrier properties for blocking these gases.

As gas barrier layers of conventional art, there have been mainly used resin films such as of polyvinyl alcohols and ethylene vinyl copolymers or polyvinylidene chloride and polyacrylonitrile, plastic films to which these resins are applied, or metal foils such as of aluminum, or deposited films of these metals, and the like.

Also, as a gas barrier resin film, there has been known a laminate film, for example, in which a coating layer, which is obtained through polycondensation of a composition containing an alkoxysilane such as $Si(O—CH_3)_4$, a silane coupling agent such as an epoxysilane, and polyvinyl alcohol, is provided on a resin substrate using a sol-gel method (see PTL 8). However, this coating layer, which is formed having hydrogen bonds, easily swells and dissolves in water. Therefore, gas barrier properties of this coating layer easily deteriorate under severe conditions such as boiling or retort treatment.

On the other hand, metal foils or metal deposited films have good gas barrier properties; however, they have issues that the packaging bags cannot be seen through to confirm the contents, metal detectors cannot be used during inspection, they have to be treated as incombustibles when disposed of, and other issues. Furthermore, gas barrier resin films, or films to which gas barrier resins have been applied, are greatly dependent on temperature and humidity and thus cannot maintain sufficient gas barrier properties. In addition, vinylidene chloride, polyacrylonitrile, and the like, which are used as gas barrier resins, may be materials producing harmful substances when they are disposed of or incinerated.

Considering the above, PTL 9, for example, proposes a gas barrier packaging material in which a first layer, which is a deposited layer formed of an inorganic compound, and a second layer, which is a gas barrier coating layer obtained by applying a solution containing a metal alkoxide or tin chloride and a water-soluble polymer, followed by heating and drying the coating, are sequentially laminated. This gas barrier packaging material exhibits high gas barrier properties, while having water resistance, humidity resistance, and some degree of heat resistance. However, the second layer as a coating film of the gas barrier packaging material, which is formed having hydrogen bonds between a metal alkoxide hydrolysate and a water-soluble polymer having a hydroxyl group, has issues that the gas barrier properties such as water vapor barrier properties become deteriorated due to the coating layer being swelled when used as packaging materials requiring treatment such as boiling or retort sterilization treatment. Such packaging materials cannot be used even with a slight deterioration if they are used, for example, for primary packaging bags for infusion requiring extremely high gas barrier properties.

Furthermore, when gas barrier packaging materials include a substrate on which an inorganic oxide deposited layer or a gas barrier coating layer is laminated, and when these packaging materials have insufficient adhesion under severe conditions such as boiling or retort treatment, they have often suffered from delamination between the substrate and the inorganic oxide deposited layer, impairing the appearance, or suffered from deterioration in gas barrier properties in the delaminated portions, altering the contents.

The heat sterilization packaging bag according to the present embodiment can resolve these issues of the conventional art described above, with high transparency for viewing contents, and high gas barrier properties (oxygen barrier properties and water vapor barrier properties). Furthermore, the heat sterilization packaging bag according to the present embodiment can be applied to metal detectors, and in addition, can maintain high gas barrier properties (oxygen barrier properties and water vapor barrier properties) even after heat sterilization treatment such as boiling or retort sterilization and is less likely to cause bag breaking or delamination.

Referring to the drawings, the heat sterilization packaging bag of the present embodiment (which may also be termed packaging bag hereinafter) will be described below. It should be noted that components having the same or similar functions are designated with the same reference signs to omit repeated explanation.

Figure 4:
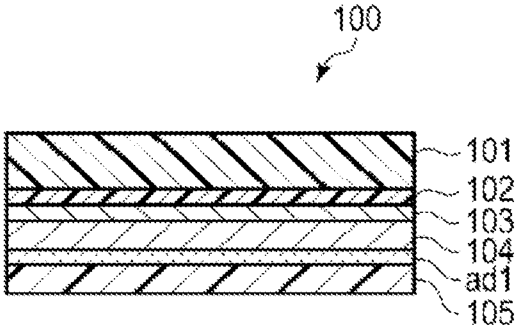
FIG. 4 is a schematic cross-sectional view illustrating an example of a packaging material forming a heat sterilization packaging bag according to an embodiment of the present invention.

As shown in FIG. 4, the packaging bag of the present embodiment may be formed of a packaging material (laminate 100) in which a substrate film 101, a primer layer 102, a silicon oxide deposited layer 103, a gas barrier coating layer 104, and a heat-sealing layer 105 are laminated in this order. The gas barrier coating layer 104 and the heat-sealing layer 105 can be bonded together via an adhesive layer ad1 formed of an adhesive for dry lamination.

Figure 5:
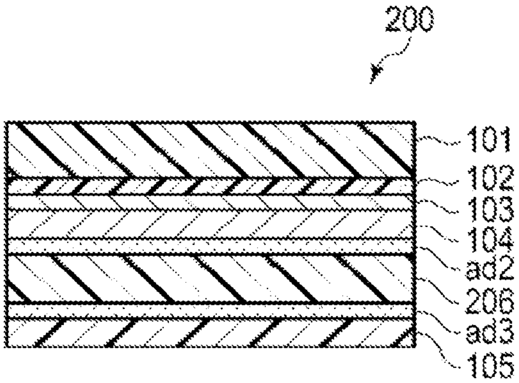
FIG. 5 is a schematic cross-sectional view illustrating another example of a packaging material forming a heat sterilization packaging bag according to an embodiment of the present invention.

As shown in FIG. 5, the packaging bag of the present embodiment may be formed of a packaging material (laminate 200) in which a polyamide film 206 is laminated between the gas barrier coating layer 104 and the heat-sealing layer 105. The gas barrier coating layer 104 and the polyamide film 206 can be bonded together via an adhesive layer ad2 formed of a dry lamination adhesive, and the polyamide film 206 and the heat-sealing layer 105 can be bonded together via an adhesive layer ad3 formed of an adhesive for dry lamination.

Hereinafter, materials of the substrate film 101 and the layers 102 to 106 forming the laminate of the present embodiment will be described, together with the methods of forming the layers.

Examples of the substrate film 101 used in the present embodiment may include polyester films such as of polyethylene terephthalate (PET) and polyethylene naphthalate (PEN), polyolefin films such as of polyethylenes and polypropylenes, polystyrene films, polyamide films such as of 6,6-nylon, and engineering plastic films such as polycarbonate films, polyacrylonitrile films, and polyimide films. The substrate film 101 may be either stretched or unstretched, and is preferred to have mechanical strength or dimensional stability. Of these films, in particular, the films optionally stretched in biaxial directions are preferably used. Furthermore, when considering cost, moisture barrier properties, filling adaptability, texture, and disposability on use as a packaging material, polyamide or polyester films are preferred, of which polyester films are more preferred. It should be noted that the substrate film 101 may be formed formulating various known additives or stabilizers, e.g., antistatic agents, plasticizers, lubricants, and antioxidants.

The thickness of the substrate film 101 is not particularly limited, but is preferred to be practically 3 μm to 200 μm, and more preferred to be 6 μm to 30 μm, from the perspective of adaptability as a packaging material and processability.

In order to enhance adhesion, the surface of the substrate film 101 may undergo corona treatment, plasma treatment, ozone treatment, or the like as preprocessing. Furthermore, the surface of the substrate may undergo chemical treatment, solvent treatment, or the like. In particular, plasma treatment is preferred in order to firmly adhere the surface of the substrate to the primer layer 102 to be laminated subsequently.

Next, the primer layer 102 will be described. The primer layer 102 is derived from the resin composition according to the first embodiment and contains a reaction product of an acrylic polyol, an isocyanate, and a silane coupling agent. The resin R in this case is an acrylic polyol and contains the repeating unit (a) having a partial structure expressed by General Formula (I) or (II).

In the present embodiment, the acrylic polyol is preferred to be a two- or three- or higher-dimensional copolymer further containing one or more repeating units different from the repeating unit (a). In this case, the content of the repeating unit (a) in the acrylic polyol is preferred to be in the range of 2 mol % to 50 mol % relative to all the repeating units in the acrylic polyol. If the content of the repeating unit (a) in the acrylic polyol is 2 mol % or more, thermal deterioration of the primer layer can be effectively suppressed.

Furthermore, if the content of the repeating unit (a) in the acrylic polyol is 50 mol % or less, the occurrence of yellowing when heated or cracking can be effectively suppressed, while maintaining the effect of suppressing thermal deterioration of the primer layer. From similar perspectives, the content of the repeating unit (a) in the acrylic polyol may be 2 mol % or more and 30 mol % or less, or more preferably 2 mol % or more and 20 mol % or less.

In the present embodiment, if the acrylic polyol is a copolymer, examples of the copolymer component that can be contained therein may include (meth)acrylate repeating units, olefin repeating units, halogen atom-containing repeating units, styrene repeating units, vinyl acetate repeating units, and vinyl alcohol repeating units.

Examples of the (meth)acrylate repeating units as a copolymer component may include repeating units derived from (meth)acrylate monomers having linear or branched alkyl groups in the side chain, and repeating units derived from (meth)acrylate monomers having hydroxy groups (except for phenolic hydroxyl groups) in the side chain.

Specific examples of the repeating units derived from (meth)acrylate monomers having linear or branched alkyl groups in the side chain may be similar to those mentioned in the first embodiment.

Specific examples of the (meth)acrylate repeating units having hydroxyl groups other than the phenolic hydroxyl groups in the side chain may be similar to those mentioned in the first embodiment.

Specific examples of the olefin repeating units as a copolymer component may be similar to those mentioned in the first embodiment.

Specific examples of the halogen atom-containing repeating units as a copolymer component may be similar to those mentioned in the first embodiment.

Specific examples of the styrene repeating units as a copolymer component may be similar to those mentioned in the first embodiment.

The copolymer may have a structure of any of random copolymer, alternating copolymer, block copolymer, and graft copolymer. If the structure of the copolymer is of a random copolymer, production processes may be facilitated. Therefore, a random copolymer is more preferable to other copolymers.

The polymerization method of obtaining a copolymer is as described in the first embodiment.

The isocyanate used in the primer layer 102 may be one having at least two or more NCO groups in a molecule. Examples of monomer isocyanates that can be used may include aromatic isocyanates such as tolylene diisocyanate (TDI) and diphenylmethane diisocyanate (MDI), aliphatic isocyanates such as hexamethylene diisocyanate (HDI), bisisocyanate methylcyclohexane (H6XDI), isophorone diisocyanate (IPDI), and dicyclohexylmethane diisocyanate (H12MDI), and aromatic-aliphatic isocyanates such as xylene diisocyanate (XDI) and tetramethylxylylene diisocyanate (TMXDI). Polymers or derivatives of these monomer isocyanates may also be used. Examples of such polymers or derivatives may include 3-dimer nurate type, adduct type reacted with 1,1,1-trimethylolpropane or the like, biuret type reacted with biuret, or other types. An isocyanate compound may be optionally selected from the above monomer isocyanates and polymers or derivatives thereof, and these materials may be used singly or in combination of two or more.

The silane coupling agent used for the primer layer 102 may be one having an epoxy group such as 3-glycidoxypropyltrimethoxysilane, one having an amino group such as 3-aminopropyltrimethoxysilane, one having a mercapto group such as 3-mercaptopropyltrimethoxysilane, one having an isocyanate group such as 3-isocyanatopropyltriethoxysilane, or the like. The silane coupling agents may be used singly or in combination of two or more.

The primer layer 102 is preferred to be applied with a thickness, which is generally a dry thickness, in the range of 0.005 μm to 5 μm, and more preferably 0.01 μm to 1 μm. If the thickness is less than 0.01 μm, a uniform coating is less likely to be obtained from the perspective of coating technique, and if it exceeds 1 μm, the coating tends to be uneconomical.

Next, the silicon oxide deposited layer 103 will be described. The silicon oxide deposited layer 103 can be formed, for example, using vacuum vapor deposition. In order to improve denseness and adhesion to the primer layer 102, the material may be deposited using a plasma assist method or ion beam assist method. Furthermore, using reactive deposition with a supply of oxygen gas, transparency of the silicon oxide deposited layer 103 to be formed can be further enhanced.

The thickness of the silicon oxide deposited layer 103 is preferred to be determined considering flexibility thereof as well as gas barrier properties. If the thickness of the silicon oxide deposited layer 103 is excessively small, it will be difficult to sufficiently serve as a gas barrier layer. If the thickness of the silicon oxide deposited layer 103 is excessively large, flexibility is not necessarily maintained due to the residual stress and thus cracking may occur due to the external factors after film formation. The silicon oxide deposited layer 103 with a thickness in the range of 5 nm to 300 nm may have sufficient gas barrier properties and flexibility. The thickness of the silicon oxide deposited layer 103 is more preferred to be 10 nm to 300 nm.

Next, the gas barrier coating layer 104 will be described. The gas barrier coating layer 104 is formed by preparing a coating liquid containing a component (a) described below as a main component with addition of a water-soluble polymer and a component (b) described below, and applying this coating liquid to form a coating film, followed by heating and drying, and hydrolysis of the components (a) and (b). The component (a) is added to improve flexibility while maintaining the gas barrier properties. The component (b) is added to improve water resistance.

It should be noted that there will be no problem if generally known catalysts, tin chloride, acetylacetonate, or the like are added to control hydrolysis of the components (a) and (b). Furthermore, considering adhesion to the adhesive, wettability, and prevention of cracking due to shrinkage, isocyanate compounds, clay minerals such as colloidal silica and smectite, and known additives such as stabilizers, colorants, and viscosity modifiers, and other materials can be added to the coating liquid as long as they do not impair gas barrier properties or water resistance.

In the silicon compound, (a) is a silicon compound or a hydrolysate thereof expressed by the following General Formula (III):

$$Si(OR^1)_4 \quad \text{(III)}$$

where $R^1$ represents $CH_3$, $C_2H_5$ or $C_2H_4OCH_3$, and (b) A silicon compound or a hydrolysate or a condensate thereof expressed by the following General Formula (IV):

$$(R^2Si(OR^3)_3)n \quad \text{(IV)}$$

where $R^2$ represents an organic functional group, and $R^3$ represents $CH_3$, $C_2H_5$ or $C_2H_4OCH_3$, and n represents 1 or more.

The component (a) is a main component of the gas barrier coating layer 104 and is a compound expressed by the above General Formula (III). For example, tetramethoxysilane and tetraethoxysilane can be exemplified.

The water-soluble polymer improves flexibility of the gas barrier coating layer 104 having the component (a) as a main component, while maintaining gas barrier properties thereof. Examples of the water-soluble polymer preferred to be used may include polyvinyl alcohols, starches, and celluloses. In particular, if a polyvinyl alcohol (termed PVA hereinafter) is used as a coating agent of the present embodiment, gas barrier properties may become highly superior. This is because PVA is a polymer containing the largest number of hydroxyl groups in the monomer unit, and thus can form very strong hydrogen bonds with the hydroxyl groups of the metal alkoxide after hydrolysis. The PVA herein can be obtained in general by saponification of polyvinyl acetate, and includes so-called partially saponified PVAs in which several tens of percent of the acetic acid groups remains and completely saponified PVAs in which only a few percent of the acetic acid groups remains. There are a variety of PVAs having molecular weight with a polymerization degree of 300 to several thousands, and PVAs with any molecular weight may be used without affecting the effect. However, PVAs having a high saponification degree and high molecular weight with a high polymerization degree are preferred in general because they have high water resistance.

The component (b) improves water resistance of the gas barrier coating layer 104 and may be a silicon compound expressed by the above General Formula (IV) or a hydrolysate thereof.

As the component (b), compounds in which the organic functional group $R^2$ is a non-aqueous functional group such as a vinyl group, epoxy group, methacryloxy group, ureido group, or isocyanate group can be used. Non-aqueous functional groups are hydrophobic functional groups, and thus water resistance can be further improved.

However, if the organic functional group ($R^2$) is a ureido group, the compound will have an issue of having an odor peculiar thereto, and if it is an isocyanate group, the compound will have an issue of having high reactivity and shortening of the pot life.

Also, if a compound having a 3-glycidoxypropyl group or 2-(3,4 epoxycyclohexyl) group is used as the organic functional group $R^2$, these organic functional groups may form hydrogen bonds with $Si(OR')_4$ expressed by General Formula (III) and with the water-soluble polymer, and therefore, voids are less likely to be formed in the barrier, thereby improving water resistance without impairing gas barrier properties. However, some of such epoxysilane compounds may have mutagenicity. Furthermore, if the organic functional group ($R^2$) is vinyl or methacryloxy, irradiation of UV beams, electron beams, or the like may be required in the process of production, increasing equipment and processes and further increasing cost.

If a trimer 1,3,5-tris(3-trialkoxysilylpropyl)isocyanurate expressed by the following General Formula (V) is used as the component (b), the compound can be free from these defects, improving water resistance and preventing deterioration in gas barrier properties.

$$(NCO{-}R^4Si(OR^3)_3)_3 \quad \text{(V)}$$

(where $R^4$ represents $(CH_2)n$, and $R^3$ represents $CH_3$, $C_2H_5$ or $C_2H_4OCH_3$, and n represents 1 or more.)

Specifically, this 1,3,5-tris(3-trialkoxysilylpropyl) isocyanurate is a condensate of 3-isocyanatopropyl alkoxysilane and is known to eliminate the chemical reactivity of the isocyanurate moiety by condensation, but to exhibit similar performance to the 3-isocyanatopropyl alkoxysilane before condensation due to the polarity of the nurate moiety. Accordingly, addition of 1,3,5-tris(3-trialkoxysilylpropyl)

isocyanurate can prevent swelling of the gas barrier coating layer 104 due to water and improve water resistance, similar to the addition of 3-isocyanatopropyl alkoxysilane. Furthermore, while 3-isocyanatopropyl alkoxysilane has high reactivity and low liquid stability, the nurate moiety, which is not water-soluble due to the polarity, is easy to disperse in an aqueous liquid and can stably keep the liquid viscosity to thereby exhibit water resistance performance comparable to 3-isocyanatopropyl alkoxysilane. Furthermore, in addition to the nurate moiety being water resistant, $Si(OR^1)_4$ and the water-soluble polymer having a hydroxyl group are less likely to form voids in the barrier due to the polarity and can prevent deterioration in gas barrier properties.

It should be noted that 1,3,5-tris(3-trialkoxysilylpropyl) isocyanurate can be produced using thermal condensation of 3-isocyanatopropyl alkoxysilane and may contain 3-isocyanatopropyl alkoxysilane of the base material; however, this poses no particular issue. More preferably, 1,3,5-tris(3-trimethoxysilylpropyl) isocyanurate may be added. 1,3,5-tris(3-trimethoxysilylpropyl) isocyanurate is practically advantageous because the methoxy group has a fast hydrolysis rate, and those containing propyl groups are available at comparatively low cost.

When the component (a) is converted to mass of $SiO_2$ and the component (b) is converted to mass of $R^2Si(OH)_3$, the solid content of $R^2Si(OH)_3$ relative to the total solid content (total of the components (a) and (b)) is preferred to be 1 mass % to 50 mass %. With this range, the gas barrier coating layer 104 obtained will have gas barrier properties with high water resistance without being deteriorated due to harsh treatment such as boiling or retort sterilization treatment. If the solid content is less than 1 mass %, the effect of water resistance tends to become low, and if it exceeds 50 mass %, gas barrier properties tend to deteriorate because the functional groups form voids in the gas barrier coating layer. In order to achieve higher water resistance and better gas barrier properties required for boiling and retort sterilization treatment, the above solid content is more preferred to be 5 mass % to 30 mass % relative to the total solid content.

Furthermore, when the component (a) is converted to mass of $SiO_2$ and the component (b) is converted to mass of $R^2Si(OH)_3$, and if the mixing ratio of the solid contents in a mass ratio is in the range of $SiO_2/(R^2Si(OH)_3$+water-soluble polymer)=100/100 to 100/30, flexibility due to coating flexibility can be sufficiently imparted when considered as a packaging material, in addition to water resistance and high gas barrier properties required for boiling or retort sterilization treatment.

The order of mixing these three components may be optional. Regardless of the mixing order, the effect can be exhibited. If the component (a) or (b) is present in the form of oil droplets without being dispersed in the coating liquid, these droplets are preferred to be hydrolyzed as described and finely dispersed. In particular, it is preferred that the components (a) and (b) are separately hydrolyzed and then added to the water-soluble polymer, from the perspective of fine dispersion of $SiO_2$ and hydrolysis efficiency of $Si(OR^1)_4$.

The dry thickness of the gas barrier coating layer 104 is not particularly limited, but is preferred to be 0.01 μm to 50 μm because the thickness exceeding 50 μm is likely to cause cracking.

A generally used coating method may be used as a method of forming the gas barrier coating layer 104. For example, a method such as dipping, roll coating, gravure coating, reverse coating, air knife coating, comma coating, die coating, screen printing, spray coating, gravure offset printing, or the like may be used.

The method of drying the coating film may be any of or a combination of two or more of hot air drying, hot roll drying, high frequency irradiation, infrared irradiation, UV irradiation, and the like as long as the gas barrier coating layer is heated to extract water molecules. With this drying, the components (a) and (b) are hydrolyzed to form a gas barrier coating layer 104 having gas barrier properties.

Next, the heat-sealing layer 105 will be described. As the heat-sealing layer 105, for example, an unstretched polyolefin film may be used. The thickness may be 5 μm to 300 μm. The thickness is more preferred to be 10 μm to 100 μm.

The heat-sealing layer 105 and the gas barrier coating layer 104 can be bonded together via an adhesive layer ad1 for dry lamination. The adhesive ad1 can be applied using roll coating, gravure coating, knife coating, dip coating, spray coating, or other coating methods. The coating amount is preferred to be about 0.1 $g/m^2$ to 5.0 $g/m^2$ (dry state).

Next, the polyamide film 206 will be described The polyamide film 206 improves pinhole resistance and impact resistance of the packaging bag, and 6-nylon, 6,6-nylon, MXD nylon, or the like, for example, can be used. A biaxially stretched polyamide film is preferred to be used, and the thickness may be 5 μm to 100 μm. The thickness is more preferred to be 10 μm to 50 μm. The polyamide film 206 and the gas barrier coating layer 104 can be bonded together via an adhesive layer ad2 for dry lamination. Also, the polyamide film 206 and the heat-sealing layer 105 can be bonded together via an adhesive layer ad3 for dry lamination.

According to the present embodiment, a silicon compound is used as a metal alkoxide for reaction with a water-soluble polymer having a hydroxyl group to fully insolubilize the gas barrier coating layer.

Specifically, the silicon compound is condensed after hydrolysis to form a ceramic film. However, since silicon oxide is hard and easily cracks due to distortion accompanying volume reduction during condensation, it is very difficult to form a coating of thin, transparent, and uniform condensation product on a film. Therefore, when forming a film, flexibility may be imparted to the ceramic film by adding a polymer to prevent the occurrence of cracking. Although the polymer may be visually uniformly added, it is in many cases microscopically separated into metal oxide parts and polymer parts, and thus is easy to form voids in the barrier which impair gas barrier properties. The expression voids in the barrier herein refers to portions not forming a dense network in the film and easily allowing gases to permeate therethrough.

Using a water-soluble polymer having a hydroxyl group as a polymer to use strong hydrogen bonds between the hydroxyl group of the polymer and the hydrolysate of the metal alkoxide, high gas barrier properties can be exhibited similar to those of ceramic, while dispersing the metal oxide well with the polymer during condensation and maintaining flexibility.

However, in this case also, the gas barrier coating layer, which is formed of a silicon compound and a water-soluble polymer and structured by hydrogen bonds, may swell with water and dissolve.

In this regard, the components (a) and (b) as a silicon compound are reacted with each other to prevent swelling of the gas barrier coating layer to significantly improve water resistance. Specifically, due to hydrolysis, the component (b) forms hydrogen bonds with the component (a) of the general formula and the water-soluble polymer, and accordingly, is less likely to allow voids to form in the barrier, while the organic functional groups form a network to prevent the water-soluble polymer from swelling due to addition of water to the hydrogen bonds, and significantly improve water resistance. Accordingly, the gas barrier coating layer 104 obtained by reaction of the components (a) and (b) and the water-soluble polymer has water resistance that can endure heat sterilization treatment such as retorting or boiling, in addition to having good gas barrier properties and flexibility.

In addition to this, the above gas barrier coating layer may be provided on the substrate film with the above silicon oxide deposited layer combined to achieve better gas barrier properties. Furthermore, the packaging bag of the present embodiment includes a primer layer, which contains an acrylic polyol having a partial structure expressed by General Formula (I) or (II), between the substrate film and the silicon oxide deposited layer. Therefore, even after boiling sterilization treatment and retort sterilization treatment, oxygen permeability, lamination strength, and the like are not deteriorated, and further, the deposited layer is resistant to separation from the substrate film.

Fifth Embodiment

A fifth embodiment of the present invention will be described below.

The resin composition of the present embodiment is a hard coating layer-forming composition containing the resin R which contains the repeating unit (a) having a partial structure expressed by General Formula (I) or (II) set forth above. The repeating unit (a) herein is derived from a monomer (B) described later.

Polarizer protective films for liquid crystal displays or protective films of circular polarizers used for organic EL displays or the like are provided with resin layers to provide various functions. Examples of such resin layers may include antistatic layers for imparting antistatic functions, antireflection layers for suppressing reflection, and hard coating layers for improving surface hardness. In particular, providing hard coating layers is indispensable in display applications. Such a hard coating layer is not only used as a single layer, but also used as an underlayer if an antireflection layer is laminated thereon, and plays an important role.

As the application of these polarizers spreads widely to liquid crystal TVs, notebook computers, and the like, they are increasingly required to have various characteristics, including an antireflection function with less reflection from fluorescent lights, antistatic function to prevent attachment of dust, antifouling function to wipe off fingerprints, and the like. When humans use notebook computers and the like, in particular, fingerprints, sebum, sweat, cosmetics, and other stains may often adhere to them. Generally, polarizers have large surface energy, and therefore, such steins are likely to adhere. Furthermore, antireflection films have surfaces with microasperities, and therefore, removal of stains is not easy. In addition, there has also been an issue that only the portions to which such stains have adhered become highly reflective and make the stains noticeable.

In order to solve these issues, there have been proposed various techniques of forming an antifouling layer, to which stains are less likely to adhere and from which stains, if adhered, are easy to wipe off, on the surface of an optical member.

For example, PTL 10 proposes an antifouling and abrasion resistant antireflective article which is provided with an antireflection film mainly made of silicon dioxide on the surface of the substrate, with the surface treated with a compound containing an organosilicon substituent group. PTL 11 proposes an antifouling and abrasion resistant CRT filter with the surface of the substrate similarly coated with terminal silanol organic polysiloxane. Also, PTL 12 proposes an antifouling and low reflective plastic with the surface provided with an antireflection film that contains mono and disilane compounds having polyfluoroalkyl groups, and a halogen, alkyl or alkoxy silane compound.

Furthermore, in order to improve performance such as hot water resistance, weather resistance, scratch resistance, and abrasion resistance depending on applications, various additives are generally mixed in hard coating layers. In a touch panel application, in particular, various environment resistances, such as heat resistance and water absorption resistance, are required. Therefore, additives are also required to have heat resistance which can sufficiently endure the processing temperatures or operating temperatures of the hard coating layer-forming compositions. For example, PTLs 13 to 15 disclose techniques for increasing the molecular weights of additives to enhance heat resistance thereof.

However, hard coating films of conventional art can satisfy neither of antifouling properties, such as fingerprint wiping properties, and high heat resistance. Also, the additives added to hard coatings for the purpose of functionalization are decomposed to some extent at high temperatures and thus it has been difficult to sufficiently exhibit the functions. Furthermore, thermal decomposition products of additives may often accelerate deterioration of the hard coatings. Under such circumstances, it has been desired to develop hard coating layer-forming compositions satisfying high heat resistance required in recent years.

The present embodiment has been made in light of such circumstances. According to the hard coating layer-forming composition of the present embodiment, a hard coating layer having good heat resistance, antifouling function, curl resistance, abrasion resistance, and surface hardness can be provided. Furthermore, the hard coating layer which is formed using the hard coating layer-forming composition of the present embodiment has high adhesion to the substrate, is easy to remove stains, and does not require to provide an antifouling layer. In addition, the characteristics of the hard coating layer will not be deteriorated, while constantly providing high visibility.

The present embodiment relates to a hard coating layer-forming composition and a hard coating film which are used for the purpose of protecting surfaces of displays such as cathode ray tube displays (CRTs), liquid crystal displays (LCDs), plasma display panels (PDPs), and field emission displays (FEDs). More specifically, the present embodiment relates to a hard coating layer-forming composition and a hard coating film which have high adhesion to the substrate and can impart good heat resistance and antifouling properties, as well as curl resistance, scratch resistance, and surface hardness, to an article.

As a result of studying imparting antifouling properties to the hard coating layer on a transparent substrate, the present inventors have found that the above issues of the conventional art can be resolved using a hard coating layer-forming composition which contains materials of a specific polyfunctional (meth)acrylic monomer (A), a monomer (B) having a partial structure expressed by the above General Formula (I) or (II), a photoradical polymerization initiator (C), a fluorine-containing compound (D) having a polymerizable group, and a non-polymerizable additive (E). In the hard coating layer-forming composition of the present embodiment, the mixing ratio of the non-polymerizable additive (E) is adjusted to a specific range.

Referring to the drawings, the hard coating layer-forming composition of the present embodiment will be described in detail.

The polyfunctional (meth)acrylic monomer (A) forming the hard coating layer-forming composition of the present embodiment is preferred to be a compound that is an esterified product of a (meth)acrylic acid in which the number of alcoholic hydroxyl groups of the polyalcohol is two or more in one molecule. Other monomers that can also be used may be ones in which reactive acrylic groups are bonded to an acrylic resin framework, or ones in which acrylic groups are bonded to a rigid framework such as of a polyester acrylate, urethane acrylate, epoxy acrylate, polyether acrylate, melamine, and isocyanuric acid. In particular, use of urethane (meth)acrylate monomers and/or oligomers can significantly improve the hardness and flexibility of the hard coating layer.

In the present specification, (meth)acrylic monomers refer to both of acrylic monomers and methacrylic monomers. For example, polyfunctional (meth)acrylic monomers refer to both of polyfunctional acrylic monomers and polyfunctional methacrylic monomers. Furthermore, the (meth)acrylic monomer (A) and the monomer (B) having a partial structure expressed by General Formula (I) or (II) of the present embodiment may be oligomers.

Preferred urethane acrylate used as the polyfunctional (meth)acrylic monomer (A) in the present embodiment may include, in general, those which are easily formed by reacting acrylate monomers having hydroxyl groups with products obtained by reacting polyester polyols with isocyanate monomers or prepolymers. Specific examples of the urethane acrylate that can be used may include pentaerythritol triacrylate hexamethylene diisocyanate urethane prepolymer, dipentaerythritol pentaacrylate hexamethylene diisocyanate urethane prepolymer, pentaerythritol triacrylate toluene diisocyanate urethane prepolymer, dipentaerythritol pentaacrylate toluene diisocyanate urethane prepolymer, pentaerythritol triacrylate isophorone diisocyanate urethane prepolymer, and dipentaerythritol pentaacrylate isophorone diisocyanate urethane prepolymer. These monomers may be used singly or in combination of two or more. Furthermore, these monomers may be monomers in a coating liquid, or may be oligomers with partial polymerization.

Commercially available polyfunctional acrylic monomers may include products from Mitsubishi Chemical Corporation [product name: SHIKOH series, etc.], Shin-Nakamura Chemical Co., Ltd. [product name: NK Ester series, etc.], DIC Corporation [product name: LUXYDIR series, etc.], Toagosei Co., Ltd. [product name: Aronix series, etc.], NOF Corporation [product name: Blemmer series, etc.], Nippon Kayaku Co., Ltd. [product name: KAYARAD series, etc.], and Kyoeisha Chemical Co., Ltd. [product name: LIGHT ESTER series, LIGHT ACRYLATE series, etc.].

The hard coating layer-forming composition of the present embodiment contains the monomer (B) having a partial structure expressed by General Formula (I) or (II) set forth above. As described above, the repeating unit (a) is derived from the monomer (B).

Examples of the monomer (B) having a partial structure expressed by General formula (I) or (II) may include (meth) acrylate monomers, (meth)acrylamide monomers, N-substituted maleimide monomers, and styrene monomers.

If the monomer (B) having a partial structure expressed by General formula (I) or (II) is a (meth)acrylate monomer, examples of which may include 4-methoxyphenyl (meth) acrylate, 4-hydroxyphenyl (meth)acrylate, 2,6-di-tert-butylphenyl (meth)acrylate, 2,6-di-tert-butyl-4-methoxyphenyl (meth)acrylate, 2-tert-butyl-4-hydroxyphenyl (meth) acrylate, 3-tert-butyl-4-hydroxyphenyl (meth)acrylate, 2,6-di-tert-butyl-4-methylphenyl (meth)acrylate, 2-hydroxy-4-tert-butylphenyl (meth)acrylate, and 2,4-di-methyl-6-tert-butylphenyl (meth)acrylate.

If the monomer (B) having a partial structure expressed by General formula (I) or (II) is a (meth)acrylamide monomer, examples may include N-(4-hydroxyphenyl) (meth) acrylamide.

If the monomer (B) having a partial structure expressed by General formula (I) or (II) is an N-substituted maleimide monomer, examples may include 4-hydroxyphenyl maleimide and 3-hydroxyphenyl maleimide.

If the monomer (B) having a partial structure expressed by General formula (I) or (II) is a styrene monomer, examples of which may include α-methyl-p-hydroxystyrene.

The usage ratio of the polyfunctional (meth)acrylic monomer (A) is preferred to be 1 mass % to 99 mass %, and is more preferred to be 50 mass % or more and 95 mass % or less, relative to the total mass of the polyfunctional (meth) acrylic monomer (A) and the monomer (B) having a partial structure expressed by General formula (I) or (II). If the usage ratio of the polyfunctional (meth)acrylic monomer (A) is less than 50 mass %, the ratio may be unsatisfactory from the perspective of obtaining a hard coating layer having sufficient hardness, causing disadvantages such as decrease in pencil hardness of the hard coating layer to be formed. If the usage ratio of the polyfunctional (meth)acrylic monomer (A) exceeds 95 mass %, the polyfunctional (meth)acrylic monomer (A) may cure and shrink, causing disadvantages such as large curling of the hard coating film toward the cured side. In addition, due to the small usage ratio of the monomer (B) having a partial structure expressed by General Formula (I) or (II), compatibility of the fluorine-containing compound (D) having a polymerizable group may become insufficient, the coating liquid may undergo turbidity, and precipitation may occur, and thus, this usage ratio may be unsatisfactory from the perspective of obtaining a hard coating composition having good storage stability.

The photoradical polymerization initiator (C) forming the hard coating layer-forming composition of the present embodiment is preferred to be a compound that generates radicals when irradiated with ionizing radiation and initiates polymerization reaction of the acrylic monomer.

Specific examples of the photoradical polymerization initiator (C) that can be used may include carbonyl compounds such as acetophenone, 2,2-diethoxyacetophenone, p-dimethylacetophenone, p-dimethyl aminopropiophenone, benzophenone, 2-chlorobenzophenone, 4,4'-dichlorobenzophenone, 4,4'-bisdiethylaminobenzophenone, Michler's ketone, benzyl, benzoin, benzoin methyl ether, benzoin ethyl ether, benzoin isopropyl ether, p-isopropyl-α-hydroxyisobutylphenone, α-hydroxyisobutylphenone, 2,2-dimethoxy-2-phenylacetophenone, and 1-hydroxycyclohexylphenylketone, and sulfur compounds such as tetramethylthiuram monosulfide, tetramethylthiuram disulfide, thioxanthone, 2-chlorothioxanthone, and 2-methylthioxanthone. These photopolymerization initiators may be used singly or in combination of two or more.

The appropriate amount of use of the photoradical polymerization initiator (C) may be 0.01 mass % or more and 10 mass % or less relative to the total mass of the polyfunctional (meth)acrylic monomer (A) and the monomer (B) having a partial structure expressed by General Formula (I)

or (II) of the hard coating layer-forming composition. If the amount of use is less than 0.01 mass %, curing reaction will not sufficiently progress when the composition is irradiated with ionizing radiation, and if it exceeds 10 mass %, the ionizing radiation will not sufficiently reach the lower part of the hard coating layer.

If a fluorine-based additive is added to the fluorine-containing compound (D) having a polymerizable group and forming the hard coating layer-forming composition of the present embodiment, antifouling properties can be imparted to the surface of the hard coating layer. If a fluorine-based additive is added to the fluorine compound having no polymerizable group, the additive may float on the surface of the hard coating layer and may be removed when the surface is wiped with a cloth or the like. Therefore, this may cause a disadvantage that the antifouling properties are lost once the surface is wiped with a cloth or the like. In the present embodiment, the fluorine compound having antifouling properties is permitted to have a polymerizable group, so that the fluorine-based additive can be polymerized together when forming the hard coating layer, which is advantageous in that antifouling properties can be maintained even when the surface is wiped with a cloth or the like.

The polymerizable group of the fluorine-containing compound (D) is more preferred to be a (meth)acrylate group. This is because the fluorine-containing compound (D) having a polymerizable group can copolymerize with a polyfunctional (meth)acrylate compound and thus high hardness can be achieved due to radical polymerization using ionizing radiation.

The fluorine-containing compound (D) having a polymerizable group of the present embodiment may include OPTOOL DAC (manufactured by Daikin Industries, Ltd.) and Defenser TF3001, Defenser TF3000, and Defenser TF3028 (manufactured by DIC Corporation).

The appropriate amount of use of the fluorine-containing compound (D) having a polymerizable group of the present embodiment may be 0.01 mass % to 10 mass % relative to the total mass of the polyfunctional (meth)acrylic monomer (A) and the monomer (B) having a partial structure expressed by General Formula (I) or (II) of the hard coating layer-forming composition. If the amount of use is less than 0.01 mass %, sufficient antifouling properties may not be exhibited and the surface energy may become larger than 20 mN/m. If the amount of use exceeds 10 mass %, compatibility with the polymerizable monomer and the solvent may become poor, and thus, turbidity or precipitation may occur in the coating liquid, leading to disadvantages such as the occurrence of defects in the coating liquid or the hard coating layer.

In the present embodiment, the content of the monomer (B) having a partial structure expressed by General Formula (I) or (II) is preferred to be in the range of 2 mol % or more and 50 mol % or less relative to the sum of the (meth)acrylic monomer (A) and the fluorine-containing compound (D) having a polymerizable group. If the content of the monomer (B) having a partial structure expressed by General Formula (I) or (II) is 2 mol % or more, thermal decomposition of the hard coating film and the additive combined may be effectively suppressed.

Furthermore, if the content of the monomer (B) having a partial structure expressed by General Formula (I) or (II) is 50 mol % or less, the occurrence of yellowing of the resin when heated can be effectively suppressed, or the resin can be effectively prevented from becoming hard and brittle, while maintaining the effect of suppressing thermal decomposition of the resin and the additive combined. From similar perspectives, the content of the monomer (B) having a partial structure expressed by General Formula (I) or (II) may be 2 mol % or more and 30 mol % or less, or more preferably 2 mol % or more and 20 mol % or less.

In the present embodiment, a non-polymerizable additive (E) such as a coating properties improver, defoamer, thickener, antistatic agent, inorganic particles, organic particles, organic lubricant, organic polymer compound, UV absorber, light stabilizer, dye, pigment, or stabilizer may be added further as a modifier of the hard coating layer. These additives can be used as composition components of the coating layer forming the hard coating layer as long as the reaction due to active energy ray irradiation is not impaired to thereby improve the characteristics of the hard coating layer, depending on the applications. The mixing ratio of the non-polymerizable additive (E) may be 50 mass % or less relative to the total mass of the components other than the solvent of the hard coating layer-forming composition. Specific examples of the non-polymerizable additive (E) may be similar to those shown in Table 1 in the first embodiment.

An appropriate method of curing the hard-coating layer-forming composition of the present embodiment may be a method in which active rays, or in particular, UV rays, are applied to the composition, i.e., curing can be achieved by irradiating the hard coating layer-forming composition with UV rays with the addition of a photoradical polymerization initiator to the composition. In the UV ray irradiation, the rays may have a wavelength of 400 nm or less. Examples of the rays may include ultra-high pressure mercury lamp, high pressure mercury lamp, medium pressure mercury lamp, low pressure mercury lamp, xenon lamp, and halogen lamp. A heating process may be added as necessary.

It is preferred that a thermal polymerization inhibitor such as hydroquinone, hydroquinone monomethyl ether, or 2,5-t-butyl hydroquinone is added to the hard coating layer-forming composition of the present embodiment in order to prevent thermal polymerization during production or dark reaction during storage. The amount of the thermal polymerization inhibitor to be added is preferred to be 0.005 mass % to 0.05 mass % relative to the solid content of the hard coating layer-forming composition.

Figure 6:
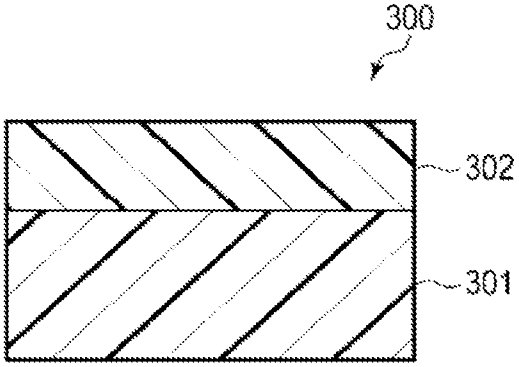
FIG. 6 is a schematic cross-sectional view illustrating an example of a hard coating film according to an embodiment of the present invention.

FIG. 6 is a cross-sectional view illustrating a hard coating film according to an embodiment of the present invention. As shown in FIG. 6, a hard coating film 300 of the present embodiment includes a hard coating layer 302 on a transparent substrate 301. The hard coating layer 302 is formed by applying the hard coating layer-forming composition of the present embodiment onto the transparent substrate 301.

As a method of applying the hard coating layer-forming composition, a known coating method using a bar coater, applicator, doctor blade, roll coater, die coater, comma coater, or the like can be used. In this case, a solvent may be added, as necessary, to the hard coating layer-forming composition. The solvent that can be used may be methyl isobutyl ketone, cyclohexanone, acetone, methyl ethyl ketone, diethyl ketone, dipropyl ketone, cyclopentanone, methylcyclohexanone, ethylcyclohexanone, 2-butanone, ethyl formic acid, propyl formic acid, n-pentyl formic acid, methyl acetate, ethyl acetate, methyl propionate, ethyl propionate, n-pentyl acetate, and γ-butyrolactone, isobutyl acetate, butyl acetate, toluene, xylene, 2-propanol, 1-butanol, cyclopentanol, diacetone alcohol, ethylene glycol monomethyl ether, propylene glycol monomethyl ether, dibutyl ether, dimethoxymethane, dimethoxyethane, diethoxyethane, propylene oxide, dioxane, dioxolane, trioxane, tetrahydrofuran, anisole, phenetol, methyl cellosolve, cellosolve, butyl cellosolve, cellosolve acetate, dichloromethane, trichloromethane, trichloroethylene, ethylene chloride, trichloroethane, tetrachloroethane, N, N-dimethylformamide, or chloroform. It should be noted that the solvent is not limited to one type, but two or more solvents may be mixed and used as a solvent mixture.

The transparent substrate 301 is preferred to be a film-like substrate having transparency, and may have appropriate transparency and physical strength as a substrate. Examples of the films that can be used may include those which are made of polyethylene terephthalate (PET), triacetyl cellulose (TAC), diacetylcellulose, acetyl cellulose butyrate, polyethylene naphthalate (PEN), cycloolefin polymer, polyimide, polyether sulfone (PES), polymethylmethacrylate (PMMA), and polycarbonate (PC). Of these materials, if the hard coating film is provided on the front surface of a liquid crystal display, triacetyl cellulose (TAC) is preferred to be used due to having no optical anisotropy.

The hard coating film 300 of the present embodiment includes the hard coating layer 302 as an outermost layer. In this case, the hard coating film 300 of the present embodiment is preferred to have surface energy of 20 mN/m or less on the surface of the hard coating layer 302.

Surface free energy can be used as an index when evaluating antifouling properties of the surface of the hard coating layer 302, i.e., the presence or absence and the level of antifouling properties on the hard coating surface can be estimated based on the surface free energy. The surface free energy can be calculated from a contact angle on the surface of the hard coating layer using Extended Fowkes' Formula. As this value becomes smaller, the surface may have better antifouling properties. The hard coating film 300 of the present embodiment, which has surface free energy of 20 mN/m or less, has high antifouling properties.

Furthermore, in the hard coating film 300 of the present embodiment, the surface free energy on the surface of the hard coating layer is preferred to be 15 mN/m or more. As the value of the surface free energy becomes smaller, the hard coating film may have higher antifouling properties. However, if the surface free energy on the surface of the hard coating layer is less than 15 mN/m, a significant amount of the fluorine-containing compound (D) having a polymerizable group is required be added. In this case, the hard coating layer-forming composition may be bleached and the hard coating film to be formed may become whitish, and therefore, the hard coating film to be obtained will not be necessarily suitable for provision to the display surface.

The thickness of the hard coating layer 302 to be obtained by coating is determined depending on the hardness required; however, the thickness is preferred to be 3 μm to 30 μm, and is more preferred to be 5 μm to 25 μm. If the thickness is less than 3 μm, sufficient hardness is not necessarily obtained, and if it exceeds 30 μm, the transparent substrate may be significantly curled due to curing and shrinkage of the hard coating layer 302, causing breaking or the like in the subsequent process.

As necessary, the hard coating film 300 of the present embodiment is provided with a functional layer. The functional layer may be provided between the transparent substrate 301 and the hard coating layer 302, or on the surface of the transparent substrate facing away from the surface provided with the hard coating layer 302. Such functional layers may include an antireflection layer, antistatic layer, antiglare layer, electromagnetic wave shielding layer, infrared absorption layer, UV absorption layer, and color correction layer. These functional layer may be used singly, or a plurality of layers with different functions may be combined. The hard coating film in which a hard coating layer is formed on the transparent substrate 301, and the hard coating film in which these functional layers are further provided can be bonded to, for example, the surfaces of various displays such as liquid crystal displays, plasma displays, and CRT displays, and thus, displays having good scratch resistance and antifouling properties can be provided.

EXAMPLES

First Embodiment

<Synthesis of Resin (Group a)>

Synthesis Example 1: Synthesis of Resin P-1a 80 parts by mass of cyclohexanone was used as a polymerization solvent. Furthermore, 85 parts by mass of methyl methacrylate (MMA) and 15 parts by mass of 4-methoxyphenyl methacrylate (MPhMA) were used as acrylic monomers. Also, 0.22 parts by mass of benzoyl peroxide (BPO) was used as a polymerization initiator. These materials were placed in a reaction vessel equipped with a stirrer and a reflux tube, and stirred and refluxed for 8 hours while being heated to 80° C. with an introduction of nitrogen gas into the reaction vessel. Thus, a polymer solution containing an acrylic copolymer formed of a repeating unit derived from MMA and a repeating unit derived from MPhMA was obtained. The obtained polymer solution was dripped into a large amount of methanol for reprecipitation purification, and dried under reduced pressure for 24 hours at room temperature to obtain Resin P-1a shown below.

Synthesis of Resin P-2a

Resin P-2a shown below was obtained as in Synthesis Example 1 except that 4-hydroxyphenyl methacrylate (HPMA) was used instead of 4-methoxyphenyl methacrylate (MPhMA).

Synthesis of Resin P-3a

Resin P-3a shown below was obtained as in Synthesis Example 1 except that N-(4-hydroxyphenyl) methacrylamide (HPMAA) was used instead of 4-methoxyphenyl methacrylate (MPhMA).

Synthesis of Resin P-4a

Resin P-4a shown below was obtained as in Synthesis Example 1 except that 4-hydroxymaleimide (HPhMI) was used instead of 4-methoxyphenyl methacrylate (MPhMA).

Synthesis of Resin P-101a

For comparison, Resin P-101a shown below was obtained as in Synthesis Example 1 except that no 4-methoxyphenyl methacrylate (MPhMA) was used.

Synthesis of resin P-102a

For comparison, Resin P-102a shown below was obtained as in Synthesis Example 1 except that phenyl methacrylate (PhMA) was used instead of 4-methoxyphenyl methacrylate (MPhMA).

Synthesis of Resin P-103a

For comparison, Resin P-103a shown below was obtained as in Synthesis Example 1 except that styrene (St) was used instead of 4-methoxyphenyl methacrylate (MPhMA).

<Chemical Formula 5>

P-1a

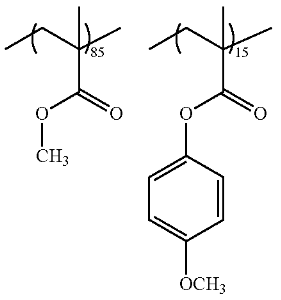

P-2a

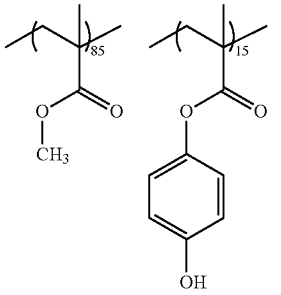

P-3a

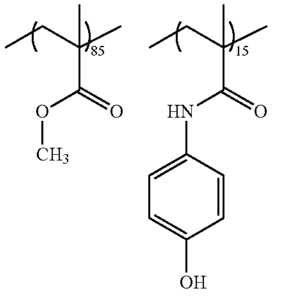

P-4a

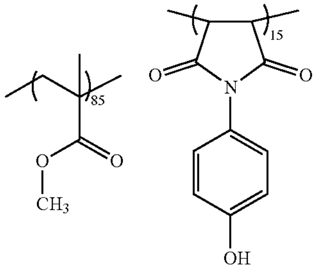

P-101a

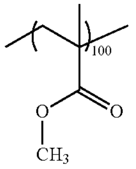

P-102a

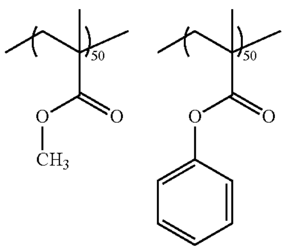

-continued

P-103a

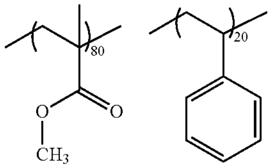

<Evaluation>

(Evaluation 1) Heat Resistance Evaluation of Resin

For the resins synthesized above, mass reduction ratio (%) in atmospheric air and nitrogen atmosphere was measured. For measurement of mass reduction ratio (%), a differential heat thermal mass simultaneous measurement device (STA 7000 manufactured by Hitachi High-Tech Science Corporation) was used. Each sample was placed in atmospheric air or nitrogen atmosphere and heated at 250° C. for 20 minutes, and a mass ($M_1$) after heating was subtracted from an initial mass ($M_0$) before heating, followed by dividing the subtracted mass reduction ($M=M_0-M_1$) by the initial mass ($M_0$) to calculate a mass reduction ratio ($[M/M_0]\times 100$) (%). Lower mass reduction ratio means that better heat resistance has been exhibited.

An evaluation A was given if the mass reduction ratio was less than 20% in the measurement under both the atmosphere and nitrogen atmosphere, and an evaluation B was given if the mass reduction ratio was 20% or more in the measurement under either or both of the atmosphere and nitrogen atmosphere. The results are shown in Table 3.

(Evaluation 2) Evaluation of Thermal Deterioration Suppression Ability for Additive A resin solution was prepared by dissolving 20 parts by mass of the obtained resin in 80 parts by mass of cyclohexanone. 0.1 part by mass of a hindered amine light stabilizer (product name: Tinuvin (trademark) 123 manufactured by BASF Japan Ltd.) or a cyanine pigment with a structure represented by the following Formula (1) and having tris(pentafluoroethyl)trifluorophosphate (FAP) on the counter anion was added, as an additive, to the obtained resin solution. The resin solution was applied onto a glass substrate using spin coating, followed by heating and drying on a hot plate which was set to 200° C. for 10 minutes to form a coating film with a thickness of 1 μm.

The glass substrate on which the coating film was formed was heated at 250° C. for 10 minutes to measure a residual ratio of the additive in the coating film. The glass substrate was cut to a size of 1 $cm^2$ and immersed in 1.5 mL of acetone to perform extraction for 60 minutes in an ultrasonic cleaner. The additive in the glass substrate extract was quantified through ultra high performance liquid chromatography/mass spectrometry (UHPLC/MS) (using ultra high liquid chromatograph/mass spectrometer (UHPLC/MS), 1260 LC System/6130B Single Quad MS System manufactured by Agilent Technologies Inc.). The amount of additive ($V_1$) remaining after heating was divided by the initial amount of additive ($V_0$) before heating to calculate a residual ratio of additive ($[V_1/V_0]\times 100$)(%). Higher residual ratio of additive means that superior thermal deterioration suppression ability has been exhibited for the additive.

An evaluation A was given if the residual ratio of additive was 90% or more in the measurement of both of the resin composition to which the hindered amine light stabilizer was added and the resin composition to which the cyanine pigment was added, and an evaluation B was given if the residual ratio of additive was less than 90% in the measurement of either or both of the resin compositions. The results are shown in Table 3.

<Chemical Formula 6>

(1)

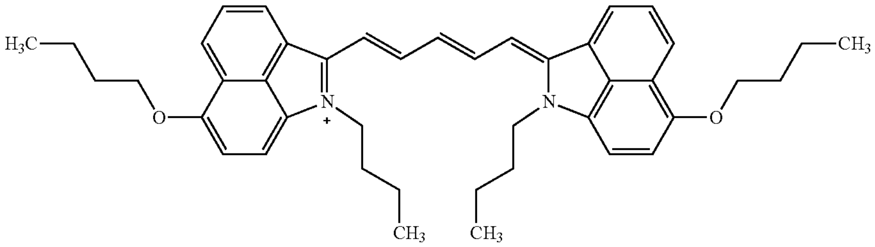

TABLE 3

| | | | | MRR | | | RRA | | |
|---|---|---|---|---|---|---|---|---|---|
| Ex. | Resin | Comp. | Structure | AP [%] | $N_2$ [%] | E1 | Tinuvin 123 [%] | Pigment [%] | E2 |
| 101-a | P-1a | MMA/ MPhMA = 85/15 | 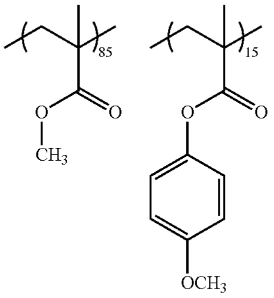 | 13.5 | 10.8 | A | 91 | 92 | A |
| 102-a | P-2a | MMA/ HPMA = 85/15 | 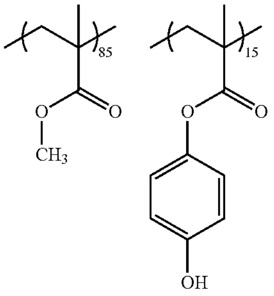 | 12.1 | 11 | A | 90 | 93 | A |
| 103-a | P-3a | MMA/ HPMAA = 85/15 | 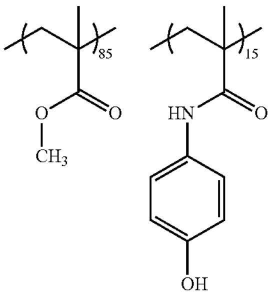 | 13.6 | 12.5 | A | 92 | 91 | A |

TABLE 3-continued

| | | | | MRR | | | RRA | | |
|---|---|---|---|---|---|---|---|---|---|
| Ex. | Resin | Comp. | Structure | AP [%] | $N_2$ [%] | E1 | Tinuvin 123 [%] | Pigment [%] | E2 |
| 104-a | P-4a | MMA/ HPhMI = 85/15 | 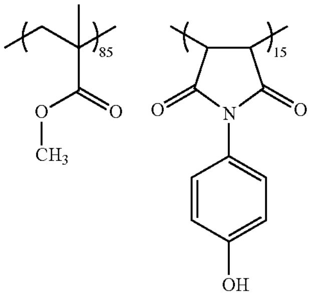 | 11.2 | 10.1 | A | 92 | 90 | A |
| 101C-a | P-101a | PMMA | 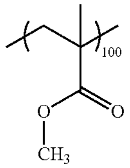 | 28.2 | 7.2 | B | 75 | 60 | B |
| 102C-a | P-102a | MMA/ PhMA = 50/50 | 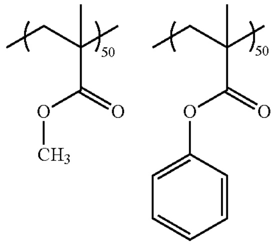 | 2.3 | 20.7 | B | 82 | 85 | B |
| 103C-a | P-103a | MMA/St = 80/20 | 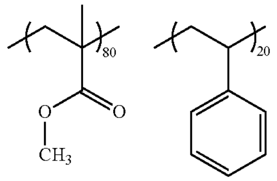 | 21 | 15 | B | 66 | 70 | B |

MRR = Mass Reduction Ratio
RRA = Residual Ratio of Additive
E = Evaluation
AP = Atmospheric Pressure <Synthesis of Resin (Group b)>

Synthesis Example 2: Synthesis of Resin P-1b 20 mL of methanol solution containing 50 mass % of 4-methoxyphenyl methacrylate (MPhMA) and 1 g of t-butyl hydroperoxide as a polymerization initiator were dissolved in an autoclave reactor with an internal volume of 300 mL. After deaerating the inside of the reactor, ethylene gas was introduced into the reactor to produce a copolymer at a pressure of 100 bar and a polymerization temperature of 175° C. The obtained copolymer was dissolved in xylene for reprecipitation purification with methanol to obtain Resin P-1b shown below.

Synthesis of Resin P-2b

Resin P-2b shown below was obtained as in Synthesis Example 2 except that 4-hydroxyphenyl methacrylate (HPMA) was used instead of 4-methoxyphenyl methacrylate (MPhMA).

Synthesis of Resin P-101b

For comparison, Resin P-101b shown below was obtained as in Synthesis Example 2 except that no 4-methoxyphenyl methacrylate (MPhMA) was used.

Synthesis of Resin P-102b

For comparison, Resin P-102b shown below was obtained as in Synthesis Example 2 except that benzyl methacrylate (BzMA) was used instead of 4-methoxyphenyl methacrylate (MPhMA).

<Chemical Formula 7>

P-1b

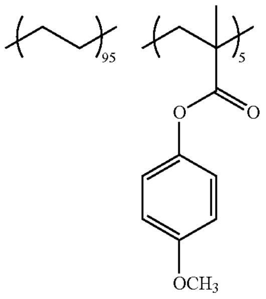

P-2b

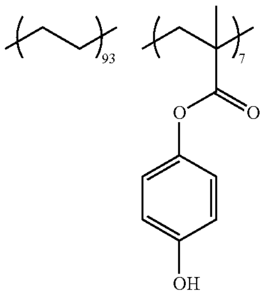

P-101b

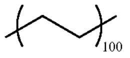

P-102b

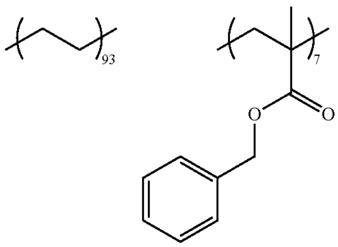

(Evaluation 3) Heat Resistance Evaluation of Resin

The resins synthesized above were evaluated on heat resistance using a method as in Evaluation 1. The results are shown in Table 4.

(Evaluation 4) Evaluation of Thermal Deterioration Suppression Ability for Additive 1 g of each resin synthesized above was mixed with 0.01 g of a hindered amine light stabilizer (product name: Tinuvin 123 manufactured by BASF Japan Ltd.) or a cyanine pigment with a structure represented by the above Formula (1) and having tris(pentafluoroethyl)trifluorophosphate (FAP) on the counter anion, as an additive. The obtained mixture of the resin and the additive was placed on the glass substrate and the glass substrate was heated on a hot plate at 200° C. for 10 minutes. An aluminum block heated to 200° C. was placed on the molten mixture and pressed at 20 kgf for 10 seconds, followed by quenching to room temperature. The pressed sheet-like mixture was separated from the glass substrate and immersed in 1.5 mL of acetone to perform extraction for 60 minutes in an ultrasonic cleaner. The additive in the glass substrate extract was quantified through ultra high performance liquid chromatography/mass spectrometry (UHPLC/MS) (using ultra high liquid chromatograph/mass spectrometer (UHPLC/MS), 1260 LC System/6130B Single Quad MS System manufactured by Agilent Technologies Inc.). The amount of additive ($V_1$) remaining after heating was divided by the initial amount of additive ($V_0$) before heating to calculate a residual ratio of additive ($[V_1/V_0]\times100$)(%). Higher residual ratio of additive means that superior thermal deterioration suppression ability has been exhibited for the additive.

An evaluation A was given if the residual ratio of additive was 90% or more in the measurement of both of the resin composition to which the hindered amine light stabilizer was added and the resin composition to which the cyanine pigment was added, and an evaluation B was given if the residual ratio of additive was less than 90% in the measurement of either or both of the resin compositions. The results are shown in Table 4.

TABLE 4

| | | | | MRR | | | RRA | | |
|---|---|---|---|---|---|---|---|---|---|
| Ex. | Resin | Comp. | Structure | AP [%] | $N_2$ [%] | E3 | Tinuvin 123 [%] | Pig-ment [%] | E4 |
| 101-b | P-1b | PE/ MPhMA = 95/5 | 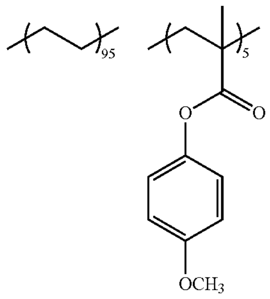 | 10.1 | 15.8 | A | 93 | 90 | A |

TABLE 4-continued

| | | | | MRR | | | RRA | | |
|---|---|---|---|---|---|---|---|---|---|
| | | | | | | | Tinuvin | | |
| Ex. | Resin | Comp. | Structure | AP [%] | $N_2$ [%] | E3 | 123 [%] | Pig-ment [%] | E4 |
| 102-b | P-2b | PE/ HPMA = 93/7 | 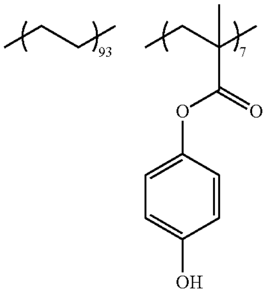 | 8.6 | 12.6 | A | 91 | 92 | A |
| 101C-b | P-101b | PE | 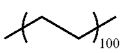 | 11.2 | 25 | B | 76 | 68 | B |
| 102C-b | P-102b | PE/ BzMA = 93/7 | 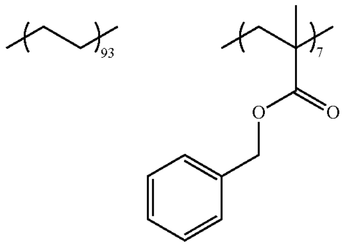 | 15.2 | 30 | B | 66 | 50 | B |

MRR = Mass Reduction Ratio
RRA = Residual Ratio of Additive
E = Evaluation
AP = Atmospheric Pressure <Synthesis of Resin (Group c)>

Synthesis Example 3: Synthesis of Resin P-1c 0.1 g of potassium persulfate, 1.0 g of sodium lauryl sulfate, 12 mL of 10% aqueous solution of partially saponified polyvinyl alcohol (polymerization degree 500, saponification degree 98.6%), and 50 mL of water were dissolved in an autoclave reactor with an internal volume of 300 mL. 25 g of vinyl chloride monomer was added and reacted at 45° C. for 7 hours to obtain an emulsion. The emulsion was freeze-dried to collect the vinyl chloride precipitate which was washed with warm water, followed by drying under reduced pressure. The obtained powder was dissolved in tetrahydrofuran to filtrate and remove polyvinyl alcohol that was insoluble matter. The tetrahydrofuran solution was poured into a large amount of methanol and the precipitate was filtrated and removed to obtain polyvinyl chloride (PVC).

0.8 g of the obtained PVC was dissolved in 10 mL of cyclohexanone with the addition of 0.2 g of 4-hydroxyphenyl methacrylate (HPMA) and 0.02 g of benzoyl peroxide, followed by reaction at 80° C. for 8 hours under nitrogen atmosphere. The obtained reaction solution was poured into a large amount of methanol for filtration and removal of the precipitate to obtain a polyvinyl chloride graft copolymer P-1c containing a repeating unit shown below.

Synthesis of Resin P-2c

A polyvinyl chloride graft copolymer P-2c containing a repeating unit shown below was obtained as in Synthesis Example 3 except that N-(4-hydroxyphenyl) methacrylamide (HPMAA) was used instead of 4-hydroxyphenyl methacrylate (HPMA).

Synthesis of Resin P-3c

A polyvinyl chloride graft copolymer P-3c containing a repeating unit shown below was obtained as in Synthesis Example 3 except that 4-methoxyphenyl methacrylate was used instead of 4-hydroxyphenyl methacrylate (HPMA).

Synthesis of Resin P-101c

For comparison, a polyvinyl chloride graft copolymer P-101c containing a repeating unit shown below was obtained as in Synthesis Example 3 except that vinyl acetate (VAc) was used instead of 4-hydroxyphenyl methacrylate (HPMA).

Synthesis of Resin P-102c

For comparison, a polyvinyl chloride graft copolymer P-102c containing a repeating unit shown below was obtained as in Synthesis Example 3 except that methyl methacrylate (MMA) was used instead of 4-hydroxyphenyl methacrylate (HPMA).

<Chemical Formula 8>

P-1c

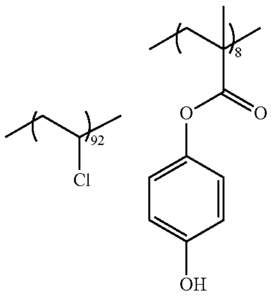

P-2c

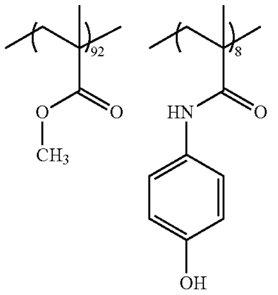

P-3c

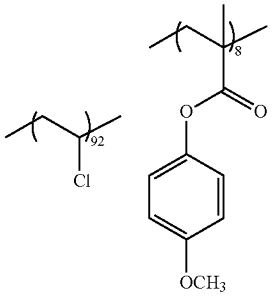

P-101c

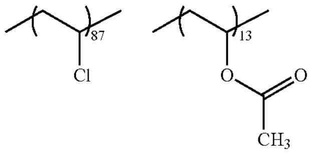

P-102c

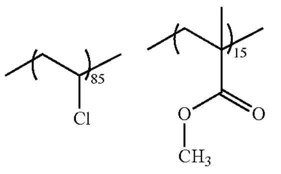

<Evaluation>

(Evaluation 5) Heat Resistance Evaluation of Resin

For the resins synthesized above, mass reduction ratio ($[M/M_0]\times100$) (%) in atmospheric air and nitrogen atmosphere was measured as in Evaluation 1.

An evaluation A was given if the mass reduction ratio was less than 30% in the measurement under both of the atmosphere and nitrogen atmosphere, and an evaluation B was given if the mass reduction ratio was 30% or more in the measurement under either or both of the atmosphere and nitrogen atmosphere. The results are shown in Table 5.

(Evaluation 6) Evaluation of Thermal Deterioration Suppression Ability for Additive 1 g of each polyvinyl chloride graft copolymer was dissolved in 10 g of toluene:cyclohexanone=7:3 (mass ratio) solution to prepare a polymer solution. 0.01 g of a hindered amine light stabilizer (product name: Tinuvin 123 manufactured by BASF Japan Ltd.) or a cyanine pigment with a structure represented by the above Formula (1) and having tris(pentafluoroethyl)trifluorophosphate (FAP) on the counter anion, as an additive, was mixed in the polymer solution to obtain a resin solution. The resin solution was applied onto a glass substrate using spin coating, followed by heating and drying on a hot plate which was set to 200° C. for 10 minutes to form a coating film with a thickness of 1 μm.

The glass substrate on which the coating film was formed was heated at 250° C. for 10 minutes to measure a residual ratio of the additive in the coating film. The glass substrate was cut to a size of 1 $cm^2$ and immersed in 1.5 mL of acetone to perform extraction for 60 minutes in an ultrasonic cleaner. The additive in the glass substrate extract was quantified through ultra high performance liquid chromatography/mass spectrometry (UHPLC/MS) (using ultra high liquid chromatograph/mass spectrometer (UHPLC/MS), 1260 LC System/6130B Single Quad MS System manufactured by Agilent Technologies Inc.). The amount of additive ($V_1$) remaining after heating was divided by the initial amount of additive ($V_0$) before heating to calculate a residual ratio of additive ($[V_1/V_0]\times100$)(%). Higher residual ratio of additive means that superior thermal deterioration suppression ability has been exhibited for the additive.

An evaluation A was given if the residual ratio of additive was 80% or more in the measurement of both of the resin composition to which the hindered amine light stabilizer was added and the resin composition to which the cyanine pigment was added, and an evaluation B was given if the residual ratio of additive was less than 80% in the measurement of either or both of the resin compositions. The results are shown in Table 5.

TABLE 5
| Ex. | Resin | Comp. | Structure | MRR AP [%] | MRR $N_2$ [%] | E5 | RRA Tinuvin 123 [%] | RRA Pigment [%] | E6 |
|---|---|---|---|---|---|---|---|---|---|
| 101-c | P-1c | PVC HPMA 92/8 | 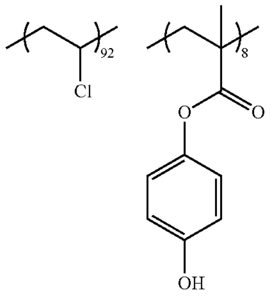 | 24 | 22 | A | 90 | 85 | A |
| 102-c | P-2c | PVC/ HPMAA = 92/8 | 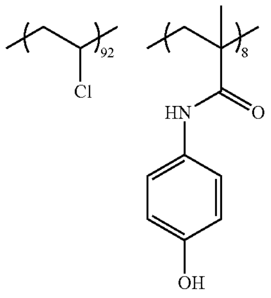 | 23 | 20 | A | 92 | 86 | A |
| 103-c | P-3c | PVC/ MPhMA = 92/8 | 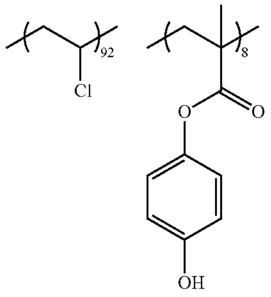 | 28 | 25 | A | 85 | 81 | A |
| 101C-c | P-101c | PVC/ VAc = 87/13 | 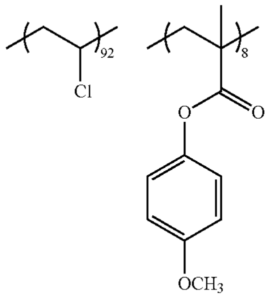 | 35 | 32 | B | 78 | 74 | B |
| 102C-c | P-102c | PVC/ MMA = 85/15 | 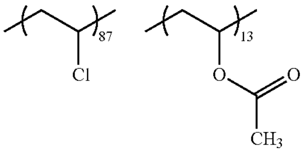 | 40 | 44 | B | 70 | 68 | B |
MRR = Mass Reduction Ratio
RRA = Residual Ratio of Additive
E = Evaluation
AP = Atmospheric Pressure <Synthesis of Resin (Group d)>

Synthesis Example 4: Synthesis of Resin P-1d 80 parts by mass of cyclohexanone was used as a polymerization solvent. Furthermore, 13 parts by mass of methyl methacrylate (MMA), 4 parts by mass of 2-hydroxyethyl methacrylate (HEMA), and 3 parts by mass of 4-hydroxyphenyl methacrylate (HPMA) were used as acrylic monomers. Also, 0.22 parts by mass of benzoyl peroxide (BPO) was used as a polymerization initiator. These materials were placed in a reaction vessel equipped with a stirrer and a reflux tube, and stirred and refluxed for 8 hours while being heated to 80° C. with an introduction of nitrogen gas into the reaction vessel. Thus, a polymer solution containing Resin (acrylic copolymer) P-1d shown below formed of a repeating unit derived from MMA and a repeating unit derived from HPMA was obtained.

Synthesis of Resin P-2d

A polymer solution containing Resin P-2d shown below was obtained as in Synthesis Example 4 except that N-(4-hydroxyphenyl) methacrylamide (HPMAA) was used instead of 4-hydroxyphenyl methacrylate (HPMA).

Synthesis of Resin P-3d

A polymer solution containing Resin P-3d shown below was obtained as in Synthesis Example 4 except that 4-hydroxyphenyl maleimide (4-HPhMI) was used instead of 4-hydroxyphenyl methacrylate (HPMA).

Synthesis of Resin P-4d

A polymer solution containing Resin P-4d shown below was obtained as in Synthesis Example 4 except that 3-hydroxyphenyl maleimide (3-HPhMI) was used instead of 4-hydroxyphenyl methacrylate (HPMA).

Synthesis of Resin P-5d

A polymer solution containing Resin P-5d shown below was obtained as in Synthesis Example 4 except that 4-methoxyphenyl methacrylate (MPhMA) was used instead of 4-hydroxyphenyl methacrylate (HPMA).

Synthesis of Resin P-6d

A polymer solution containing Resin P-6d shown below was obtained as in Synthesis Example 4 except that 2,6-di-tert-butylphenyl methacrylate (t-BuPhMA) was used instead of 4-hydroxyphenyl methacrylate (HPMA).

Synthesis of Resin P-7d

A polymer solution containing Resin P-7d shown below was obtained as in Synthesis Example 4 except that 2,6-di-tert-butyl-4-methoxyphenyl methacrylate (t-BuMPhMA) was used instead of 4-hydroxyphenyl methacrylate (HPMA).

Synthesis of Resin P-101d

For comparison, a polymer solution containing Resin P-101d shown below was obtained as in Synthesis Example 4 except that phenyl methacrylate (PhMA) was used instead of 4-hydroxyphenyl methacrylate (HPMA).

Synthesis of Resin P-102d

For comparison, a polymer solution containing Resin P-102d shown below was obtained as in Synthesis Example 4 except that N-phenylmethacrylamide (PhMAA) was used instead of 4-hydroxyphenyl methacrylate (HPMA).

Synthesis of Resin P-103d

For comparison, a polymer solution containing Resin P-103d shown below was obtained as in Synthesis Example 4 except that N-phenyl maleimide (PhMI) was used instead of 4-hydroxyphenyl methacrylate (HPMA).

<Chemical Formula 9>

P-1d

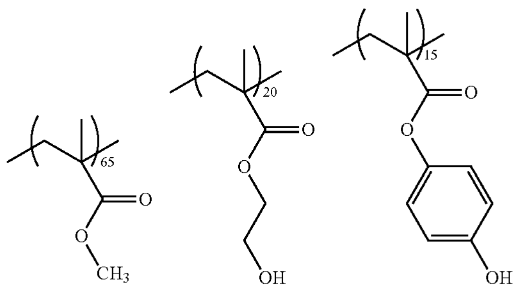

P-2d

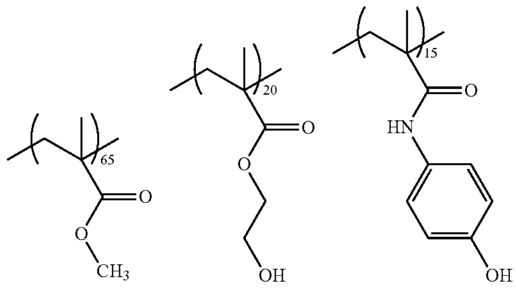

P-3d

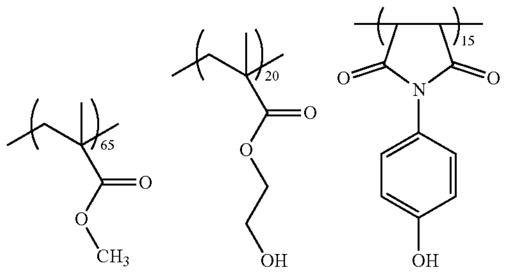

P-4d

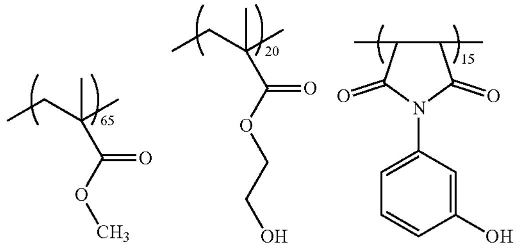

P-5d

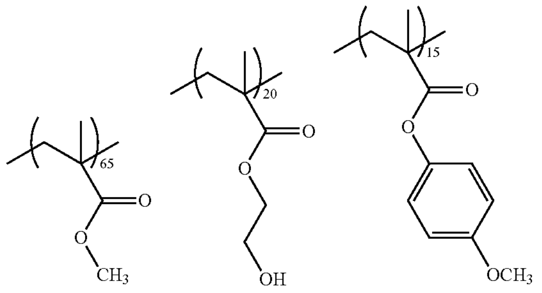

-continued

P-6d

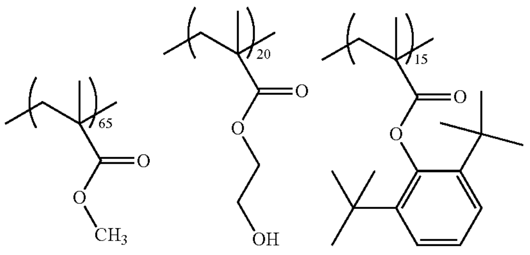

P-7d

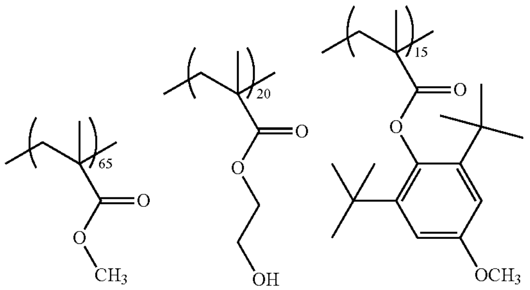

P-101d

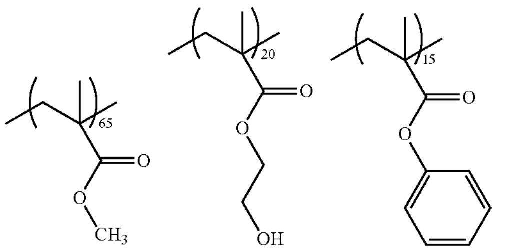

P-102d

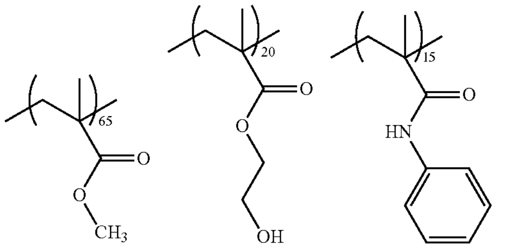

P-103d

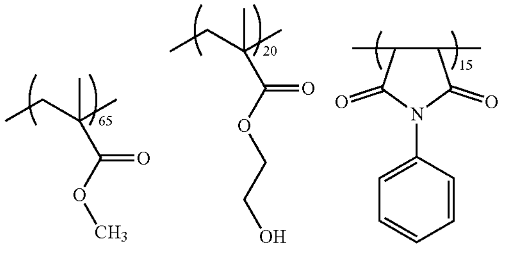

<Preparation of Decorative Sheet>

A resin composition was obtained by adding 0.5 parts by mass of Tinuvin 326 (manufactured by BASF Japan Ltd.) as a UV absorber, 0.4 parts by mass of Tinuvin 622 (manufactured by BASF Japan Ltd.) as a light stabilizer, and 0.1 part by mass of Chimassorb 2020 (manufactured by BASF Japan Ltd.) to 100 parts by mass of a transparent homopolypropylene resin (Prime PP manufactured by Prime Polymer Co., Ltd). This resin composition was melt-extruded to obtain a polypropylene resin film with a thickness of 80 μm.

A pattern layer (thickness: 3 μm) was provided to a concealable polyethylene film (thickness: 70 μm) by gravure-printing a wood grain pattern using a two-pack type urethane ink (V180 manufactured by Toyo Ink Co., Ltd.) to obtain a substrate. The above polypropylene resin film was dry-laminated on this substrate via a dry lamination adhesive (Takelac A540 manufactured by Mitsui Chemicals, Inc.) (thickness: 2 μm) to obtain a film laminate.

A polymer solution containing each resin (acrylic copolymer) obtained above was applied to the polypropylene resin film of the laminate using a bar coater so as to have a thickness of 8 μm, followed by drying to form a surface protective layer, thereby obtaining a decorative sheet. It should be noted that four types of polymer solutions were prepared for each resin for use as polymer solutions for surface protective layers. Specifically, the four types of polymer solutions prepared were a polymer solution containing the resin as obtained above, a polymer solution to which xylylene diisocyanate (XDI) (product name: TAKENATE (trademark) 500 manufactured by Mitsui Chemicals, Inc.) as a curing agent was added so that the solid content mass ratio of resin:curing agent would be 7:3, and the former and latter types of polymer solutions to each of which a hindered amine light stabilizer (product name: Tinuvin 123 manufactured by BASF Japan Ltd.) was added as an additive.

<Evaluation>

(Evaluation 7) Heat Resistance Evaluation of Surface Protective Layer

The mass reduction ratio (%) in the surface protective layer in atmospheric air was measured using the following method. For measurement of mass reduction ratio (%), a differential heat thermal mass simultaneous measurement device (STA 7000 manufactured by Hitachi High-Tech Science Corporation) was used. 5 mg of the surface protective layer was shaved off from the decorative sheet obtained above and placed in an aluminum pan to prepare a measurement sample. This sample was placed in atmospheric air and heated at 250° C. for 20 minutes, and a mass ($M_1$) after heating was subtracted from an initial mass ($M_0$) before heating, followed by dividing the subtracted mass reduction ($M=M_0-M_1$) by the initial mass ($M_0$) to calculate a mass reduction ratio ($[M/M_0]\times100$) (%). Lower mass reduction ratio means that better heat resistance has been exhibited.

An evaluation A was given if the mass reduction ratio was less than 20%, and an evaluation B was given if it was 20% or more. The results are shown in Table 6.

(Evaluation 8) Evaluation of Thermal Deterioration Suppression Ability for Additive The decorative sheet obtained above was cut to 1 $cm^2$, placed in atmospheric air, and heated at 250° C. for 20 minutes to prepare a sample, which was then immersed in 1.5 mL of acetone to perform extraction for 60 minutes in an ultrasonic cleaner. The additive in the decorative sheet extract was quantified through ultra high performance liquid chromatography/mass spectrometry (UHPLC/MS) (using ultra high liquid chromatograph/mass spectrometer (UHPLC/MS), 1260 LC System/6130B Single Quad MS System manufactured by Agilent Technologies Inc.).

Furthermore, the above film laminate with no surface protective layer formed was cut to 1 $cm^2$ as above, and subjected to heat treatment as above, followed by performing extraction, to quantify the additive in the film laminate extract.

A difference between the amount of additive in the decorative sheet extract and the amount of additive in the film laminate extract was obtained to quantify the amount of additive in the surface protective layer of the decorative sheet.

The amount of additive ($V_1$) remaining after heating was divided by the initial amount of additive ($V_0$) before heating to calculate a residual ratio of additive ($[V_1/V_0]\times100$)(%). Higher residual ratio of additive means that superior thermal deterioration suppression ability has been exhibited for the additive. An evaluation A was given if the residual ratio of additive was 90% or more, and an evaluation B was given if it was less than 90%. The results are shown in Table 6.

TABLE 6-1

| | | | | | | Evaluation results | | | |
|---|---|---|---|---|---|---|---|---|---|
| Ex. | Resin | Comp. | Structure | CA | Ad | MRR [%] | E7 | RRA [%] | E8 |
| 101-d1 | P-1d | MMA/HEMA/HPMA = l/m/n = 65/20/15 | 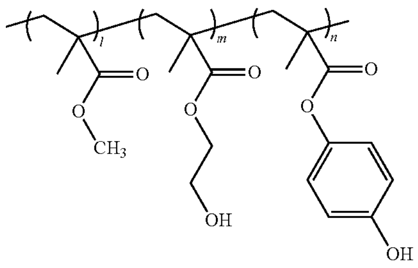 | — | — | 13.5 | A | — | — |
| 101-d2 | P-1d | MMA/HEMA/HPMA = l/m/n = 65/20/15 | 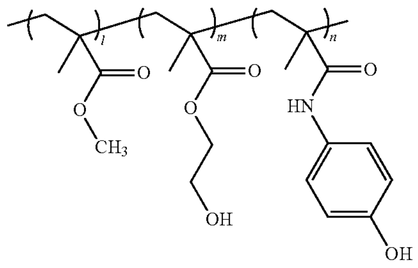 | XD1 | — | 12.1 | A | — | — |
| 102-d1 | P-2d | MMA/HEMA/HPMAA = l/m/n = 65/20/15 | 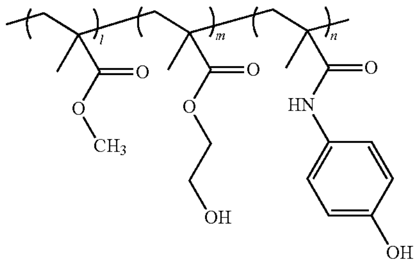 | — | — | 13.6 | A | — | — |
| 102-d2 | P-2d | MMA/HEMA/HPMAA = l/m/n = 65/20/15 | 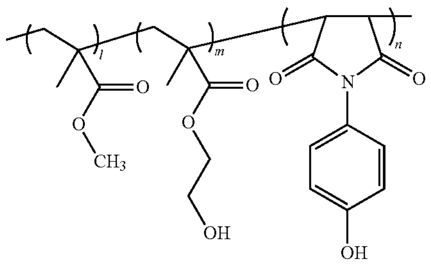 | XD1 | — | 11.2 | A | — | — |
| 103-d1 | P-3d | MMA/HEMA/4-HPhMI = l/m/n = 65/20/15 | 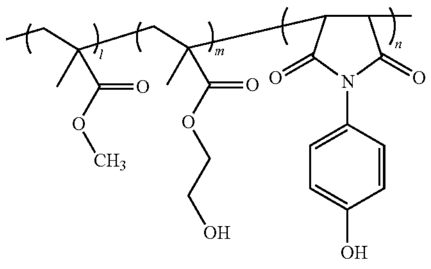 | — | — | 16.3 | A | — | — |

TABLE 6-1-continued
| | | | | | | Evaluation results | | | |
|---|---|---|---|---|---|---|---|---|---|
| Ex. | Resin | Comp. | Structure | CA | Ad | MRR [%] | E7 | RRA [%] | E8 |
| 103-d2 | P-3d | MMA/HEMA/4-HPhMI = l/m/n = 65/20/15 | 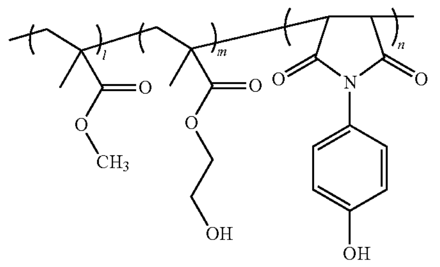 | XD1 | — | 15.5 | A | — | — |
| 104-d1 | P-4d | MMA/HEMA/3-HPhMI = l/m/n = 65/20/15 | 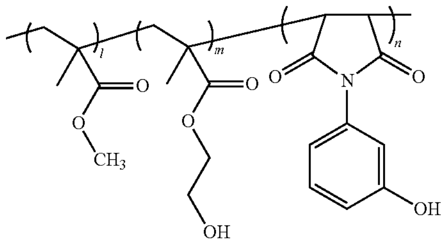 | — | — | 16.7 | A | — | — |
| 104-d2 | P-4d | MMA/HEMA/3-HPhMI = l/m/n = 65/20/15 | 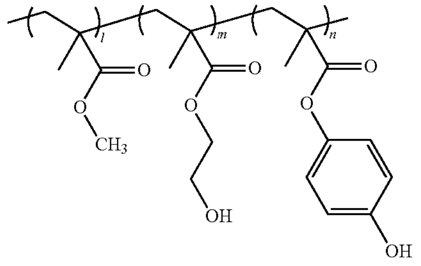 | XD1 | — | 15.2 | A | — | — |
| 105-d1 | P-5d | MMA/HEMA/3-HPhMI = l/m/n = 65/20/15 | 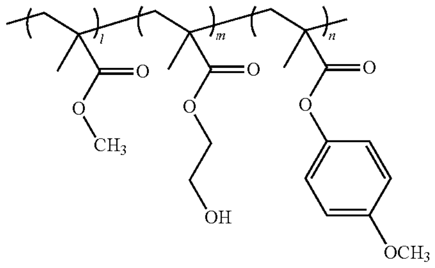 | — | — | 17.3 | A | — | — |
| 105-d2 | P-5d | MMA/HEMA/MPhMA = l/m/n = 65/20/15 | 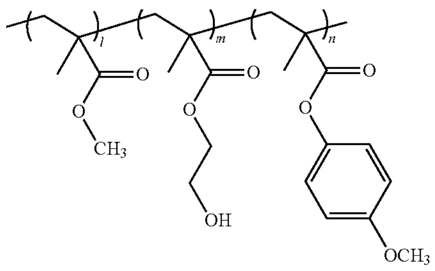 | XD1 | — | 14.6 | A | — | — |
CA = Curing Agent; Ad = Additive; MRR = Mass Reduction Ratio;
RRA = Residual Ratio of Additive; E = Evaluation TABLE 6-2
| | | | | | | Evaluation results | | | |
|---|---|---|---|---|---|---|---|---|---|
| Ex. | Resin | Comp. | Structure | CA | Ad | MRR [%] | E7 | RRA [%] | E8 |
| 106-d1 | P-6d | MMA/HEMA/ t-BuPhMA = l/m/n = 65/20/15 | 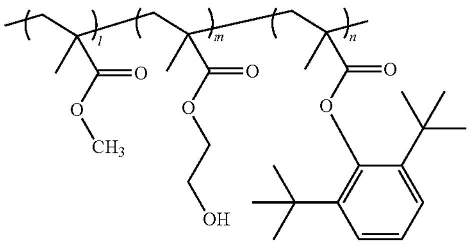 | — | — | 18.6 | A | — | — |
| 106-d2 | P-6d | MMA/HEMA/ t-BuPhMA = l/m/n = 65/20/15 | 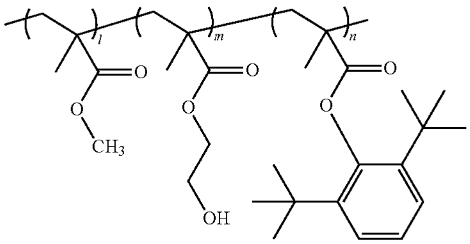 | XD1 | — | 15.9 | A | — | — |
| 107-d1 | P-7d | MMA/HEMA/ t-BuMPhMA = l/m/n = 65/20/15 | 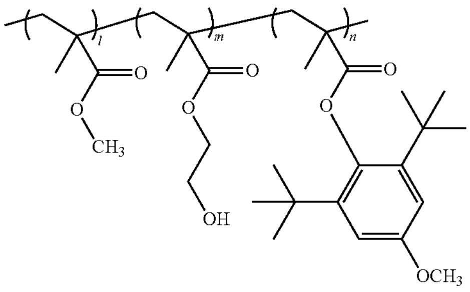 | — | — | 17.7 | A | — | — |
| 107-d2 | P-7d | MMA/HEMA/ t-BuMPhMA = l/m/n = 65/20/15 | 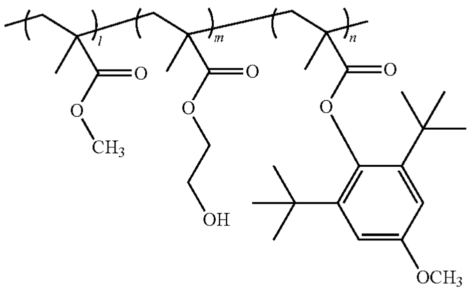 | XD1 | — | 16.5 | A | — | — |
| 101-d3 | P-1d | MMA/HEMA/ HPMA = l/m/n = 65/20/15 | 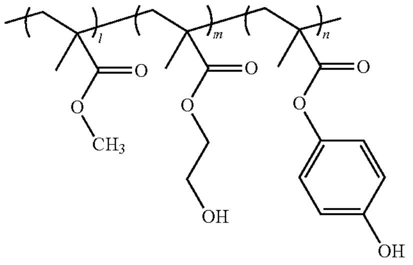 | — | Tinuvin 123 | 13.7 | A | 95.3 | A |

TABLE 6-2-continued

| Ex. | Resin | Comp. | Structure | CA | Ad | Evaluation results MRR [%] | E7 | RRA [%] | E8 |
|---|---|---|---|---|---|---|---|---|---|
| 101-d4 | P-1d | MMA/HEMA/ HPMA = l/m/n = 65/20/15 | 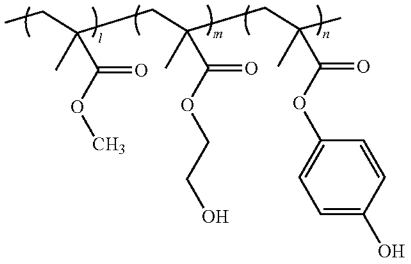 | XD1 | Tinuvin 123 | 11.8 | A | 96.1 | A |
| 102-d3 | P-2d | MMA/HEMA/ HPMAA = l/m/n = 65/20/15 | 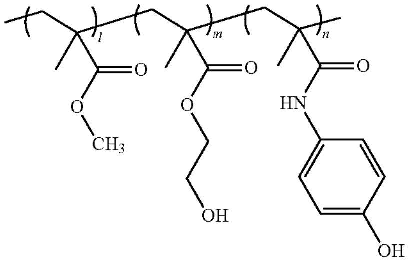 | — | Tinuvin 123 | 13.1 | A | 95.2 | A |
| 102-d4 | P-2d | MMA/HEMA/ HPMAA = l/m/n = 65/20/15 | 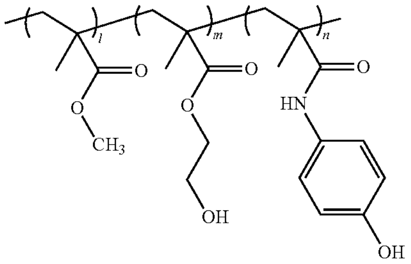 | XD1 | Tinuvin 123 | 12.0 | A | 95.8 | A |
| 103-d3 | P-3d | MMA/HEMA/ 4-HPhMI = l/m/n = 65/20/15 | 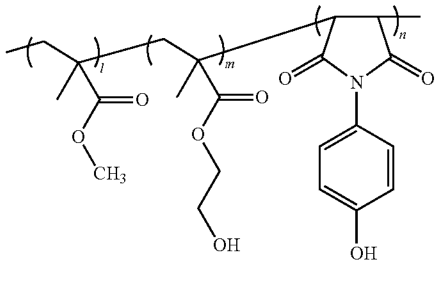 | — | Tinuvin 123 | 17.8 | A | 93.3 | A |
| 103-d4 | P-3d | MMA/HEMA/ 4-HPhMI = l/m/n = 65/20/15 | 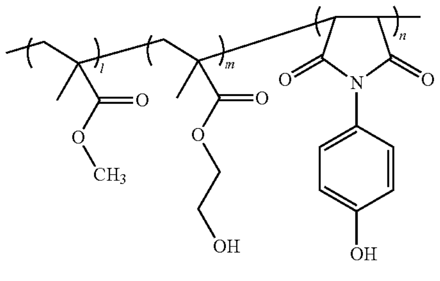 | XD1 | Tinuvin 123 | 15.0 | A | 93.5 | A |

CA = Curing Agent; Ad = Additive; MRR = Mass Reduction Ratio;

RRA = Residual Ratio of Additive; E = Evaluation

TABLE 6-3
| Ex. | Resin | Comp. | Structure | CA | Ad | Evaluation results MRR [%] | E7 | RRA [%] | E8 |
|---|---|---|---|---|---|---|---|---|---|
| 104-d3 | P-4d | MMA/HEMA/ 3-HPhMI = l/m/n = 65/20/15 | 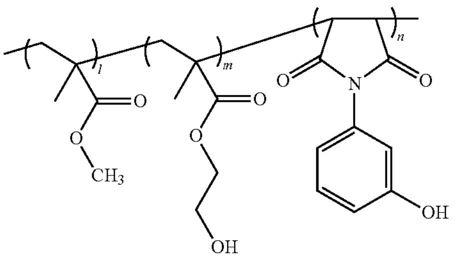 | — | Tinuvin 123 | 17.1 | A | 92.2 | A |
| 104-d4 | P-4d | MMA/HEMA/ 3-HPhMI = l/m/n = 65/20/15 | 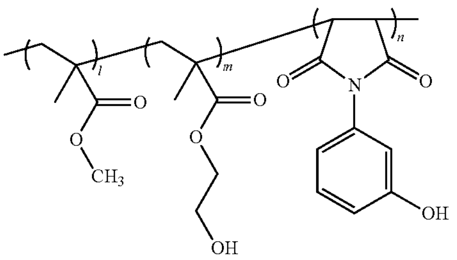 | XD1 | Tinuvin 123 | 15.2 | A | 93.6 | A |
| 105-d3 | P-5d | MMA/HEMA/ HPhMI = l/m/n = 65/20/15 | 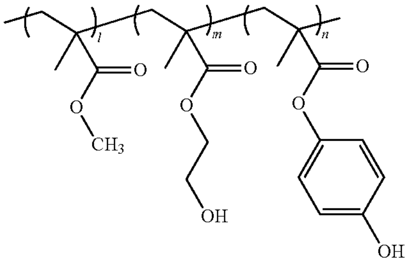 | — | Tinuvin 123 | 17.4 | A | 90.1 | A |
| 105-d4 | P-5d | MMA/HEMA/ HPhMI = l/m/n = 65/20/15 | 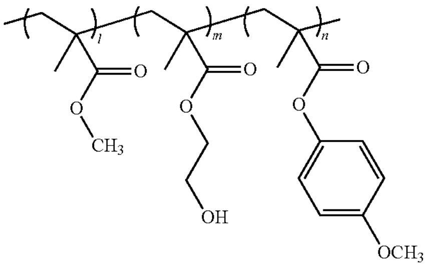 | XD1 | Tinuvin 123 | 13.6 | A | 93.3 | A |
| 106-d3 | P-6d | MMA/HEMA/ t-BuPhMA = l/m/n = 65/20/15 | 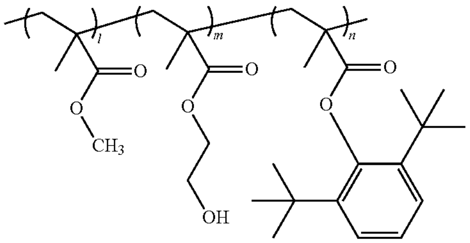 | — | Tinuvin 123 | 19.1 | A | 91.1 | A |

TABLE 6-3-continued

| Ex. | Resin | Comp. | Structure | CA | Ad | Evaluation results MRR [%] | E7 | RRA [%] | E8 |
|---|---|---|---|---|---|---|---|---|---|
| 106-d4 | P-6d | MMA/HEMA/ t-BuPhMA l/m/n = 65/20/15 | 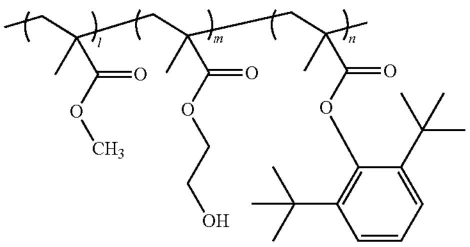 | XD1 | Tinuvin 123 | 16.5 | A | 92.6 | A |
| 107-d3 | P-7d | MMA/HEMA/ t-BuMPhMA = l/m/n = 65/20/15 | 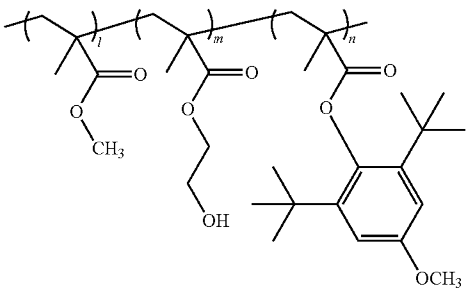 | — | Tinuvin 123 | 17.2 | A | 90.2 | A |
| 107-d4 | P-7d | MMA/HEMA/ t-BuMPhMA = l/m/n = 65/20/15 | 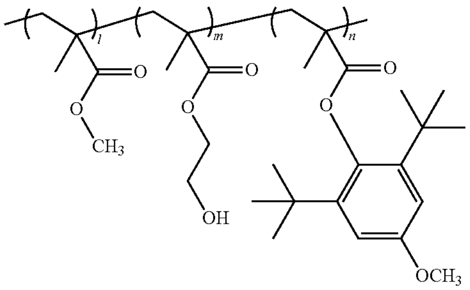 | XD1 | Tinuvin 123 | 16.5 | A | 92.3 | A |

CA = Curing Agent; Ad = Additive; MRR = Mass Reduction Ratio;
RRA = Residual Ratio of Additive; E = Evaluation

TABLE 6-4

| Ex. | Resin | Comp. | Structure | CA | Ad | Evaluation results MRR [%] | E7 | RRA [%] | E8 |
|---|---|---|---|---|---|---|---|---|---|
| 101C-d1 | P-101d | MMA/HEMA/ PhMA = l/m/n = 65/20/15 | 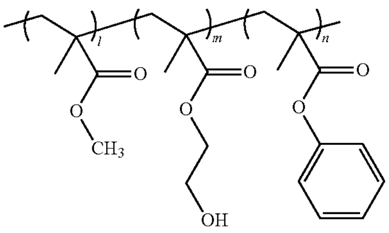 | — | — | 31.2 | B | — | — |

TABLE 6-4-continued
| | | | | | | Evaluation results | | | |
|---|---|---|---|---|---|---|---|---|---|
| Ex. | Resin | Comp. | Structure | CA | Ad | MRR [%] | E7 | RRA [%] | E8 |
| 101C-d2 | P-101d | MMA/HEMA/ PhMA = l/m/n = 65/20/15 | 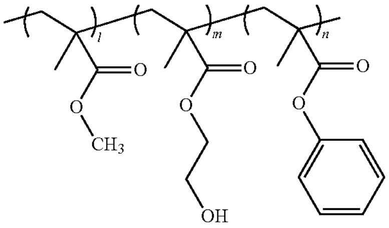 | XD1 | — | 25.3 | B | — | — |
| 102C-d1 | P-102d | MMA/HEMA/ PhMAA = l/m/n = 65/20/15 | 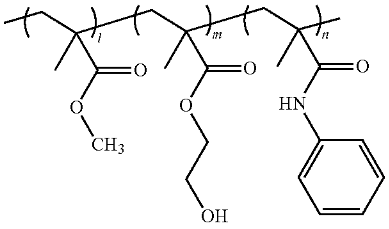 | — | — | 26.4 | B | — | — |
| 102C-d2 | P-102d | MMA/HEMA/ PhMAA = l/m/n = 65/20/15 | 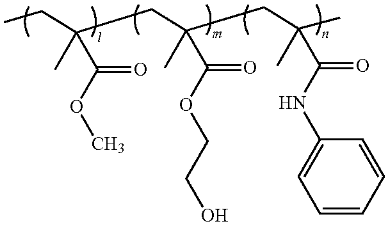 | XD1 | — | 22.3 | B | — | — |
| 103C-d1 | P-103d | MMA/HEMA/ PhM = l/m/n = 65/20/15 | 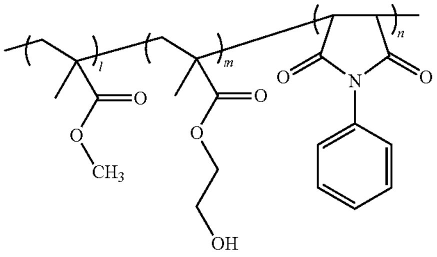 | — | — | 26.1 | B | — | — |
| 103C-d2 | P-103d | MMA/HEMA/ PhM = l/m/n = 65/20/15 | 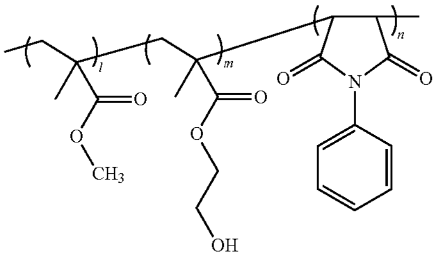 | XD1 | — | 23.4 | B | — | — |
| 101C-d3 | P-101d | MMA/HEMA/ PhMA = l/m/n = 65/20/15 | 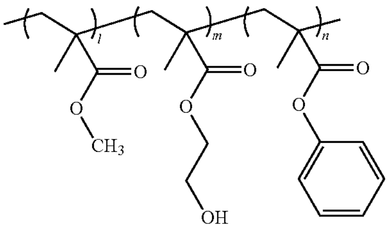 | — | Tinuvin 123 | 29.6 | B | 80.3 | B |

TABLE 6-4-continued

| Ex. | Resin | Comp. | Structure | CA | Ad | Evaluation results MRR [%] | E7 | RRA [%] | E8 |
|---|---|---|---|---|---|---|---|---|---|
| 101C-d4 | P-101d | MMA/HEMA/ PhMA = l/m/n = 65/20/15 | 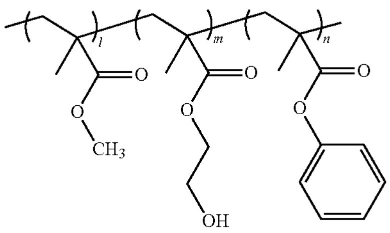 | XD1 | Tinuvin 123 | 24.6 | B | 82.2 | B |
| 102C-d3 | P-102d | MMA/HEMA/ PhMAA = l/m/n = 65/20/15 | 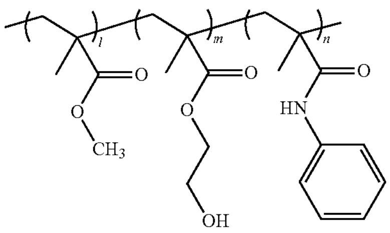 | — | Tinuvin 123 | 30.3 | B | 83.2 | B |
| 102C-d4 | P-102d | MMA/HEMA/ PhMAA = l/m/n = 65/20/15 | 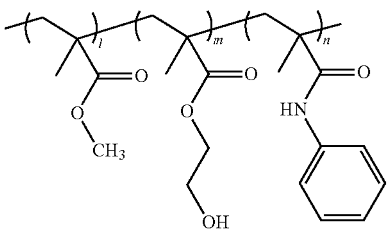 | XD1 | Tinuvin 123 | 27.5 | B | 87.6 | B |

CA = Curing Agent; Ad = Additive; MRR = Mass Reduction Ratio;
RRA = Residual Ratio of Additive; E = Evaluation

TABLE 6-5

| Ex. | Resin | Comp. | Structure | CA | Ad | Evaluation results MRR [%] | E7 | RRA [%] | E8 |
|---|---|---|---|---|---|---|---|---|---|
| 103C-d3 | P-103d | MMA/HEMA/ PhMI = l/m/n = 65/20/15 | 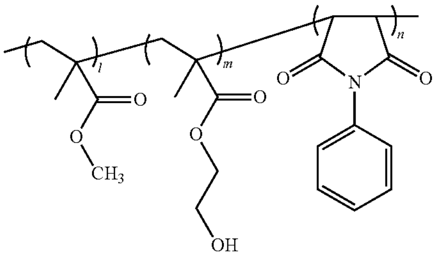 | — | Tinuvin 123 | 31.6 | B | 79.6 | B |
| 103C-d4 | P-103d | MMA/HEMA/ PhMI = l/m/n = 65/20/15 | 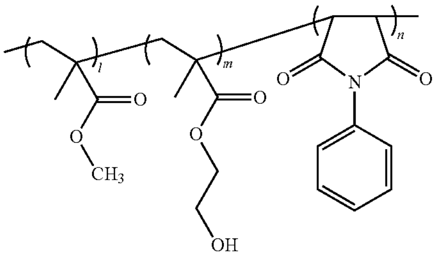 | XD1 | Tinuvin 123 | 26.6 | B | 85.5 | B |

CA = Curing Agent; Ad = Additive; MRR = Mass Reduction Ratio;
RRA = Residual Ratio of Additive; E = Evaluation

Second Embodiment

<Synthesis of Resin>

17 types of resins were synthesized and referred to as P-a to P-q. The structural formulas of the repeating units contained in Resins P-a to P-q are shown below. Also, the respective synthesis methods will be explained below.

Synthesis Example 1: Synthesis of Resin P-a 80 parts by mass of cyclohexanone was used as a polymerization solvent. Furthermore, 3 parts by mass of 2-hydroxyethyl methacrylate (HEMA), 14 parts by mass of methyl methacrylate (MMA), and 1 part by mass of 4-methoxyphenyl methacrylate (MPhMA) were used as acrylic monomers. Also, 0.22 parts by mass of benzoyl peroxide (BPO) was used as a polymerization initiator. These materials were placed in a reaction vessel equipped with a stirrer and a reflux tube, and stirred and refluxed for 8 hours while being heated to 80° C. with an introduction of nitrogen gas into the reaction vessel. Thus, a polymer solution containing an acrylic copolymer formed of a repeating unit derived from HEMA, a repeating unit derived from MMA, and a repeating unit derived from MPhMA was obtained. The obtained polymer solution was dripped into a large amount of methanol for reprecipitation purification, and dried under reduced pressure for 24 hours at room temperature to obtain Resin P-a.

Synthesis Example 2: Synthesis of Resin P-b

Resin P-b was obtained as in Synthesis Example 1 except that 4-hydroxyphenyl methacrylate (HPMA) was used instead of 4-methoxyphenyl methacrylate (MPhMA).

Synthesis Example 3: Synthesis of Resin P-c

Resin P-c was obtained as in Synthesis Example 2 except that methyl methacrylate (MMA) contained was 16.6 parts by mass and 4-hydroxyphenyl methacrylate (HPMA) contained was 0.4 parts by mass.

Synthesis Example 4: Synthesis of Resin P-d

Resin P-d was obtained as in Synthesis Example 2 except that methyl methacrylate (MMA) contained was 15 parts by mass and 4-hydroxyphenyl methacrylate (HPMA) contained was 2 parts by mass.

Synthesis Example 5: Synthesis of Resin P-e

Resin P-e was obtained as in Synthesis Example 1 except that 4-hydroxyphenyl methacrylamide (HPMAA) was used instead of 4-methoxyphenyl methacrylate (MPhMA).

Synthesis Example 6: Synthesis of Resin P-f

Resin P-f was obtained as in Synthesis Example 1 except that 4-hydroxyphenyl maleimide (HPhMI) was used instead of 4-methoxyphenyl methacrylate (MPhMA).

Synthesis Example 7: Synthesis of Resin P-g

Resin P-g was obtained as in Synthesis Example 1 except that 2,6-di-tert-butylphenyl methacrylate (t-BuPhMA) was used instead of 4-methoxyphenyl methacrylate (MPhMA).

Synthesis Example 8: Synthesis of Resin P-h

Resin P-h was obtained as in Synthesis Example 1 except that 2,6-di-tert-butyl-4-methoxyphenyl methacrylate (t-BuMPhMA) was used instead of 4-methoxyphenyl methacrylate (MPhMA).

Synthesis Example 9: Synthesis of Resin P-i

Resin P-i was obtained as in Synthesis Example 1 except that 14 parts by mass of 4-hydroxyphenyl acrylate (HPA) and 6 parts by mass of glycidyl acrylate (GA) were used instead of 2-hydroxyethyl methacrylate (HEMA), methyl methacrylate (MMA), and 4-methoxyphenyl methacrylate (MPhMA).

Synthesis Example 10: Synthesis of Resin P-j

Resin P-j was obtained as in Synthesis Example 1 except that 17 parts by mass of methyl methacrylate (MMA) was used and no 4-methoxyphenyl methacrylate (MPhMA) was used.

Synthesis Example 11: Synthesis of Resin P-k

Resin P-k was obtained as in Synthesis Example 1 except that styrene (St) was used instead of 4-methoxyphenyl methacrylate (MPhMA).

Synthesis Example 12: Synthesis of Resin P-l

Resin P-l was obtained as in Synthesis Example 1 except that phenyl methacrylate (PhMA) was used instead of 4-methoxyphenyl methacrylate (MPhMA).

Synthesis Example 13: Synthesis of Resin P-m

Resin P-m was obtained as in Synthesis Example 1 except that phenyl methacrylamide (PhMAA) was used instead of 4-methoxyphenyl methacrylate (MPhMA).

Synthesis Example 14: Synthesis of Resin P-n

Resin P-n was obtained as in Synthesis Example 1 except that phenyl maleimide (PhMI) was used instead of 4-methoxyphenyl methacrylate (MPhMA).

Synthesis Example 15: Synthesis of Resin P-o

Resin P-o was obtained as in Synthesis Example 1 except that 4-methoxystyrene (MSt) was used instead of 4-methoxyphenyl methacrylate (MPhMA).

Synthesis Example 16: Synthesis of Resin P-p

Resin P-p was obtained as in Synthesis Example 1 except that 2,4,6-trimethylstyrene (TMSt) was used instead of 4-methoxyphenyl methacrylate (MPhMA).

Synthesis Example 16: Synthesis of Resin P-q

Resin P-q was obtained as in Synthesis Example 9 except that styrene (St) was used instead of 4-hydroxyphenyl acrylate (HPA).

<Chemical Formula 9>
P-a
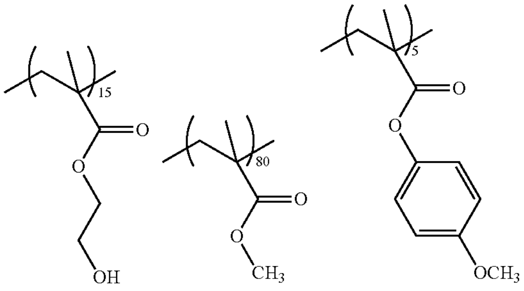
P-b
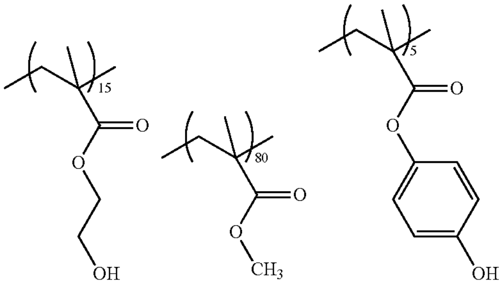
P-c
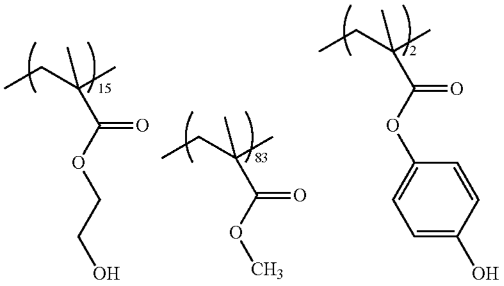
P-d
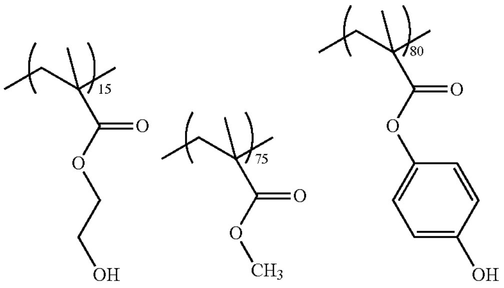
P-e
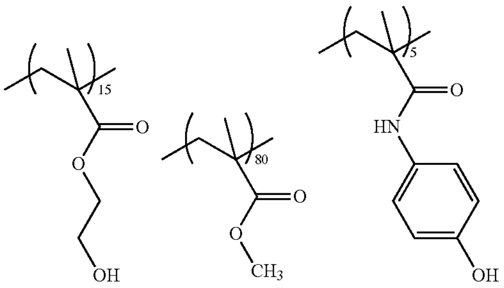
-continued
P-f
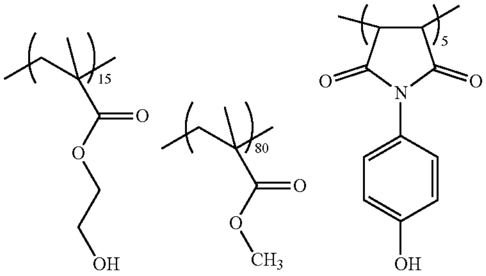
P-g
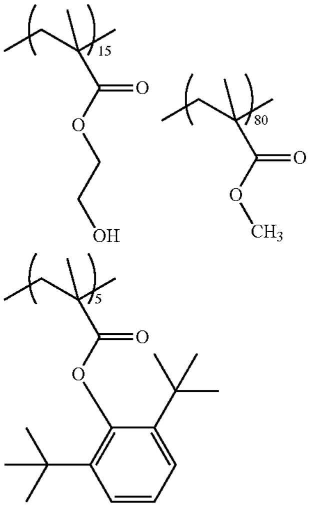
P-h
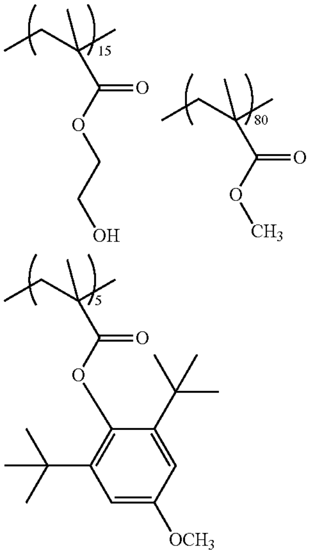
P-i
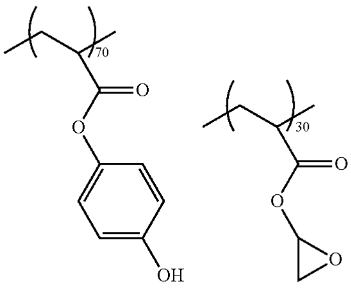

-continued

<Chemical Formula 9>

P-j

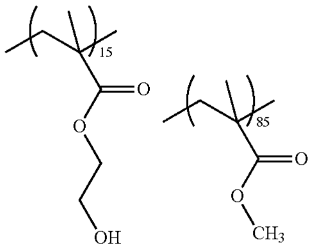

P-k

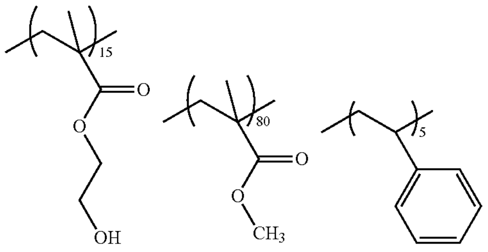

P-l

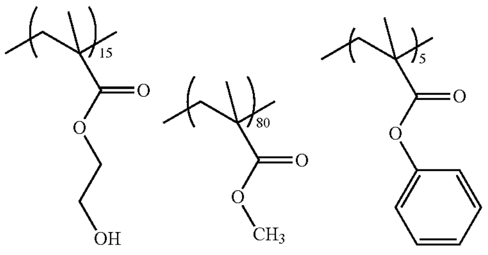

P-m

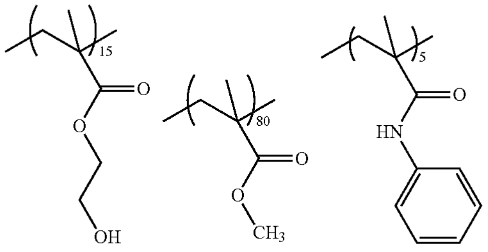

P-n

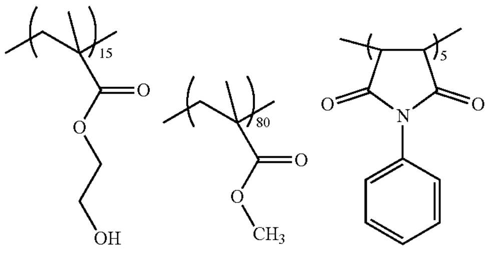

P-o

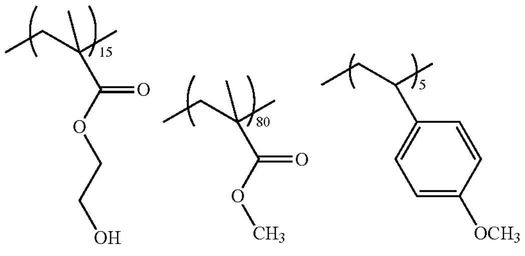

-continued

P-p

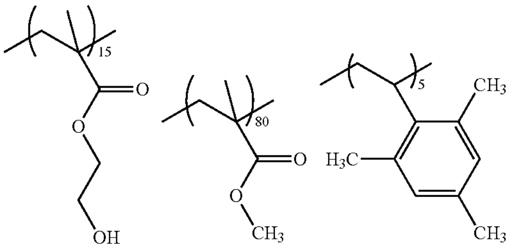

P-q

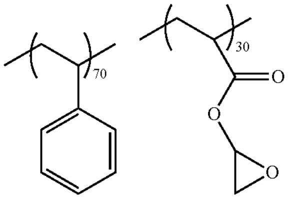

<Formation of Resist Film>

Resist films of Examples 201 to 209 and Examples 201C to 208C were formed through the following processes (1) to (4) and evaluated.

(1) Process of Preparing Resist Solution (Example 201)

A propylene glycol monomethyl ether acetate (PGMEA) solution containing 6 mass % Resin P-a was prepared and subjected to pressure filtration using a 0.1 μm Teflon (trademark) membrane filter to obtain a positive resist solution.

Example 202

A positive resist solution was prepared as in Example 201 except that a propylene glycol monomethyl ether acetate (PGMEA) solution containing 6 mass % Resin P-b was used.

Example 203

A positive resist solution was prepared as in Example 201 except that a propylene glycol monomethyl ether acetate (PGMEA) solution containing 6 mass % Resin P-c was used.

Example 204

A positive resist solution was prepared as in Example 201 except that a propylene glycol monomethyl ether acetate (PGMEA) solution containing 6 mass % Resin P-d was used.

Example 205

A positive resist solution was prepared as in Example 201 except that a propylene glycol monomethyl ether acetate (PGMEA) solution containing 6 mass % Resin P-e was used.

Example 206

A positive resist solution was prepared as in Example 201 except that a propylene glycol monomethyl ether acetate (PGMEA) solution containing 6 mass % Resin P-f was used.

Example 207

A positive resist solution was prepared as in Example 201 except that a propylene glycol monomethyl ether acetate (PGMEA) solution containing 6 mass % Resin P-g was used.

Example 208

A positive resist solution was prepared as in Example 201 except that a propylene glycol monomethyl ether acetate (PGMEA) solution containing 6 mass % Resin P-h was used.

Example 209

A negative resist solution was prepared as in Example 201 except that a propylene glycol monomethyl ether acetate (PGMEA) solution containing 6 mass % Resin P-i was used.

Example 201C

A positive resist solution was prepared as in Example 201 except that a propylene glycol monomethyl ether acetate (PGMEA) solution containing 6 mass % Resin P-j was used.

Example 202C

A positive resist solution was prepared as in Example 201 except that a propylene glycol monomethyl ether acetate (PGMEA) solution containing 6 mass % Resin P-k was used.

Example 203C

A positive resist solution was prepared as in Example 201 except that a propylene glycol monomethyl ether acetate (PGMEA) solution containing 6 mass % Resin P-1 was used.

Example 204C

A positive resist solution was prepared as in Example 201 except that a propylene glycol monomethyl ether acetate (PGMEA) solution containing 6 mass % Resin P-m was used.

Example 205C

A positive resist solution was prepared as in Example 201 except that a propylene glycol monomethyl ether acetate (PGMEA) solution containing 6 mass % Resin P-n was used.

Example 206C

A positive resist solution was prepared as in Example 201 except that a propylene glycol monomethyl ether acetate (PGMEA) solution containing 6 mass % Resin P-o was used.

Example 207C

A positive resist solution was prepared as in Example 201 except that a propylene glycol monomethyl ether acetate (PGMEA) solution containing 6 mass % Resin P-p was used.

Example 208C

A negative resist solution was prepared as in Example 201 except that a propylene glycol monomethyl ether acetate (PGMEA) solution containing 6 mass % Resin P-q was used.

The components of the resins used in Examples 201 to 209 and Examples 201C to 208C are shown in Tables 7-1 and 7-2.

TABLE 7-1

| Ex. | Resin | Comp. | Structure |
|---|---|---|---|
| 201 | P-a | HEMA/MMA/MPhMA = 15/80/5 | P-a 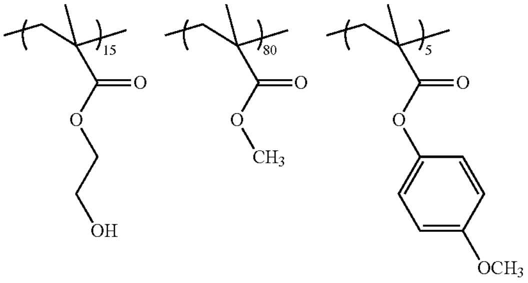 |
| 202 | P-b | HEMA/MMA/HPMA = 15/80/5 | P-b 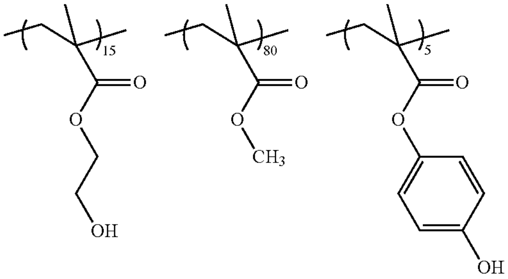 |

TABLE 7-1-continued
| Ex. | Resin | Comp. | Structure |
|---|---|---|---|
| 203 | P-c | HEMA/MMA/HPMA = 15/83/2 | 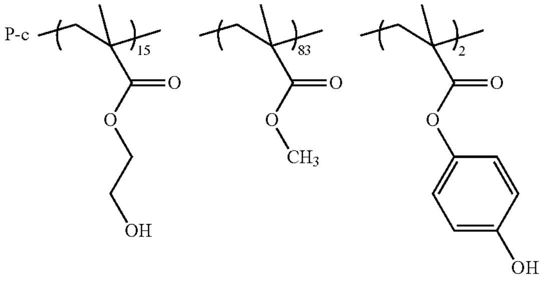 |
| 204 | P-d | HEMA/MMA/HPMA = 15/75/10 | 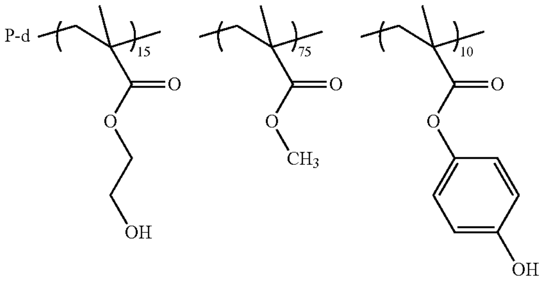 |
| 205 | P-e | HEMA/MMA/HPMAA = 15/80/5 | 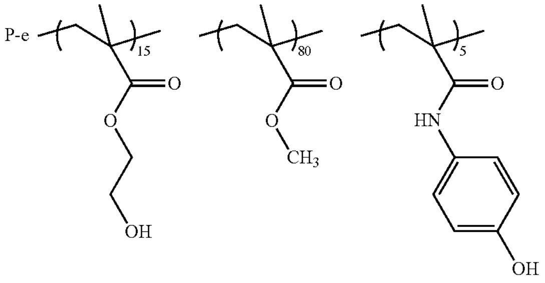 |
| 206 | P-f | HEMA/MMA/HPhMI = 15/80/5 | 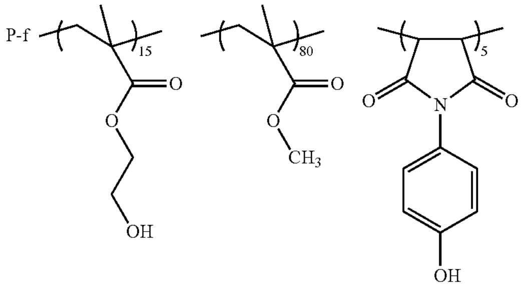 |
| 207 | P-g | HEMA/MMA/t-BuPhMA = 15/80/5 | 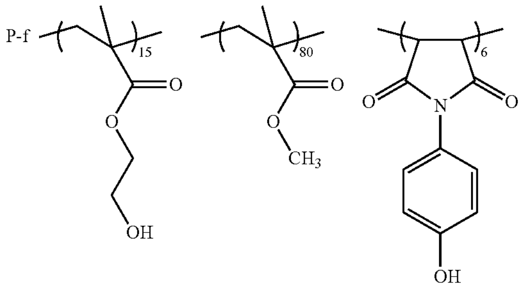 |

TABLE 7-1-continued
| Ex. | Resin | Comp. | Structure |
|---|---|---|---|
| 208 | P-h | HEMA/MMA/t-BuMPhMA = 15/80/5 | 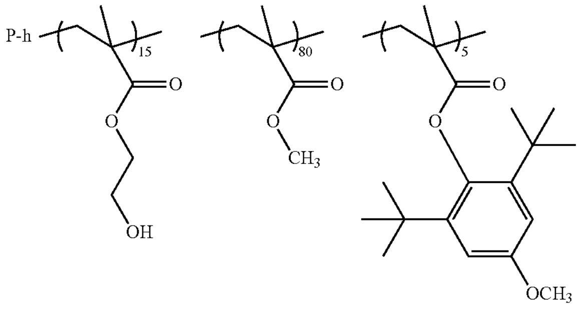 |
| 209 | P-i | HPA/GA = 70/30 | 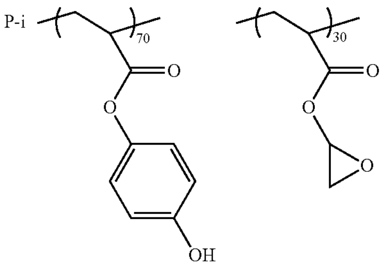 |
TABLE 7-2
| Ex. | Resin | Comp. | Structure |
|---|---|---|---|
| 201C | P-j | HEMA/MMA = 15/85 | 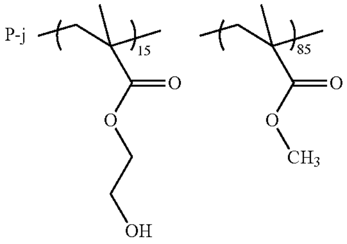 |
| 202C | P-k | HEMA/MMA/St = 15/80/5 | 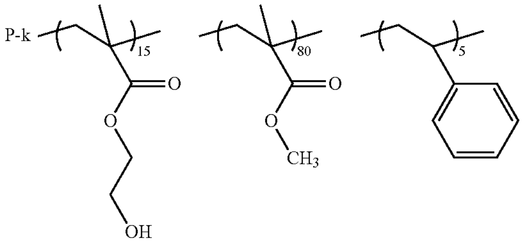 |
| 203C | P-l | HEMA/MMA/PhMA = 15/80/5 | 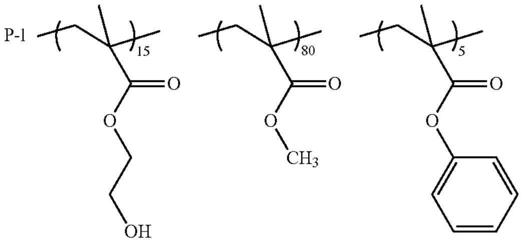 |

TABLE 7-2-continued

| Ex. | Resin | Comp. | Structure |
|---|---|---|---|
| 204C | P-m | HEMA/MMA/PhMAA = 15/80/5 | 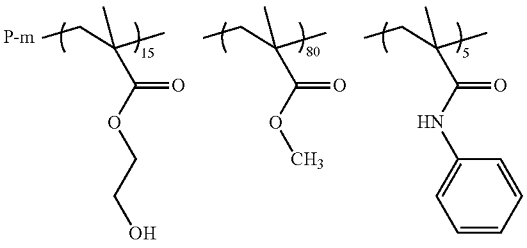 |
| 205C | P-n | HEMA/MMA/PhMI = 15/80/5 | 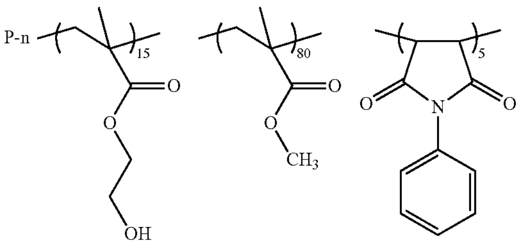 |
| 206C | P-o | HEMA/MMA/MSt = 15/80/5 | 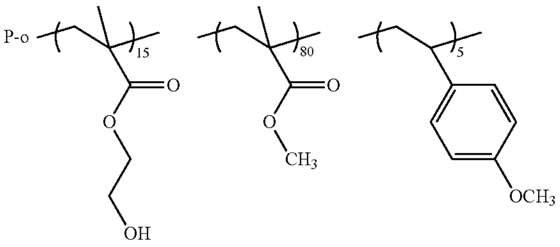 |
| 207C | P-p | HEMA/MMA/TMSt = 15/80/5 | 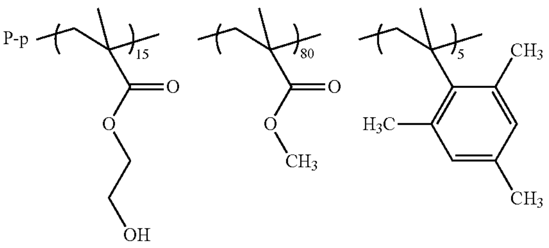 |
| 208C | P-q | St/GA = 70/30 | 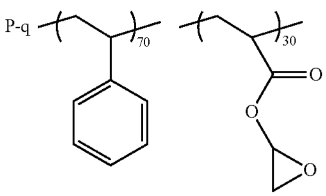 |

(2) Process of Applying Resist Solution

Each of the resist solutions of Examples 201 to 209 and Examples 201C to 208C was spin-coated on a 6-inch quartz glass substrate having a chromium deposited film with a thickness of 100 nm, followed by heating at 120° C. for 30 minutes to obtain a substrate on which a 100 nm resist film was formed. Two such substrates were prepared for each resist solution.

(3) Process of Applying Electron Beams

Of the substrates prepared in (2) above, one was irradiated with electron beams, which were point beams with acceleration voltage of 50 kV, to form a pattern with line:space=1:1. Subsequently, the substrate was immersed in methyl isobutyl ketone/isopropyl alcohol=85/15 (capacity ratio) at 25° for 1 minute, followed by rinsing with isopropyl alcohol for 30 seconds and post baking by heating it at 100° C. for 10 minutes. The obtained pattern was observed using a scanning electron microscope, and the irradiation energy when resolving a line with a width of 50 nm (line:space=1:1) was taken to provide sensitivity. The minimum resolvable size of the pattern of line:space=1:1 was observed using a scanning electron microscope with the irradiation energy exhibiting this sensitivity and was taken to provide resolution. The results are shown in Table 8.

(4) Evaluation on Dry Etching Resistance

Of the substrates prepared in (2) above, one was subjected to dry etching under temperature conditions of 23° C. in a mixed gas of $Cl_2$ (50 sccm) and $O_2$ (50 sccm) using a parallel plate type reactive ion etching device. The dry etching selection ratio (=etching rate of chromium deposited film/etching rate of resist film) in this case was calculated. An evaluation A was given if the calculated ratio was 1.5 or more, and an evaluation B was given if it was less than 1.5. The results are shown in Table 8.

TABLE 8

| | | | | Evaluation results | | | |
|---|---|---|---|---|---|---|---|
| | | | Pos./ | Sens. | Res. | DHR | |
| Ex. | Resin | Comp. | Neg. | (μc/cm$^2$) | (nm) | SR | E |
| 201 | P-a | HEMA/MMA/MPhMA = 15/80/5 | Pos. | 10 | 50 | 1.7 | A |
| 202 | P-b | HEMA/MMA/HPMA = 15/80/5 | Pos. | 35 | 25 | 2.0 | A |
| 203 | P-c | HEMA/MMA/HPMA = 15/83/32 | Pos. | 25 | 35 | 1.9 | A |
| 204 | P-d | HEMA/MMA/HPMA = 15/75/10 | Pos. | 40 | 20 | 2.3 | A |
| 205 | P-e | HEMA/MMA/HPMAA = 15/80/5 | Pos. | 50 | 10 | 2.5 | A |
| 206 | P-f | HEMA/MMA/HPhMI = 15/80/5 | Pos. | 15 | 45 | 1.8 | A |
| 207 | P-g | HEMA/MMA/t-BuPhMA = 15/80/5 | Pos. | 30 | 30 | 1.6 | A |
| 208 | P-h | HEMA/MMA/t-BuMPhMA = 15/80/5 | Pos. | 15 | 45 | 2.0 | A |
| 209 | P-i | HPA/GA = 70/30 | Neg. | 40 | 20 | 1.6 | A |
| 201C | P-j | HEMA/MMA = 15/85 | Pos. | 50 | 10 | 1.4 | B |
| 202C | P-k | HEMA/MMA/St = 15/80/5 | Pos. | 35 | 25 | 1.3 | B |
| 203C | P-l | HEMA/MMA/PhMA = 15/805 | Pos. | 50 | 10 | 1.4 | B |
| 204C | P-m | HEMA/MMA/PhMAA = 15/80/5 | Pos. | 45 | 15 | 1.4 | B |
| 205C | P-n | HEMA/MMA/PhMI = 15/80/5 | Pos. | 30 | 30 | 1.2 | B |
| 206C | P-o | HEMA/MMA/MSt = 15/80/5 | Pos. | 25 | 35 | 1.1 | B |
| 207C | P-p | HEMA/MMA/TMSt = 15/80/5 | Pos. | 25 | 35 | 1.3 | B |
| 208C | P-q | St/GA = 70/30 | Neg. | 10 | 50 | 1.1 | B |

DHR = Dry Etching Resistance
SR = Selection Ratio
E = Evaluation

All of Examples 201 to 209, in which the substrate included a resist film formed of a resin containing the repeating unit (a) having a partial structure expressed by General Formula (I) or (II), had a high selection ratio and exhibited good dry etching resistance. However, all of Examples 201C to 208C, in which the substrate included a resist film formed of a resin containing no repeating unit (a), had low selection ratio and exhibited insufficient dry etching resistance.

From the above, it can be said that the resin forming a resist film to contain the repeating unit (a) is effective in improving dry etching resistance of the resin film.

The present invention should not be construed as being limited to the embodiments described above, but can be modified in various ways when implemented without departing from the spirit of the present invention. Furthermore, the embodiments described above include various stages, and various other embodiments can be extracted by combining a plurality of disclosed elements. For example, even if some elements are eliminated from all the elements disclosed in the embodiments, the configurations with these elements eliminated can be extracted as other embodiments as long as the issues can be solved and the advantageous effects can be achieved.

The resist composition according to the present embodiment is expected to exert a great effect of improving productivity and quality when producing photomasks or producing LSIs or VLSIs.

Third Embodiment

<Synthesis of Polyol>

19 types of polyols were synthesized and referred to as P-a to P-p. The structural formulas of the repeating units contained in Polyols P-a to P-p are shown below. Also, the respective synthesis methods will be explained below.

Synthesis Example 1: Synthesis of Polyol P-a 80 parts by mass of cyclohexanone was used as a polymerization solvent. Furthermore, 5 parts by mass of 2-hydroxyethyl methacrylate (HEMA), 14 parts by mass of methyl methacrylate (MMA), and 1 part by mass of 4-methoxyphenyl methacrylate (MPhMA) were used as acrylic monomers. Also, 0.22 parts by mass of benzoyl peroxide (BPO) was used as a polymerization initiator. These materials were placed in a reaction vessel equipped with a stirrer and a reflux tube, and stirred and refluxed for 8 hours while being heated to 80° C. with an introduction of nitrogen gas into the reaction vessel. Thus, a polymer solution containing an acrylic copolymer formed of a repeating unit derived from HEMA, a repeating unit derived from MMA, and a repeating unit derived from MPhMA was obtained. The obtained polymer solution was dripped into a large amount of methanol for reprecipitation purification, and dried under reduced pressure for 24 hours at room temperature to obtain Polyol P-a.

Synthesis Example 2: Synthesis of Polyol P-b

Polyol P-b was obtained as in Synthesis Example 1 except that 4-hydroxyphenyl methacrylate (HPMA) was used instead of 4-methoxyphenyl methacrylate (MPhMA).

Synthesis Example 3: Synthesis of Polyol P-c

Polyol P-c was obtained as in Synthesis Example 2 except that 2-hydroxyethyl methacrylate (HEMA) contained was 5.6 parts by mass and 4-hydroxyphenyl methacrylate (HPMA) contained was 0.4 parts by mass.

Synthesis Example 4: Synthesis of Polyol P-d

Polyol P-d was obtained as in Synthesis Example 2 except that 2-hydroxyethyl methacrylate (HEMA) contained was 4 parts by mass and 4-hydroxyphenyl methacrylate (HPMA) contained was 2 parts by mass.

Synthesis Example 5: Synthesis of Polyol P-e

Polyol P-e was obtained as in Synthesis Example 1 except that 4-hydroxyphenyl methacrylamide (HPMAA) was used instead of 4-methoxyphenyl methacrylate (MPhMA).

Synthesis Example 6: Synthesis of Polyol P-f

Polyol P-f was obtained as in Synthesis Example 1 except that 4-hydroxyphenyl maleimide (HPhMI) was used instead of 4-methoxyphenyl methacrylate (MPhMA).

Synthesis Example 7: Synthesis of Polyol P-g

Polyol P-g was obtained as in Synthesis Example 1 except that 2,6-di-tert-butylphenyl methacrylate (t-BuPhMA) was used instead of 4-methoxyphenyl methacrylate (MPhMA).

Synthesis Example 8: Synthesis of Polyol P-h

Polyol P-h was obtained as in Synthesis Example 1 except that 2,6-di-tert-butyl-4-methoxyphenyl methacrylate (t-BuMPhMA) was used instead of 4-methoxyphenyl methacrylate (MPhMA).

Synthesis Example 9: Synthesis of Polyol P-i 80 parts by mass of cyclohexanone was used as a polymerization solvent. Furthermore, 5 parts by mass of 2-hydroxyethyl methacrylate (HEMA), 14 parts by mass of methyl methacrylate (MMA), and 1 part by mass of 4-acetoxystyrene (AcSt) were used as acrylic monomers. Also, 0.22 parts by mass of benzoyl peroxide (BPO) was used as a polymerization initiator. These materials were placed in a reaction vessel equipped with a stirrer and a reflux tube, and stirred and refluxed for 8 hours while being heated to 80° C. with an introduction of nitrogen gas into the reaction vessel. Thus, a polymer solution containing an acrylic copolymer formed of a repeating unit derived from HEMA, a repeating unit derived from MMA, and a repeating unit derived from AcSt was obtained. The obtained polymer solution was dripped into a large amount of methanol for reprecipitation purification, and dried under reduced pressure for 24 hours at room temperature to obtain a HEMA/MMA/AcSt copolymer. 2 parts by mass of 1 mol/l sodium hydroxide ethanol solution and 10 parts by mass of tetrahydrofuran were added to 1 part by mass of the obtained HEMA/MMA/AcSt copolymer, followed by stirring for 2 hours. This solution was dripped into a large amount of methanol to obtain Polyol P-i.

Synthesis Example 10: Synthesis of Polyol P-j

Polyol P-j was obtained as in Synthesis Example 1 except that 2-hydroxyethyl methacrylate (HEMA) contained was 4 parts by mass and no 4-methoxyphenyl methacrylate (MPhMA) was used.

Synthesis Example 11: Synthesis of Polyol P-k

Polyol P-k was obtained as in Synthesis Example 1 except that styrene (St) was used instead of 4-methoxyphenyl methacrylate (MPhMA).

Synthesis Example 12: Synthesis of Polyol P-l

Polyol P-l was obtained as in Synthesis Example 1 except that phenyl methacrylate (PhMA) was used instead of 4-methoxyphenyl methacrylate (MPhMA).

Synthesis Example 13: Synthesis of Polyol P-m

Polyol P-m was obtained as in Synthesis Example 1 except that phenyl methacrylamide (PhMAA) was used instead of 4-methoxyphenyl methacrylate (MPhMA).

Synthesis Example 14: Synthesis of Polyol P-n

Polyol P-n was obtained as in Synthesis Example 1 except that phenyl maleimide (PhMI) was used instead of 4-methoxyphenyl methacrylate (MPhMA).

Synthesis Example 15: Synthesis of Polyol P-o

Polyol P-o was obtained as in Synthesis Example 1 except that 4-methoxystyrene (MSt) was used instead of 4-methoxyphenyl methacrylate (MPhMA).

Synthesis Example 16: Synthesis of Polyol P-p

Polyol P-p was obtained as in Synthesis Example 1 except that 2,4,6-trimethylstyrene (TMSt) was used instead of 4-methoxyphenyl methacrylate (MPhMA).

<Chemical Formula 11-1>

P-a

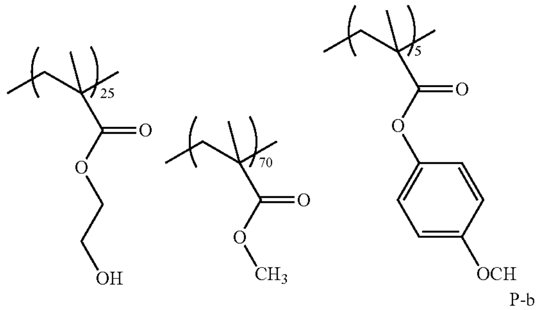

P-b

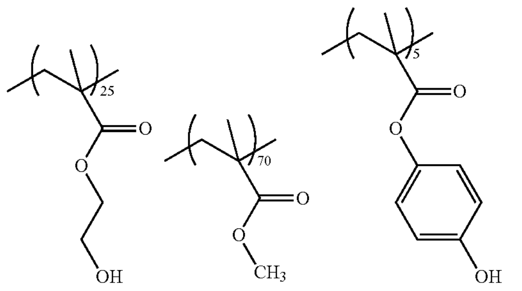

P-c

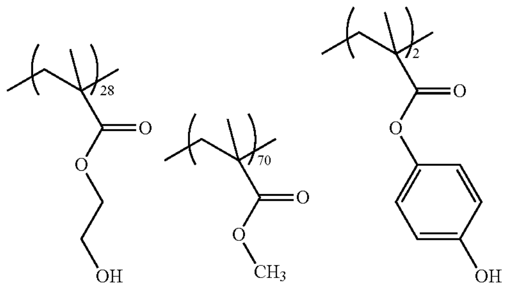

-continued
P-d
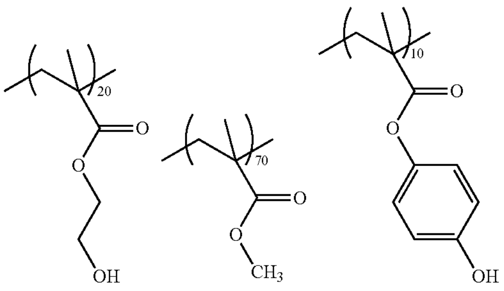
P-e
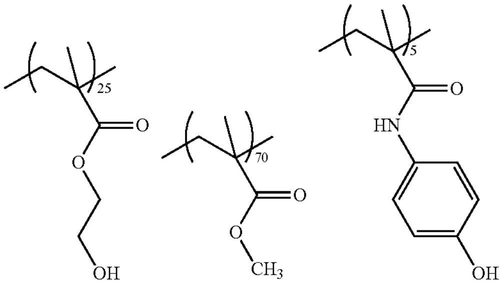
P-f
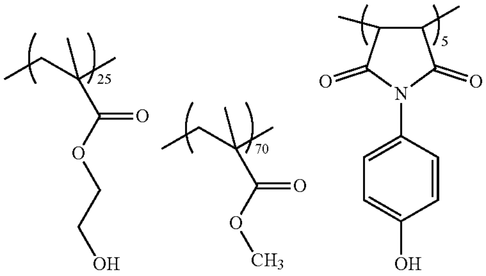
P-g
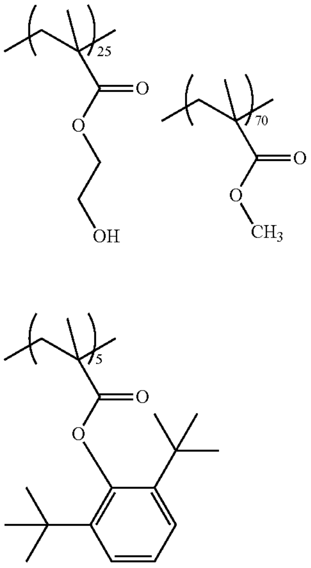
-continued
P-h
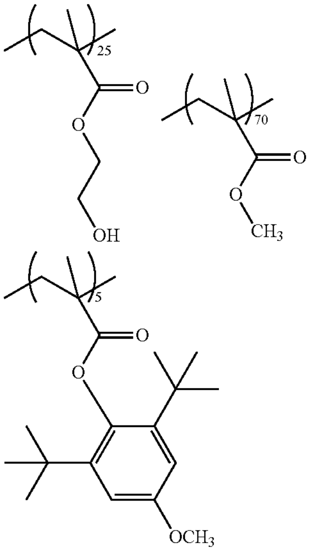
P-i
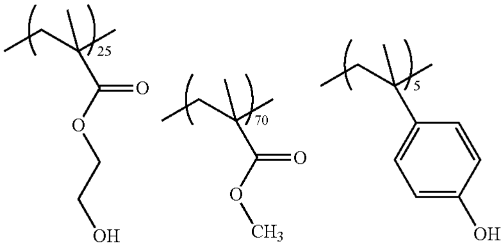
<Chemical Formula 11-2>
P-j
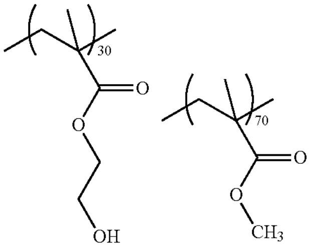
P-k
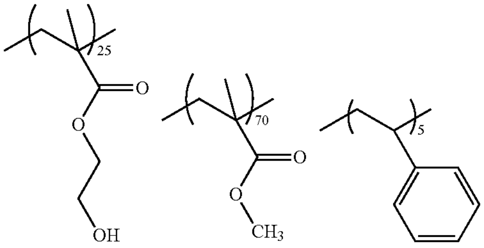
P-l
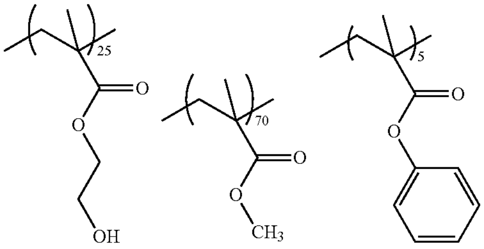

-continued

P-m

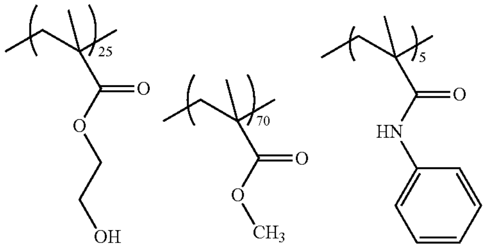

P-n

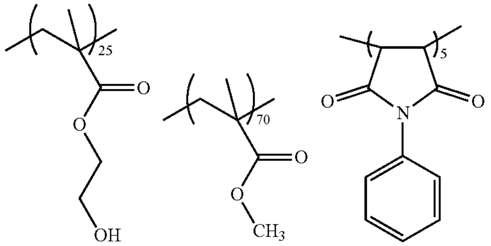

P-o

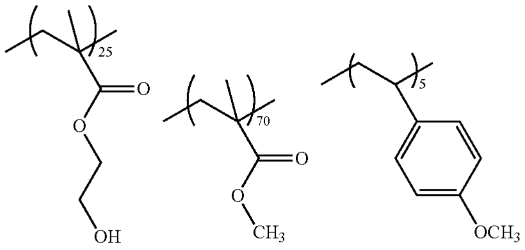

P-p

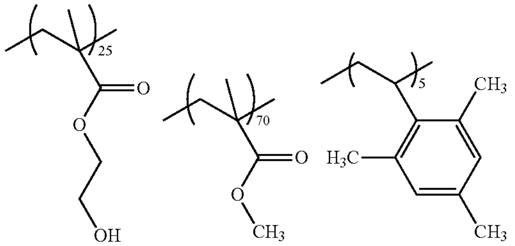

<Preparation of Gas Barrier Laminate Film>

Gas barrier laminate films of Examples 301 to 311 and Examples 301C to 308C were prepared through the following processes (1) to (6).

(1) Process of Preparing Primer Layer Solution

Example 301

A solution was prepared by mixing a methyl ethyl ketone solution of Polyol P-a in which the solid content concentration was adjusted to 5%, with a methyl ethyl ketone solution of an isocyanate compound in which the solid content concentration was adjusted to 5%, in a ratio of 7:3. As the isocyanate compound, an adduct of tolylene diisocyanate (Coronate T-65 manufactured by Tosoh Corporation) was used.

Example 302

A primer layer solution was prepared as in Example 301 except that a methyl ethyl ketone solution of Polyol P-b in which the solid content concentration was adjusted to 5% was used.

Example 303

A primer layer solution was prepared as in Example 301 except that a methyl ethyl ketone solution of Polyol P-b in which the solid content concentration was adjusted to 5% was used, and a methyl ethyl ketone solution of an isocyanate compound in which the solid content concentration was adjusted to 5% was mixed therein in a ratio of 7:3, followed by mixing a light stabilizer (Tinuvin (trademark) 292 manufactured by BASF Japan Ltd.) as an additive by 1 mass % of the solid content.

Example 304

A primer layer solution was prepared as in Example 301 except that a methyl ethyl ketone solution of Polyol P-c in which the solid content concentration was adjusted to 5% was used.

Example 305

A primer layer solution was prepared as in Example 301 except that a methyl ethyl ketone solution of Polyol P-d in which the solid content concentration was adjusted to 5% was used.

Example 306

A primer layer solution was prepared as in Example 301 except that a methyl ethyl ketone solution of Polyol P-e in which the solid content concentration was adjusted to 5% was used.

Example 307

A primer layer solution was prepared as in Example 301 except that a methyl ethyl ketone solution of Polyol P-e in which the solid content concentration was adjusted to 5% was used, and a methyl ethyl ketone solution of an isocyanate compound in which the solid content concentration was adjusted to 5% was mixed therein in a ratio of 7:3, followed by mixing a light stabilizer (Tinuvin 292 manufactured by BASF Japan Ltd.) as an additive by 1 mass % of the solid content.

Example 308

A primer layer solution was prepared as in Example 301 except that a methyl ethyl ketone solution of Polyol P-f in which the solid content concentration was adjusted to 5% was used.

Example 309

A primer layer solution was prepared as in Example 301 except that a methyl ethyl ketone solution of Polyol P-g in which the solid content concentration was adjusted to 5% was used.

Example 310

A primer layer solution was prepared as in Example 301 except that a methyl ethyl ketone solution of Polyol P-h in which the solid content concentration was adjusted to 5% was used.

Example 311

A primer layer solution was prepared as in Example 301 except that a methyl ethyl ketone solution of Polyol P-i in which the solid content concentration was adjusted to 5% was used.

Example 301C

A primer layer solution was prepared as in Example 301 except that a methyl ethyl ketone solution of Polyol P-j in which the solid content concentration was adjusted to 5% was used.

Example 302C

A primer layer solution was prepared as in Example 301 except that a methyl ethyl ketone solution of Polyol P-k in which the solid content concentration was controlled to 5% was used.

Example 303C

A primer layer solution was prepared as in Example 301 except that a methyl ethyl ketone solution of Polyol P-l in which the solid content concentration was adjusted to 5% was used.

Example 304C

A primer layer solution was prepared as in Example 301 except that a methyl ethyl ketone solution of Polyol P-l in which the solid content concentration was adjusted to 5% was used, and a methyl ethyl ketone solution of an isocyanate compound in which the solid content concentration was adjusted to 5% was mixed therein in a ratio of 7:3, followed by mixing a light stabilizer (Tinuvin 292 manufactured by BASF Japan Ltd.) as an additive by 1 mass % of the solid content.

Example 305C

A primer layer solution was prepared as in Example 301 except that a methyl ethyl ketone solution of Polyol P-m in which the solid content concentration was adjusted to 5% was used.

Example 306C

A primer layer solution was prepared as in Example 301 except that a methyl ethyl ketone solution of Polyol P-n in which the solid content concentration was adjusted to 5% was used.

Example 307C

A primer layer solution was prepared as in Example 301 except that a methyl ethyl ketone solution of Polyol P-o in which the solid content concentration was adjusted to 5% was used.

Example 308C

A primer layer solution was prepared as in Example 301 except that a methyl ethyl ketone solution of Polyol P-p in which the solid content concentration was adjusted to 5% was used.

The components of the polyols used in Examples 301 to 311 and Examples 301C to 308C are shown in Table 9.

TABLE 9-1

| | Polyol components | | | |
|---|---|---|---|---|
| Ex. | Polyol | Comp. | Structure | Ad |
| 301 | P-a | HEMA/MMA/MPhMA = 25/70/5 | 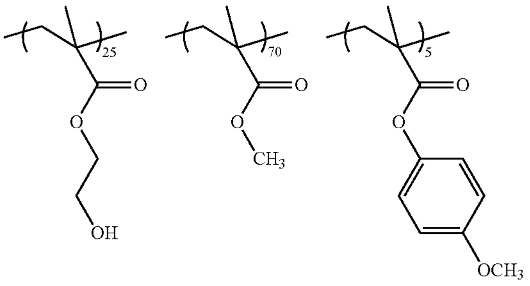 | — |
| 302 | P-b | HEMA/MMA/HPMA = 25/70/5 | 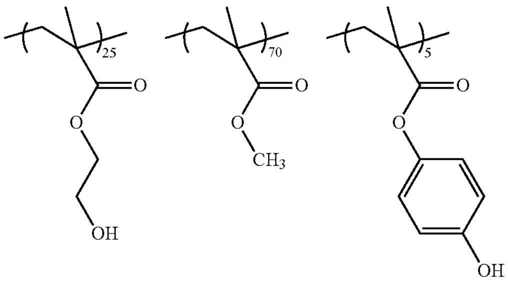 | — |

TABLE 9-1-continued
| | Polyol components | | | |
|---|---|---|---|---|
| Ex. | Polyol | Comp. | Structure | Ad |
| 303 | P-b | HEMA/MMA/HPMA = 25/70/5 | 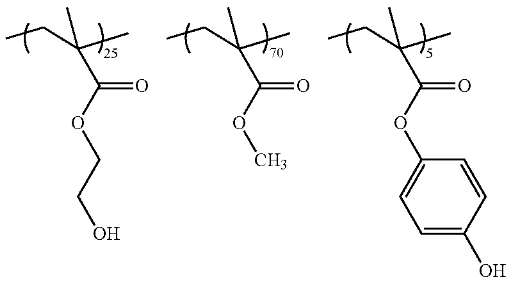 | Tinuvin 292 (1 mass %) |
| 304 | P-c | HEMA/MMA/HPMA = 28/70/2 | 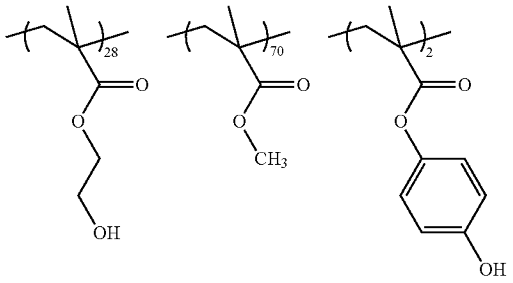 | — |
| 305 | P-d | HEMA/MMA/HPMA = 20/70/10 | 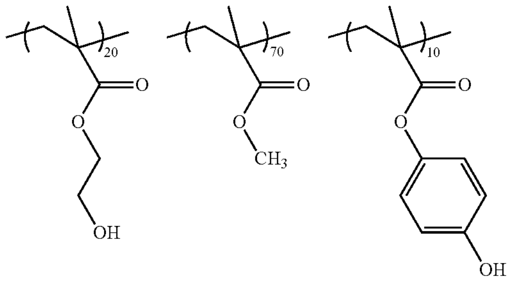 | — |
| 306 | P-e | HEMA/MMA/HPMAA = 25/70/5 | 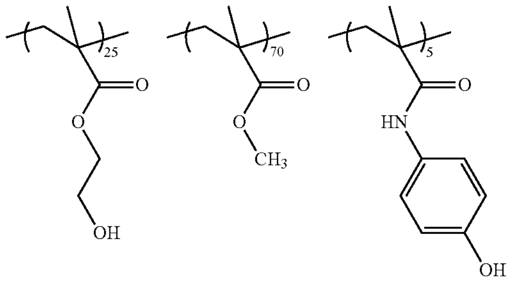 | — |
| 307 | P-e | HEMA/MMA/HPMAA = 25/70/5 | 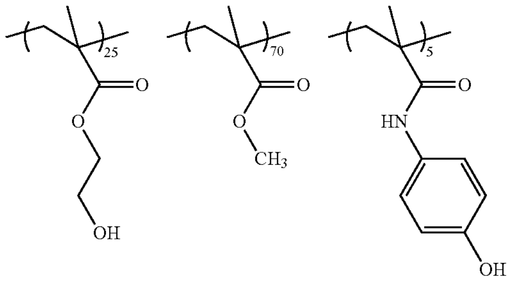 | Tinuvin 292 (1 mass %) |
Ad = Additive TABLE 9-2
| Ex. | Resin | Comp. | Structure | Ad |
|---|---|---|---|---|
| 308 | P-f | HEMA/MMA/HPhMI = 25/70/5 | 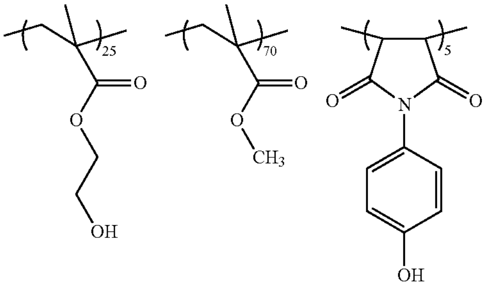 | — |
| 309 | P-g | HEMA/MMA/t-BuPhMA = 25/70/5 | 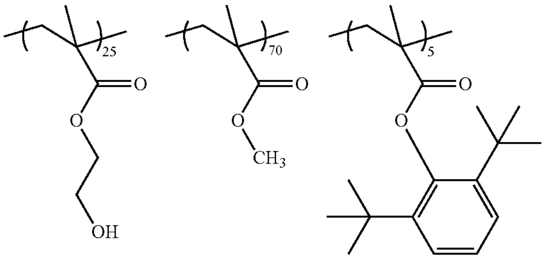 | — |
| 310 | P-h | HEMA/MMA/t-BuMPhMA = 25/70/5 | 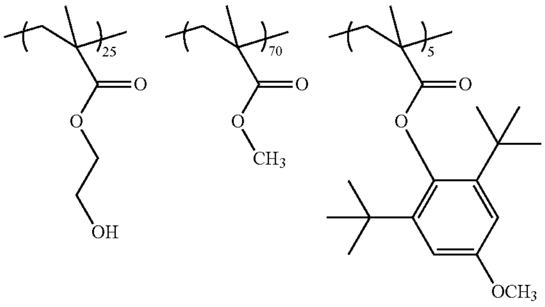 | — |
| 311 | P-i | HEMA/MMA/HSt = 25/70/5 | 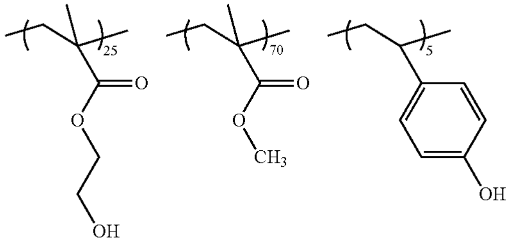 | — |
| 301C | P-j | HEMA/MMA = 30/70 | 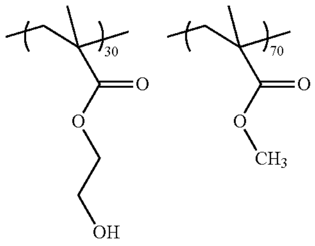 | — |

TABLE 9-2-continued
| Ex. | Resin | Comp. | Structure | Ad |
|---|---|---|---|---|
| 302C | P-k | HEMA/MMA/St = 25/70/5 | 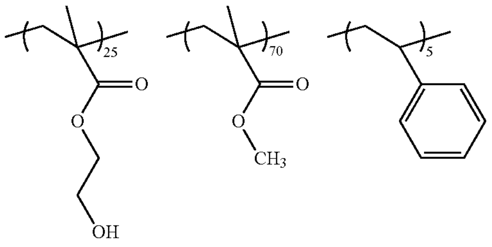 | — |
| 303C | P-l | HEMA/MMA/PhMA = 25/70/5 | 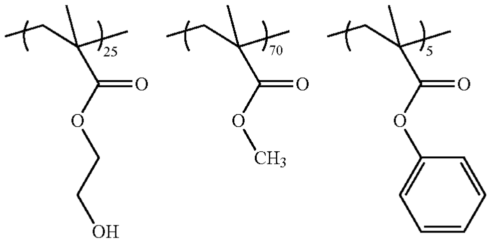 | — |
Ad = Additive
TABLE 9-3
| Ex. | Resin | Comp. | Structure | Ad |
|---|---|---|---|---|
| 304C | P-l | HEMA/MMA/PhMA = 25/70/5 | 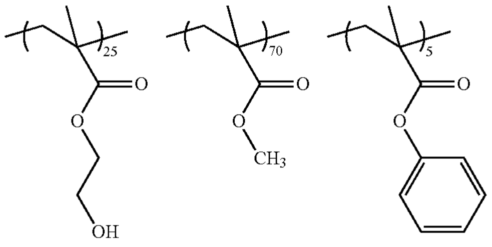 | Tinuvin 292 (1 mass %) |
| 305C | P-m | HEMA/MMA/PhMAA = 25/70/5 | 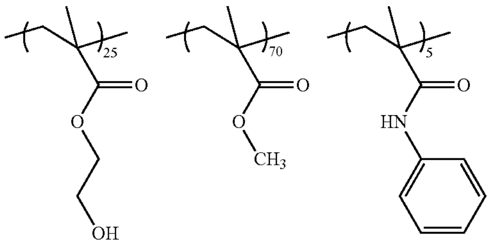 | — |
| 306C | P-n | HEMA/MMA/PhMI = 25/70/5 | 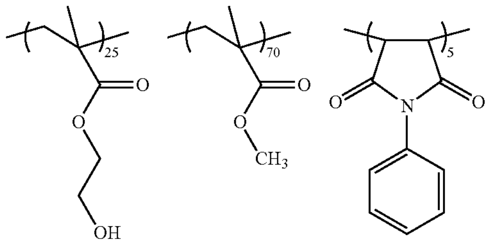 | — |

TABLE 9-3-continued

| Ex. | Resin | Comp. | Structure | Ad |
|---|---|---|---|---|
| 307C | P-o | HEMA/MMA/MSt = 25/70/5 | 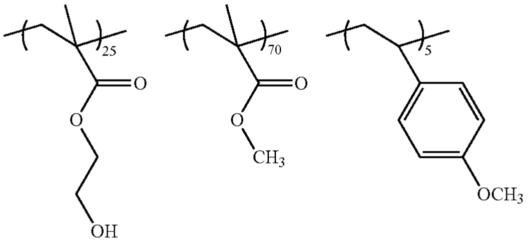 | — |
| 308C | P-p | HEMA/MMA/TMSt = 25/70/5 | 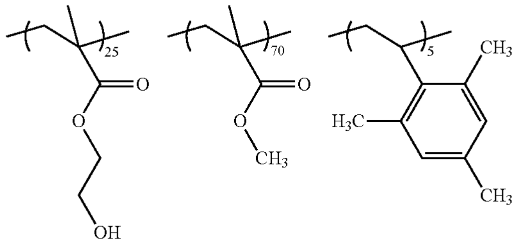 | — |

Ad = Additive (2) Process of Applying Primer Layer Solution

A biaxially stretched PET film (P60 manufactured by Toray Advanced Film Co., Ltd.) with a thickness of 12 μm with one surface corona-treated was used as a resin substrate. Each of the primer layer solutions of Examples 301 to 311 and Examples 301C to 308C was applied to the corona-treated surface of the resin substrate using a gravure coater so that the dry thickness would be 0.20 μm.

(3) Process of Laminating Deposited Layer

A material in which a metallic silicon powder and a silicon dioxide powder were mixed so that the element ratio O/Si would be 1.5 was prepared, and a deposited layer with a thickness of 0.05 μm was laminated on the primer layer using a vacuum deposition machine to prepare a gas barrier laminate film for each of Examples 301 to 311 and Examples 301C to 308C.

(4) Process of Preparing Gas Barrier Coating Layer Solution

A solution obtained by hydrolyzing tetraethoxysilane with 0.02 mol/L hydrochloric acid was added to a 5% aqueous solution of PVA with 99% saponification and a polymerization degree of 2,400, in a ratio of $SiO_2$/PVA=60/40 to obtain a gas barrier coating layer solution.

(5) Process of Applying Gas Barrier Coating Layer Solution

The above gas barrier coating layer solution was applied onto the deposited layer of the gas barrier laminate film of each of Examples 301 to 311 and Examples 301C to 308C prepared in Process (3) using a gravure coater to laminate a gas barrier coating layer with a dry thickness of 0.40 μm, thereby preparing a gas barrier laminate film of each of Examples 301 to 311 and Examples 301C to 308C.

(6) Process of Laminating Laminate Resin Layer on Gas Barrier Laminate Film

For the gas barrier laminate film of each of Examples 301 to 311 and Examples 301C to 308C with the gas barrier coating layer laminated in Process (5), a hydrolysis resistant PET (X10S manufactured by Toray Advanced Film Co., Ltd.) with a thickness of 50 μm was laminated on each of both surfaces via a 5 g/$m^2$ polyurethane adhesive using a dry lamination method, thereby preparing a gas barrier laminate film of each of Examples 301 to 311 and Examples 301C to 308C.

<Evaluation of Gas Barrier Laminate Film> (1) Measurement of Water Vapor Permeability For the gas barrier laminate films of Examples 301 to 311 and Examples 301C to 308C prepared in Process (3), water vapor permeability (g/$m^2$/day) was measured using a water vapor permeability measuring device (Mocon PERMATRAN-W3/31) manufactured by Modern Control Inc. in an atmosphere of 40° C.-90RH %. The results are shown in Table 10.

(2) High Temperature Tests

Each of the gas barrier laminate films of Examples 301 to 311 and Examples 301C to 308C prepared in Process (6) was cut to a width of 10 mm and subjected to high temperature testing under temperature and time conditions of the heat resistance test according to JISC 8917.

(3) Light Resistance Tests

For the gas barrier laminate films of Examples 301 to 311 and Examples 301C to 308C after high temperature testing, light resistance tests were conducted. Conditions for the light resistance tests were based on the light irradiation test according to JIS C 8917 and the irradiation time was 120 hours.

(4) Measurement of Adhesion Strength

Adhesion strength was measured using a Tensilon type universal tester for the gas barrier laminate films of Examples 301 to 311 and Examples 301C to 308C which had undergone only high temperature testing, and for the gas barrier laminate films of Examples 301 to 311 and Examples 301C to 308C which had undergone both of high temperature testing and light resistance testing. Specifically, the T-peeling test and 180-degree peeling test according to the testing methods of JIS K 6854 were performed to measure lamination strength (N/10 mm width). In both of the T-peeling test and 180-degree peeling test, those which had a lamination strength (adhesion strength) of 1 N/10 mm width or more were evaluated as A or above the pass level, and those which were less than 1 N/10 mm width were evaluated as B or below the pass level. The results are shown in Table 10.

TABLE 10

| | Evaluation results | | |
|---|---|---|---|
| | | Adhesion strength | |
| Ex. | Water vapor permeability | After high temperature test | After light resistance test |
| 301 | 1.3 | A | B |
| 302 | 1.2 | A | B |
| 303 | 1.3 | A | A |
| 304 | 1.4 | A | B |
| 305 | 1.7 | A | B |
| 306 | 1.1 | A | B |
| 307 | 1.2 | A | A |
| 308 | 1.3 | A | B |
| 309 | 1.4 | A | B |
| 310 | 1.5 | A | B |
| 311 | 1.8 | A | B |
| 301C | 1.4 | B | B |
| 302C | 2.0 | B | B |
| 303C | 0.9 | B | B |
| 304C | 1.0 | B | B |
| 305C | 0.9 | B | B |
| 306C | 1.5 | B | B |
| 307C | 2.3 | B | B |
| 308C | 3.3 | B | B |

All of the gas barrier laminate films of Examples 301 to 311, in which the polyol forming the primer layer 12 contained the repeating unit (a) having a partial structure expressed by General Formula (I) or (II), had adhesion strength of 1 N/10 mm width or more even after high temperature testing. However, all of the gas barrier laminate films of Examples 301C to 308C, in which the polyol forming the primer layer 12 did not contain the repeating unit (a), had adhesion strength of less than 1 N/10 mm width after high temperature testing.

Furthermore, the gas barrier laminate film of Example 302 was deteriorated in adhesion strength after light resistance testing and was below the pass level, whereas the gas barrier laminate film of Example 303, which was prepared under the same conditions except for adding the light stabilizer when preparing the primer layer solution, exhibited adhesion strength above the pass level of the light resistance tests. Similarly, comparing Examples 306 and 307, only Example 307 which had used the light stabilizer exhibited adhesion strength above the pass level of the light resistance tests. However, Example 304C, in which the light stabilizer was similarly used but the polyol forming the primer layer 12 did not contain the repeating unit (a), was insufficient in adhesion strength even during high temperature testing and was below the pass level. This is because, due to use of the polyol containing the repeating unit (a), thermal deterioration of the light stabilizer as an additive could be suppressed.

From the above, it can be said that the polyol forming the primer layer to contain the repeating unit (a) is effective in improving adhesion of the gas barrier laminate film.

The gas barrier film laminate of the present embodiment is expected to be preferably used in the packaging fields for foods, daily necessities, pharmaceuticals, and the like, and the fields of electronic device related parts and the like, and in particular, expected to be preferably used in the case where high durability is required.

Fourth Embodiment

Example 401

A polyester film with a thickness of 12 μm was used as a substrate film 101 to which a coating liquid containing an acrylic polyol that contained 20 mol % of partial structure derived from 4-hydroxyphenyl methacrylate, a TDI-based curing agent as an isocyanate, and γ-isocyanatopropyltrimethoxysilane as a silane coupling agent was applied, followed by heating and drying to form a primer layer 102 with a thickness of 1 μm. Next, silicon oxide was deposited on the primer layer 102 to form a silicon oxide deposited layer 103 with a thickness of 200 nm. Next, a coating liquid containing tetramethoxysilane, 1,3,5-tris(3-trimethoxysilylpropyl) isocyanurate, and PVA was applied onto the silicon oxide deposited layer 103, followed by heating and drying for condensation of a silicon compound to form a gas barrier coating layer 104 with a thickness of 1 μm. This film is termed silicon gas barrier film hereinafter to distinguish from comparison films described later.

Next, an adhesive (product name: A525, dry lamination adhesive manufactured by Mitsui Chemicals, Inc.) was applied to the silicon gas barrier film using a dry lamination machine, followed by bonding thereto a polyolefin-based unstretched coextrusion film (product name: RXC22 manufactured by Mitsui Chemicals Tohcello, Inc.) with a thickness of 70 μm as a heat-sealing layer 105 to prepare a laminate. Then, surfaces of this laminate were overlapped each other with the periphery heat-sealed to prepare a three-sided heat sterilization bag with a length of 125 mm and a width of 95 mm.

Example 402

A silicon gas barrier film and a three-sided heat sterilization bag were prepared as in Example 401 except that a compound having a partial structure derived from phenyl methacrylate was used as an acrylic polyol, instead of the compound having a partial structure derived from 4-hydroxyphenyl methacrylate.

Example 403

A silicon gas barrier film and a three-sided heat sterilization bag were prepared as in Example 401 except that a compound having a partial structure derived from 4-hydroxyphenyl methacrylamide was used as an acrylic polyol instead of the compound having a partial structure derived from 4-hydroxyphenyl methacrylate.

Example 404

An adhesive (product name: A525, dry lamination adhesive manufactured by Mitsui Chemicals, Inc.) was applied to the silicon gas barrier film of Example 401 using a dry lamination machine, followed by bonding thereto a polyamide film (product name: BONYL W manufactured by Kohjin co., Ltd.) with a thickness of 15 μm, further followed by applying an adhesive (product name: A525, dry lamination adhesive manufactured by Mitsui Chemicals, Inc.) onto the polyamide film using a dry lamination machine, followed by bonding thereto a polyolefin-based unstretched coextrusion film (product name: RXC22 manufactured by Mitsui Chemicals Tohcello, Inc.) with a thickness of 70 μm as a heat-sealing layer 105 to prepare a laminate. Then, surfaces of this laminate were overlapped each other with the periphery heat-sealed to prepare a three-sided heat sterilization bag with a length of 125 mm and a width of 95 mm.

Example 401C

A silicon gas barrier film and a three-sided heat sterilization bag were prepared as in Example 401 except that a compound having a partial structure derived from styrene was used as an acrylic polyol instead of the compound having a partial structure derived from 4-hydroxyphenyl methacrylate.

Example 402C

A silicon gas barrier film and a three-sided heat sterilization bag were prepared as in Example 401 except that a compound having a partial structure derived from hydroxyethyl methacrylate was used as an acrylic polyol instead of the compound having a partial structure derived from 4-hydroxyphenyl methacrylate.

Example 403C

For Example 401, aluminum oxide was deposited on the primer layer 102 to form an aluminum oxide deposited layer with a thickness of 200 nm. Next, a coating liquid containing metal alkoxide and a water-soluble polymer having a hydroxyl group was applied onto the aluminum oxide deposited layer, followed by heating and drying for condensation of the metal alkoxide to form a gas barrier coating layer 104 with a thickness of 1 μm. This film is termed aluminum gas barrier film hereinafter.

Next, an adhesive (product name: A525, dry lamination adhesive manufactured by Mitsui Chemicals, Inc.) was applied to the aluminum gas barrier film using a dry lamination machine, followed by bonding thereto a polyolefin-based unstretched coextrusion film (product name: RXC22 manufactured by Mitsui Chemicals Tohcello, Inc.) with a thickness of 70 μm as a heat-sealing layer 105 to prepare a laminate. Then, surfaces of this laminate were overlapped each other with the periphery heat-sealed to prepare a three-sided heat sterilization bag with a length of 125 mm and a width of 95 mm.

Example 404C

An adhesive (product name: A525, dry lamination adhesive manufactured by Mitsui Chemicals, Inc.) was applied to the aluminum gas barrier film using a dry lamination machine, followed by bonding thereto a polyamide film (product name: BONYL W manufactured by Kohjin co., Ltd.) with a thickness of 15 μm, further followed by applying an adhesive (product name: A525, dry lamination adhesive manufactured by Mitsui Chemicals, Inc.) onto the polyamide film using a dry lamination machine, followed by bonding thereto a polyolefin-based unstretched coextrusion film (product name: RXC22 manufactured by Mitsui Chemicals Tohcello, Inc.) with a thickness of 70 μm as a heat-sealing layer 105 to prepare a laminate. Then, surfaces of this laminate were overlapped each other with the periphery heat-sealed to prepare a three-sided heat sterilization bag with a length of 125 mm and a width of 95 mm.

(Evaluation)

50 ml of pure water was filled in each of the three-sided heat sterilization bags of Examples 401 to 404 and Examples 401C to 404C, followed by retort sterilization at 130° C. for 30 minutes using a retort treatment device (product name: RCS-40RTG.N manufactured by Hisaka Works, Ltd.).

Then, oxygen barrier properties and water vapor barrier properties before and after retort sterilization were evaluated as follows. Furthermore, anti-bag-breaking strength after retort sterilization was evaluated through pressure resistance tests and drop tests. Also, adhesion between the substrate and the inorganic deposited layer was evaluated by visual inspection for the occurrence of delamination after retort sterilization. The results are shown in Table 11.

Oxygen barrier properties were evaluated by measuring water vapor permeability under conditions of 30° C. and 70RH % using a Mocon method according to JIS K7126. Furthermore, water vapor barrier properties were evaluated by measuring oxygen permeability under conditions of 40° C. and 90RH % using a Mocon method according to JIS K7129. In both of the evaluations, a smaller value means better barrier properties.

In the pressure resistance tests, 80 kg weight was applied to each of the three-sided bags after retort sterilization, maintained this state for 1 minute, and the number of broken bags was counted. In the drop tests, the three-sided bags after retort sterilization were stored in a refrigerator at 5° C. for 24 hours, each of them was dropped onto a concrete floor twice from the height of 80 cm so that the flat portion of the three-sided bag hit the floor, and the number of broken bags was counted. In both of these tests, the number of samples per example was five. The numeral 0/5 in the table means that none of them was broken.

The occurrence of delamination was inspected by bending the sealing portion of each pouch 180° after retort sterilization treatment. As a result of visual observation, an evaluation B was given if the inorganic oxide deposited layer was delaminated from the substrate film, and an evaluation A was given if no delamination was observed.

TABLE 11

| Retort | Oxygen permeability (cc/m²/day) | | Water vapor permeability (g/m²/day) | | Pressure resistance test (Number of broken bags) | Drop test (Number of broken bags) | Delamination | Comprehensive |
|---|---|---|---|---|---|---|---|---|
| Ex. | Before | After | Before | After | After | After | After | evaluation |
| 401 | 0.2 | 0.2 | 0.3 | 0.6 | 0/5 | 0/5 | A | A |
| 402 | 0.3 | 0.3 | 0.3 | 0.6 | 0/5 | 0/5 | A | A |
| 403 | 0.2 | 0.2 | 0.3 | 0.5 | 0/5 | 0/5 | A | A |
| 404 | 0.2 | 0.2 | 0.3 | 0.3 | 0/5 | 0/5 | A | A |
| 401C | 0.2 | 0.2 | 0.3 | 0.7 | 0/5 | 0/5 | B | B |
| 402C | 0.2 | 0.2 | 0.4 | 0.7 | 0/5 | 0/5 | B | B |
| 403C | 0.3 | 0.3 | 0.8 | 2.1 | 0/5 | 0/5 | A | B |
| 404C | 0.3 | 0.3 | 0.8 | 2.0 | 0/5 | 0/5 | A | B |

As can be seen from Table 11, there is no dominant difference between Examples 401 to 404 and Examples 401C to 404C regarding the pressure resistance tests and the drop tests. All of them have good anti-bag-breaking strength. Also, there is no dominant difference between Examples 401 to 404 and Examples 401C to 404C in oxygen barrier properties before and after retort sterilization.

On the other hand, water vapor barrier properties of the three-sided retort sterilization bags of Examples 403C and 404C are significantly deteriorated after retort sterilization, whereas barrier properties of the three-sided bags of Examples 401 to 404 and Examples 401C and 402C are highly maintained even after retort sterilization.

Furthermore, in delamination evaluation, peeling was observed between the substrate film and the inorganic oxide deposited layer in Examples 401C and 402C.

From these results, it is understood that the packaging bag of the present embodiment maintains good anti-bag-breaking strength and oxygen barrier properties before and after retort sterilization, while greatly improving water vapor barrier properties and providing good adhesion between the substrate and the inorganic deposited layer after retort sterilization.

Fifth Embodiment

The performance of the hard coating film of the present embodiment was evaluated through the following methods.

Haze: Haze (%) of the hard coating film was obtained by performing measurements according to JIS-K7105 using NDH-2000 manufactured by Nippon Denshoku Industries Co., Ltd.

Total light transmittance: Transmittance (%) of the hard coating film was obtained by performing measurements according to JIS-K7105 using NDH-2000 manufactured by Nippon Denshoku Industries Co., Ltd.

Pencil hardness: Hardness of the hard coating layer of the hard coating film was obtained by performing evaluation according to JIS-K5400.

Abrasion resistance: The occurrence of scratches was inspected after reciprocating #0000 steel wool 10 times on the hard coating layer of the hard coating film with 250 g/cm² weight imposed. The criteria were as follows.

A: Scratches observed

B: No scratches observed.

Antifouling properties: Fingerprints were left on the surface of the hard coating layer of the hard coating film, the fingerprints were wiped off using non-woven cellulose fabric (BEMCOT M-3 manufactured by Asahi Kasei Corporation) with 250 g/cm² weight imposed, and ease of wiping was visually determined. The criteria were as follows.

A: Fingerprints were completely wiped off.

B: Trace of wiping fingerprints remained.

C: Fingerprints could not be wiped off.

Surface energy: A droplet with a diameter of 1.8 mm in a dry state (20° C.-65RH %) was formed at the tip of a needle using a contact angle meter (CA-X type manufactured by Kyowa Interface Science Co., Ltd.), and the droplet was brought into contact with the surface of the hard coating layer to form the droplet thereon. The contact angle refers to the angle formed between the tangent line to the liquid surface and the solid surface at the point where the solid and the liquid come into contact with each other, and is defined as an angle on the liquid-containing side. As the liquid, distilled water and n-hexadecane were used. Based on the contact angles of the two types of solutions, surface energy was calculated using the extended Fowkes' formula.

Heat resistance: A coating film of a hard coating layer-forming composition was formed on a glass substrate, several mg or so of the film was cut out from the glass substrate and enclosed in a shallow aluminum container, and a mass reduction ratio (%) was measured under nitrogen atmosphere. For measurement of mass reduction ratio (%), a differential heat thermal mass simultaneous measurement device (STA 7000 manufactured by Hitachi High-Tech Science Corporation) was used. The sample was placed under nitrogen atmosphere and heated at 250° C. for 20 minutes, and a mass ($M_1$) after heating was subtracted from an initial mass ($M_0$) before heating, followed by dividing the subtracted mass reduction ($M=M_0-M_1$) by the initial mass ($M_0$) to calculate a mass reduction ratio ($[M/M_0]\times100$) (%). Lower mass reduction ratio means that better heat resistance has been exhibited.

Thermal deterioration of additive: The hard coating layer-forming composition had been mixed with a 0.1 part by mass of the hindered amine light stabilizer (product name: Tinuvin (trademark) 123 manufactured by BASF Japan Ltd.) as an additive, and thus a hard coating layer to which the light stabilizer was added was formed on the glass substrate. The glass substrate on which the coating film was formed was heated at 250° C. for 10 minutes to measure a residual ratio of the additive in the coating film through the following method. The glass substrate was cut to a size of 1 cm² and immersed in 1.5 mL of acetone to perform extraction for 60 minutes in an ultrasonic cleaner. The additive in the glass substrate extract was quantified through ultra high performance liquid chromatography/mass spectrometry (UHPLC/MS) (using ultra high liquid chromatograph/mass spectrometer (UHPLC/MS), 1260 LC System/6130B Single Quad MS System manufactured by Agilent Technologies Inc.). The amount of additive ($V_1$) remaining after heating was divided by the initial amount of additive ($V_0$) before heating to calculate a residual ratio of additive ($[V_1/V_0]\times100$)(%).

In the above evaluation, hard coating films of Examples 501 to 504 and Examples 501C to 504C were used. Methods of preparing these hard coating films will be explained below.

Example 501

A cellulose triacetate film substrate with a thickness of 80 μm was used as a transparent substrate. A coating liquid was prepared by stirring and mixing the following components:

| | |
|---|---|
| Urethane acrylate: Dipentaerythritol pentaacrylate hexamethylene diisocyanate urethane prepolymer, UA-306H (Kyoeisha Chemical Co., Ltd.) | 80 parts by mass |
| Acrylic monomer: 4-hydroxyphenyl methacrylate (Showa Denko K.K.) | 10 parts by mass |
| Initiator: Omnirad 184 (IGM Resins B.V.) | 1.5 parts by mass |
| Fluorine compound: OPTOOL DAC (Daikin Industries, Ltd.) | 0.5 parts by mass |
| Additive: Tinuvin 123 (BASF Japan Ltd.) | 0.1 part by mass |
| Solvent: Ethyl acetate | 100 parts by mass |

The coating liquid was applied to the above substrate with a cured thickness of 12 μm using a bar coating method, followed by drying. Next, a hard coating layer was formed by irradiating the coating with 400 mJ/cm$^2$ UV rays using a metal halide lamp to prepare a hard coating film of Example 501. Measurement results on total light transmittance, haze, scratch resistance, pencil hardness, antifouling properties, and heat resistance of the hard coating films are summarized in Table 12.

Example 502

A cellulose triacetate film substrate with a thickness of 80 μm was used as a transparent substrate. A coating liquid was prepared by stirring and mixing the following components:

| | |
|---|---|
| Urethane acrylate: Pentaerythritol triacrylate isophorone diisocyanate urethane prepolymer, UA-306I (Kyoeisha Chemical Co., Ltd.) | 80 parts by mass |
| Acrylic monomer: 4-hydroxyphenyl methacrylate (Showa Denko K.K.) | 10 parts by mass |
| Initiator: Omnirad 184 (IGM Resins B.V.) | 1.5 parts by mass |
| Fluorine compound: OPTOOL DAC (Daikin Industries, Ltd.) | 0.5 parts by mass |
| Additive: Tinuvin 123 (BASF Japan Ltd.) | 0.1 part by mass |
| Solvent: Ethyl acetate | 100 parts by mass |

The coating liquid was applied to the above substrate with a cured thickness of 12 μm using a bar coating method, followed by drying. Next, a hard coating layer was formed by irradiating the coating with 400 mJ/cm$^2$ UV rays using a metal halide lamp to prepare a hard coating film of Example 502. Measurement results on total light transmittance, haze, scratch resistance, pencil hardness, antifouling properties, and heat resistance of the hard coating films are summarized in Table 12.

Example 503

A cellulose triacetate film substrate with a thickness of 80 μm was used as a transparent substrate. A coating liquid was prepared by stirring and mixing the following components:

| | |
|---|---|
| Urethane acrylate: UA-306H (Kyoeisha Chemical Co., Ltd.) | 80 parts by mass |
| Acrylic monomer: 4-hydroxyphenyl methacrylate (Showa Denko K.K.) | 10 parts by mass |
| Initiator: Omnirad 184 (IGM Resins B.V.) | 1.5 parts by mass |
| Fluorine compound: Defenser TF3001 (DIC Corporation) | 1.0 part by mass |
| Additive: Tinuvin 123 (BASF Japan Ltd.) | 0.1 part by mass |
| Solvent: Ethyl acetate | 100 parts by mass |

The coating liquid was applied to the above substrate with a cured thickness of 12 μm using a bar coating method, followed by drying. Next, a hard coating layer was formed by irradiating the coating with 400 mJ/cm$^2$ UV rays using a metal halide lamp to prepare a hard coating film of Example 503. Measurement results on total light transmittance, haze, scratch resistance, pencil hardness, antifouling properties, and heat resistance of the hard coating films are summarized in Table 12.

Example 504

A cellulose triacetate film substrate with a thickness of 80 μm was used as a transparent substrate. A coating liquid was prepared by stirring and mixing the following components:

| | |
|---|---|
| Urethane acrylate: UA-306H (Kyoeisha Chemical Co., Ltd.) | 80 parts by mass |
| Acrylic monomer: N-(4-hydroxyphenyl) methacrylamide (FUJIFILM Wako Pure Chemical Corporation) | 10 parts by mass |
| Initiator: Omnirad 184 (IGM Resins B.V.) | 1.5 parts by mass |
| Fluorine compound: OPTOOL DAC (Daikin Industries, Ltd.) | 0.5 parts by mass |
| Additive: Tinuvin 123 (BASF Japan Ltd.) | 0.1 part by mass |
| Solvent: Methyl isobutyl ketone | 100 parts by mass |

The coating liquid was applied to the above substrate with a cured thickness of 12 μm using a bar coating method, followed by drying. Next, a hard coating layer was formed by irradiating the coating with 400 mJ/cm$^2$ UV rays using a metal halide lamp to prepare a hard coating film of Example 504. Measurement results on total light transmittance, haze, scratch resistance, pencil hardness, antifouling properties, and heat resistance of the hard coating films are summarized in Table 12.

Example 501C

A cellulose triacetate film substrate with a thickness of 80 μm was used as a transparent substrate. A coating liquid was prepared by stirring and mixing the following components:

| | |
|---|---|
| Urethane acrylate: UA-306H (Kyoeisha Chemical Co., Ltd.) | 80 parts by mass |
| Acrylic monomer: 4-hydroxyphenyl methacrylate (Showa Denko K.K.) | 10 parts by mass |
| Initiator: Omnirad 184 (IGM Resins B.V.) | 1.5 parts by mass |
| Non-polymerizable fluorine compound: Mega Fuck F470 (DIC Corporation) | 1.0 part by mass |
| Additive: Tinuvin 123 (BASF Japan Ltd.) | 0.1 part by mass |
| Solvent: Ethyl acetate | 100 parts by mass |

The coating liquid was applied to the above substrate with a cured thickness of 12 μm using a bar coating method, followed by drying. Next, a hard coating layer was formed by irradiating the coating with 400 mJ/cm$^2$ UV rays using a metal halide lamp to prepare a hard coating film of Example 501C. Measurement results on total light transmittance, haze, scratch resistance, pencil hardness, and antifouling properties of the hard coating film are summarized in Table 12.

Example 502C

A cellulose triacetate film substrate with a thickness of 80 μm was used as a transparent substrate. A coating liquid was prepared by stirring and mixing the following components:

| | |
|---|---|
| Urethane acrylate: UA-306H (Kyoeisha Chemical Co., Ltd.) | 80 parts by mass |
| Acrylic monomer: 4-hydroxyphenyl methacrylate (Showa Denko K.K.) | 10 parts by mass |
| Initiator: Omnirad 184 (IGM Resins B.V.) | 1.5 parts by mass |
| Silicone additive: BYK-UV3500 (BYK-Chemie GmbH) | 1.0 part by mass |

-continued

| | |
|---|---|
| Additive: Tinuvin 123 (BASF Japan Ltd.) | 0.1 part by mass |
| Solvent: Ethyl acetate | 100 parts by mass |

The coating liquid was applied to the above substrate with a cured thickness of 12 μm using a bar coating method, followed by drying. Next, a hard coating layer was formed by irradiating the coating with 400 mJ/cm$^2$ UV rays using a metal halide lamp to prepare a hard coating film of Example 502C. Measurement results on total light transmittance, haze, scratch resistance, pencil hardness, and antifouling properties of the hard coating film are summarized in Table 12.

Example 503C

A cellulose triacetate film substrate with a thickness of 80 μm was used as a transparent substrate. A coating liquid was prepared by stirring the following components:

| | |
|---|---|
| Urethane acrylate: UA-306H (Kyoeisha Chemical Co., Ltd.) | 80 parts by mass |
| Initiator: Omnirad 184 (IGM Resins B.V.) | 1.5 parts by mass |
| Fluorine compound: OPTOOL DAC (Daikin Industries, Ltd.) | 0.5 parts by mass |
| Additive: Tinuvin 123 (BASF Japan Ltd.) | 0.1 part by mass |
| Solvent: Ethyl acetate | 100 parts by mass |

The coating liquid became turbid and could not be evaluated.

Example 504C

A cellulose triacetate film substrate with a thickness of 80 μm was used as a transparent substrate. A coating liquid was prepared by stirring the following components:

| | |
|---|---|
| Urethane Acrylate: UA-306H (Kyoeisha Chemical Co., Ltd.) | 90 parts by mass |
| Acrylic monomer: Styrene (Tokyo Chemical Industry Co., Ltd.) | 10 parts by mass |
| Initiator: Irgacure 184 (Chiba Specialty Chemicals Inc.) | 1.5 parts by mass |
| Fluorine compound: OPTOOL DAC (Daikin Industries, Ltd.) | 0.5 parts by mass |
| Additive: Tinuvin 123 (BASF Japan Ltd.) | 0.1 part by mass |
| Solvent: Ethyl acetate | 100 parts by mass |

The coating liquid became turbid and could not be evaluated.

Evaluation results of Examples 501 to 504 and Examples 501C and 502C are summarized in Table 12.

TABLE 12

| Ex. | Transmit-tance (%) | Haze (%) | Abrasion res. | Pencil hard-ness | Anti-fouling prop. | Sur. free energy (mN/m) | Mass red. Ratio (%) | Residual ratio of additive (%) |
|---|---|---|---|---|---|---|---|---|
| 501 | 92 | 0.2 | A | 3H | A | 16.8 | 1.3 | 98.3 |
| 502 | 93 | 0.2 | A | 3H | A | 16.1 | 1.8 | 97.7 |
| 503 | 93 | 0.2 | A | 3H | A | 18.0 | 1.5 | 98.5 |
| 504 | 93 | 0.2 | A | 3H | A | 17.3 | 2.0 | 97.1 |
| 501C | 92 | 0.2 | A | 3H | B | 20.9 | 4.5 | 94.3 |
| 502C | 93 | 0.2 | A | 3H | C | 24.7 | 5.8 | 93.9 |

All the hard coating films of Examples 501 to 504 and Examples 501C and 502C, in which a urethane acrylate was used as the polyfunctional (meth)acrylic monomer (A), exhibited pencil hardness of 3H and good scratch resistance.

Comparing Examples 501 to 504 with Examples 501C and 502C, the hard coating films of Examples 501 to 504 which used the fluorine-containing compound (D) having a polymerizable group exhibited sufficient antifouling properties and had good surface energy of 20 mN/m or less, whereas Examples 501C and 502C not using the fluorine-containing compound having a polymerizable group did not exhibit sufficient antifouling properties and had surface energy exceeding 20 mN/m Furthermore, use of the monomer (B) having a partial structure expressed by General Formula (I) or (II) could suppress mass reduction and thermal deterioration of the additive caused by heating. However, Examples 501C and 502C, which used the non-polymerizable fluorine compound and non-polymerizable silicone compound, had high mass reduction ratio and low residual ratio, which was considered to be because uniformity inside the coating film was reduced after photo-curing and portions easy to thermally deteriorate were produced. It should be noted that mass reduction ratio of 3% or less and residual ratio of 95% or more were evaluated to be good.

Comparing Examples 501 to 504 with Examples 503C and 504C, it is understood that use of the monomer (B) having a partial structure expressed by General Formula (I) or (II) can improve compatibility with fluorine-based additives.

It should be noted that present invention should not be construed as being limited to the embodiments described above, but can be modified in various ways when implemented, without departing from the spirit of the present invention. Also, the embodiments may be appropriately combined and implemented, and in this case, the advantageous effects according to the combinations can be achieved. Furthermore, the embodiments described above include various stages, and various other embodiments can be extracted by appropriately combining a plurality of disclosed elements.

The present application addresses the following. Although various additives with improved heat resistance are under development as mentioned above, the additives may decompose to some extent at high temperatures and thus it may be difficult for the additives to fully function. Furthermore, thermal decomposition products of additives may often accelerate deterioration of the resins. Under such circumstances, it has been desired to develop resin compositions satisfying high heat resistance requirements of recent years.

The present invention has an aspect to provide a resin composition which can suppress thermal deterioration of additives and can be used for various applications, and to provide a film containing the resin composition.

The embodiments of the present invention have been made as a result of diligent studies made by the present inventors, using a resin composition containing a specific resin with good heat resistance.

The present invention includes the embodiments as follows, for example.

(1) A resin composition containing a resin R which contains a repeating unit having a partial structure expressed by the following General Formula (I) or (II).

<Chemical Formula 1>

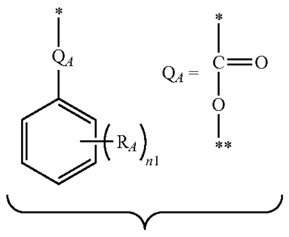

(I)

In Formula (I), $Q_A$ represents the ester bond shown in the formula, $R_A$ represents a substituent group, n1 represents any of integers 1 to 5, * represents a bonding site with the remainder of the repeating unit, and ** represents a bonding site with the phenyl group in the formula.

<Chemical Formula 2>

(II)

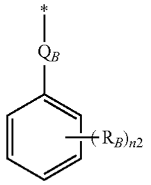

In Formula (II), $Q_B$ represents a linking group or a single bond other than the ester bond represented by $Q_A$ in Formula (I), $R_B$ represents a substituent group, with at least one $R_B$ representing a hydroxyl group, n2 represents any of integers 1 to 5, and * represents a bonding site with the remainder of the repeating unit.

(2) The resin composition according to (1) further containing an additive, in which a mixing ratio of the additive in the resin R is 50 mass % or less.

(3) The resin composition according to (1) or (2), in which the content of the repeating unit in the resin R is 2 mol % or more and 50 mol % or less relative to all the repeating units in the resin R.

(4) The resin composition according to any of (1) to (3), in which the repeating unit is any of a repeating unit derived from (meth)acrylate monomers, a repeating unit derived from (meth)acrylamide monomers, and a repeating unit derived from N-substituted maleimide monomers.

(5) The resin composition according to any of (1) to (4), in which the resin R further contains a (meth)acrylate repeating unit having a linear or branched alkyl group with 1 to 5 carbon atoms in the side chain and/or a (meth)acrylate repeating unit having a hydroxyl group other than a phenolic hydroxyl group in the side chain, in addition to the above repeating unit.

(6) The resin composition according to any of (1) to (4), in which the resin R further contains an olefin repeating unit, in addition to the above repeating unit.

(7) The resin composition according to any of (1) to (4), in which the resin R further contains a halogen atom-containing repeating unit, in addition to the above repeating unit.

(8) A film containing the resin composition according to any of (1) to (7).

(9) The resin composition according to (1), in which the resin composition is an electron beam resist composition.

(10) The resin composition according to (9), in which the content of the repeating unit in the resin R is 2 mol % or more and 50 mol % or less relative to all the repeating units in the resin R.

(11) The resin composition according to (9) or (10), in which the repeating unit is any of a repeating unit derived from (meth)acrylate monomers, a repeating unit derived from (meth)acrylamide monomers, and a repeating unit derived from N-substituted maleimide monomers.

(12) The resin composition according to (9), in which the resin R further contains 2-hydroxyethyl methacrylate as a repeating unit.

(13) A gas barrier laminate film including a resin substrate, a primer layer, and a deposited layer, with the primer layer and the deposited layer being laminated in this order on at least one surface of the resin substrate, in which the primer layer is derived from the resin composition according to (1) and contains a composite of a polyol and an isocyanate compound, the resin R being the polyol.

(14) The gas barrier laminate film according to (13), in which the content of the repeating unit in the polyol is 2 mol % or more and 50 mol % or less relative to all the repeating units in the polyol.

(15) The gas barrier laminate film according to (13) or (14), in which the repeating unit is any of a repeating unit derived from (meth)acrylate monomers, a repeating unit derived from (meth)acrylamide monomers, and a repeating unit derived from N-substituted maleimide monomers.

(16) The gas barrier laminate film according to any of (13) to (15) characterized in that the primer layer further contains an organic additive.

(17) The gas barrier laminate film according to any of (13) to (16), in which a surface of the deposited layer is provided with a gas barrier coating layer that is a dried thin coating film formed of a coating liquid containing a water-soluble polymer and an alkoxysilane or a hydrolysis product thereof.

(18) A heat sterilization packaging bag formed of a laminate in which a substrate film, a primer layer, a silicon oxide deposited layer, a gas barrier coating layer, and a heat-sealing layer are laminated in this order, in which the primer layer is derived from the resin composition according to (1) and contains a reaction product of an acrylic polyol, an isocyanate, and a silane coupling agent, the resin R being the acrylic polyol;

the gas barrier coating layer is formed of a dried coating film of a coating liquid containing a silicon compound or a hydrolysate or a condensate thereof, and a water-soluble polymer having a hydroxyl group; and the silicon compound contains the following two components which are a component (a) and a component (b), and when the component (a) is converted to mass of $SiO_2$ and the component (b) is converted to mass of $R^2Si(OH)_3$, the solid content of $R^2Si(OH)_3$ relative to the total solid content is 1 mass % to 50 mass %, and when the component (a) is converted to mass of $SiO_2$ and the component (b) is converted to mass of $R^2Si(OH)_3$, the mixing ratio of the solid contents in mass ratio is in the range of $SiO_2$ ($R^2Si(OH)_3$+the water-soluble polymer)=100/100 to 100/30.

In the silicon compound, (a) is a silicon compound or a hydrolysate thereof expressed by the following General Formula (III):

$$Si(OR^1)_4 \quad \text{(III)}$$

where $R^1$ represents $CH_3$, $C_2H_5$ or $C_2H_4OCH_3$, and (b) is a silicon compound or a hydrolysate or a condensate thereof expressed by the following General Formula (IV):

$$(R^2Si(OR^3)_3)n \quad \text{(IV)}$$

where $R^2$ represents an organic functional group, and $R^3$ represents $CH_3$, $C_2H_5$ or $C_2H_4OCH_3$, and n represents 1 or more.

(19) The heat sterilization packaging bag according to (18), in which the content of the repeating unit having a partial structure expressed by the above General Formula (I) or (II) in the acrylic polyol is 2 mol % or more and 50 mol % or less relative to all the repeating units of the acrylic polyol.

(20) The heat sterilization packaging bag according to (18) or (19), in which the repeating unit having a partial structure expressed by the above General Formula (I) or (II) is any of a repeating unit derived from (meth) acrylate monomers, a repeating unit derived from (meth)acrylamide monomers, and a repeating unit derived from N-substituted maleimide monomers.

(21) The heat sterilization packaging bag according to any of (18) to (20), in which the acrylic polyol further contains a (meth)acrylate repeating unit having a linear or branched alkyl group with 1 to 5 carbon atoms in the side chain and/or a (meth)acrylate repeating unit having a hydroxyl group other than a phenolic hydroxyl group in the side chain, in addition to the repeating unit having a partial structure expressed by the above General Formula (I) or (II).

(22) The heat sterilization packaging bag according to any of (18) to (21), in which the acrylic polyol further contains an olefin repeating unit, in addition to the repeating unit having a partial structure expressed by the above General Formula (I) or (II).

(23) The heat sterilization packaging bag according to any of (18) to (22), in which the acrylic polyol further contains a halogen atom-containing repeating unit, in addition to the repeating unit having a partial structure expressed by the above General Formula (I) or (II).

(24) The heat sterilization packaging bag according to any of (18) to (23), in which the component (b) is a trimer that is a 1,3,5-tris(3-trialkoxysilylalkyl) isocyanurate expressed by the following General Formula (V):

$$(NCO—R^4Si(OR^3)_3)_3 \quad \text{(V)}$$

where $R^4$ represents $(CH_2)n$, and $R^3$ represents $CH_3$, $C_2H_5$ or $C_2H_4OCH_3$, and n represents 1 or more.

(25) The heat sterilization packaging bag according to any of (18) to (24), in which the gas barrier coating layer and the heat-sealing layer are bonded together via a dry lamination adhesive.

(26) The heat sterilization packaging bag according to any of (18) to (25), in which a polyamide film is laminated between the gas barrier coating layer and the heat-sealing layer.

(27) The heat lamination packaging bag according to any of (18) to (26), having transparency.

(28) A hard coating layer-forming composition that is the resin composition according to (1), containing as raw materials a polyfunctional (meth)acrylic monomer (A) selected from dipentaerythritol pentaacrylate hexamethylene diisocyanate urethane prepolymer, dipentaerythritol pentaacrylate toluene diisocyanate urethane prepolymer, and dipentaerythritol pentaacrylate isophorone diisocyanate urethane prepolymer;

a monomer (B) having the partial structure expressed by General formula (I) or (II);

a photoradical polymerization initiator (C);

a fluorine-containing compound (D) having a polymerizable group; and a non-polymerizable additive (E), in which the mixing ratio of the non-polymerizable additive (E) in the composition is 50 mass % or less.

(29) The hard coating layer-forming composition according to (28), in which the content of the monomer (B) therein having a partial structure expressed by General formula (I) or (II) is 2 mol % or more and 50 mol % or less relative to the sum of the polyfunctional (meth) acrylic monomer and the fluorine-containing compound having a polymerizable group.

(30) The hard coating layer-forming composition according to (28) or (29), in which the monomer (B) having a partial structure expressed by General formula (1) or (11) is any of a (meth)acrylate monomer, a (meth) acrylamide monomer, and an N-substituted maleimide monomer.

(31) The hard coating layer-forming composition according to any of (28) to (30), in which the polyfunctional (meth)acrylic monomer (A) is contained by 50 mass % or more and 95 mass % or less relative to the total mass of the polyfunctional (meth)acrylic monomer (A) and the monomer (B) having a partial structure expressed by General formula (I) or (II).

(32) The hard coating layer-forming composition according to any of (28) to (31), in which the amount of the fluorine-containing compound (D) having a polymerizable group to be added is 0.01 mass % or more and 10 mass % or less relative to the total mass of the polyfunctional (meth)acrylic monomer (A) and the monomer (B) having a partial structure expressed by General formula (I) or (II).

(33) The hard coating layer-forming composition according to any of (28) to (32), in which the amount of the photoradical polymerization initiator (C) to be added is 0.01 mass % or more and 10 mass % or less relative to the total mass of the polyfunctional (meth)acrylic monomer (A) and the monomer (B) having a partial structure expressed by General formula (I) or (II).

(34) A hard coating film including a hard coating layer formed of a cured material of the hard coating layer-forming composition according to any of (28) to (33) on a transparent substrate, in which the hard coating layer has surface free energy of 20 mN/m or less and a thickness of 5 μm to 25 μm.

The present application can provide a resin composition that can suppress thermal deterioration of additives and can be used for various applications, and a film containing the resin composition.

REFERENCE SIGNS LIST

10, 20, 30 . . . Gas barrier laminate film
11 . . . Resin substrate
12 . . . Primer layer
13 . . . Deposited layer
21 . . . Gas barrier coating layer
31 . . . Adhesive layer
32 . . . Laminate resin layer
100, 200 . . . Laminate (packaging material)
101 . . . Substrate film
102 . . . Primer layer
103 . . . Silicon oxide deposited layer
104 . . . Gas barrier coating layer
105 . . . Heat-sealing layer
206 . . . Polyamide film
ad1, ad2, ad3 . . . Adhesive layer
300 . . . Hard coating film
301 . . . Transparent substrate
302 . . . Hard coating layer Obviously, numerous modifications and variations of the present invention are possible in light of the above teachings. It is therefore to be understood that within the scope of the appended claims, the invention may be practiced otherwise than as specifically described herein.

What is claimed is:

1. A resin composition, comprising:

a resin R including a repeating unit having a partial structure of Formula (I) or (II):

Formula (I)

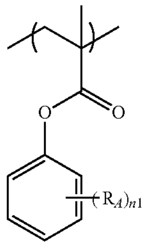

where $R_A$ is a substituent group, and n1 is any of integers 1 to 5;

Formula (II)

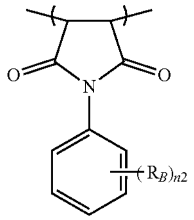

and wherein $R_B$ is a substituent group, with at least one $R_B$ being a hydroxyl group, and n2 is any of integers 1 to 5, wherein the resin R includes the repeating unit at 2 mol % to 20 mol % relative to all repeating units in the resin R and further includes an olefin repeating unit.

2. The resin composition according to claim 1, further comprising:

an additive included at 50 mass % or less with respect to the resin R.

3. The resin composition according to claim 1, wherein the resin R further includes at least one of a (meth)acrylate repeating unit having a linear or branched alkyl group with 1 to 5 carbon atoms in a side chain and a (meth)acrylate repeating unit having a hydroxyl group other than a phenolic hydroxyl group in the side chain.

4. The resin composition according to claim 1, wherein the resin R further includes a halogen atom-containing repeating unit.

5. A film, comprising:

the resin composition of claim 1.

6. An electron beam resist composition, comprising:

the resin composition of claim 1.

7. The electron beam resist composition according to claim 6, wherein the resin R of the resin composition further includes 2-hydroxyethyl methacrylate as a repeating unit.

* * * * *